(12) United States Patent
Hessel

(10) Patent No.: US 8,620,301 B1
(45) Date of Patent: Dec. 31, 2013

(54) RADIATED WAVE MEASUREMENT WITH SUPPORTING CALIBRATION

(76) Inventor: Steven Ray Hessel, San Jose, CA (US)

( * ) Notice: Subject to any disclaimer, the term of this patent is extended or adjusted under 35 U.S.C. 154(b) by 1490 days.

(21) Appl. No.: 12/156,376

(22) Filed: May 30, 2008

Related U.S. Application Data

(60) Provisional application No. 60/932,442, filed on May 30, 2007.

(51) Int. Cl.
*H04W 24/00* (2009.01)

(52) U.S. Cl.
USPC ........ 455/423; 455/424; 455/425; 455/277.2; 455/67.11

(58) Field of Classification Search
USPC ............... 455/423, 424, 425, 277.2, 67.11
See application file for complete search history.

(56) References Cited

U.S. PATENT DOCUMENTS

| | | | |
|---|---|---|---|
| 5,371,760 A | 12/1994 | Allen | |
| 6,249,256 B1 | 6/2001 | Luxon et al. | |
| 6,442,507 B1 | 8/2002 | Skidmore | |
| 6,480,497 B1 | 11/2002 | Flammer | |
| 7,162,507 B2 | 1/2007 | Carter | |
| 2005/0085223 A1* | 4/2005 | Liu | 455/423 |
| 2007/0254643 A1* | 11/2007 | Garcia et al. | 455/423 |
| 2008/0284664 A1* | 11/2008 | Hilgers | 343/703 |

OTHER PUBLICATIONS

Jean-Paul M. G. Linnartz, Ed., JPL's Wireless Communication Website, Chapter: Wireless Channel, Section: Multipath Fading; Rician fading. 2008.
Motorola, How to Make Your Wireless LAN Work: Design for Context, Coverage & Capacity. Feb. 2006. pp. 2-3.
Yuval Shavit, "How to Install a WLAN." SearchNetworkingChannel.com. Feb. 15, 2008.
Jack Unger, Deploying License-Free Wireless Wide-Area Networks. Indianapolis: Cisco Press, 2003. pp. 52,108-122, 127, 243-245, 285.
Emerson & Cuming Microwave Products, Technical Bulletin, No. EB-100, Eccosorb VHP-NRL, Very High Performance Broadband Pyramidal Absorber.
ETS-Lindgren, Microwave Absorber Selection Guide, 5/03 2 k W © 2003 ETS-Lindgren. REV B, p. 8.
Emerson & Cuming Microwave Products, Eccosorb AN, Flexible Foam Sheet Broadband Microwave Absorbers, Rev. Jun. 4, 2003.
Emerson & Cuming Microwave Products, Eccosorb ANW, Waterproof, Fuel-Proof, Flexible Foam Sheet Broadband Microwave Absorbers, Rev. Nov. 12, 2002.
Emerson, William H., Electromagnetic Principles and Applications, exerpted from "Electromagnetic Wave Absorbers, Useful Tools for Engineers," Rev. Mar. 1, 2005.
ETS-Lindgren, Microwave Absorber Selection Guide, May 2003 2 k W © 2003 ETS-Lindgren. Rev B, p. 8.

* cited by examiner

*Primary Examiner* — Sanh Phu

(57) ABSTRACT

A process and apparatus that are described measure characteristics of radiated waves in an uncontrolled environment. These measurements are useful for the design of communications installations (site surveys) among other signal measurement applications.

28 Claims, 26 Drawing Sheets

RADIATED WAVE MEASUREMENT WITH SUPPORTING CALIBRATION

CROSS-REFERENCE TO RELATED APPLICATIONS

This application claims the benefit of PPA Ser. No. 60/932,442, filed 2007 May 30 by the present inventor, which is incorporated by reference.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to electronic measurement, specifically to the measurement of radiated waves that can be used for communication or can interfere with communication, to the calibration of equipment that might be used to perform those measurements or other tasks.

2. Prior Art

Communication Measurement

There are many circumstances in which it is important to measure the strength of radiated signal accurately. Two examples occur when it is desired to determine why an existing communication installation is not performing adequately and when it is desired to design a communication installation. In some branches of the communication industry this measurement process is called a "site survey" and that nomenclature will be applied here for all measurements made before equipment is finally installed. When the goal of the site survey is to analyze an existing installation, it is usually to determine why the existing installation is not transferring data at a desired rate from one location to another. An inadequately functioning installation often needs to be upgraded. Designing of an upgrade to the existing installation is similar to a second goal, designing a new communication installation; these requires predicting the rate at which error free data will be transferred (throughput) in the new or modified installation. The techniques and apparatuses presented here allow installation design to be done with much greater accuracy than with the prior art. Consequently, the resulting designs are significantly more effective and cost efficient.

Prior Art Methods

Figure 1:
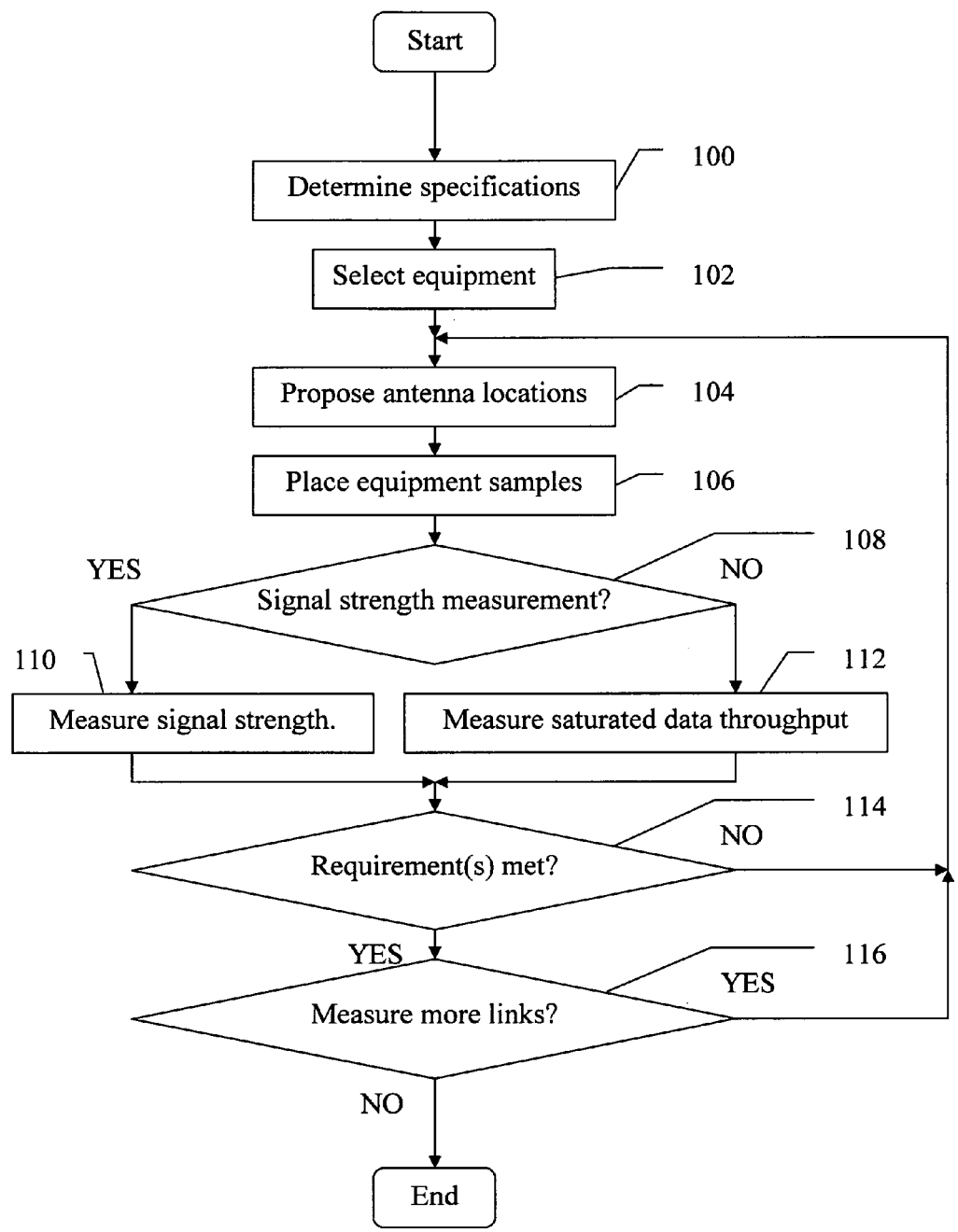

Previously, the same equipment type (make and model) that will be installed, was used to perform the site survey. Occasionally, more than one equipment type was used requiring an obvious duplication of the following procedures. In the following procedures the installation is viewed as comprised of a network of directed simplex links which are measured individually. Several alternative procedures are in use. They follow the same pattern as shown in FIG. 1 with salient differences in steps 5 and 6:

1. Determine what specifications are to be met by the installation and derive the requirements of the links needed to meet them (100).
2. Select what equipment will be used at each end of the proposed link. The equipment at opposite ends of the link may be different (102).
3. Propose a transmitter antenna location and receiver antenna location (104).
4. Place one sample of each selected antenna at each end of the measured link. Place the associated samples of the selected equipment close enough to be connected (106).
5. Use the equipment to estimate signal properties (108 selects 110 or 112).
6. If the requirements are not met, the configuration must be changed (often equipment location or antenna type) and steps 3 through 5 are performed again (114).
7. The equipment is moved successively to all of the locations where links are needed and steps 3 through 6 repeated (116).

A generic problem with the basic procedure comes from the determination of what equipment will be used (102}. It requires that the equipment to be used, be selected too early in the design cycle. In most cases, there is some latitude in equipment selection. This latitude is discarded often before the designer has even seen the location where the equipment is to be installed and clearly before any site survey has been made. It is precisely the results from the site survey that are needed to select the equipment that is best suited to a specific installation. In practice, even if the designer of an installation wanted to change his equipment choice once he has made the site survey, he could not. Not only would he have to discard the data from the site survey, but typically he does not have a sample of the alternative equipment with him.

Prior Art Procedure 1

A common means of implementing a site survey is to use software to generate a potentially large amount of data traffic to be sent over the communication path and to measure the amount that actually is transferred in step 5 (112). This is a saturated throughput measurement, and is the method used in U.S. Pat. Nos. 6,442,507 and 7,162,507. The requirement is stated in terms of a requisite saturated throughput and if the saturated throughput is sufficient to meet the requirement, then step 6 succeeds (114). This will be referred to as prior art procedure 1.

A problem with procedure 1 comes from errors in the site survey measurement. The procedure above can determine whether a particular configuration will work with the samples of equipment used in the site survey, but not the equipment that will ultimately be installed. If the equipment ultimately installed is in some sense weaker (usually lower output signal strength or poorer sensitivity) than the equipment used for the site survey then the measurement does not necessarily mean that the ultimate configuration will provide the requisite saturated throughput.

Prior Art Procedure 2

A solution to this second problem is theoretically available on installations that use multi-rate protocols. This will be referred to as prior art procedure 2. In it, saturated throughput is measured in step 5 (112). It is compared with a requirement that is a greater saturated throughput than is actually needed in the final installation. This procedure does indeed provide some margin, but it is difficult to know how much. The relationship between signal strength and saturated throughput is complex and often requires significant additional effort to estimate. Furthermore, this relationship is altered significantly by the presence of interference. This method appears to guarantee little more than a change in the right direction and will not be analyzed further. Other variations of this method are possible, but the author is aware of no one using such methods.

Prior Art Procedure 3

A second measurement option is available on installations that use equipment that provide a mechanism to measure the signal strength received (often called a "Received Signal Strength Indicator" or RSSI) and provide it to the user. This is a signal strength measurement, and is the method recommended by Lisa Phifer ("How to Install a WLAN" By Yuval Shavit. 15 Feb. 2008. SearchNetworkingChannel.com.) This will be referred to as prior art procedure 3. In it, RSSI is measured in step 5 (110). The requirement to be met in step 6 is the manufacturer's specification of the signal strength required by the receiver. There are several problems with this procedure, the paucity of equipment that provide RSSI data, the accuracy of the RSSI data when provided, inability to measure or compensate for interference to the communicating signal, and the problem with weaker equipment incurred by prior art procedure 1.

The purpose for which RSSI data is provided to the user is to allow the user to select the most suitable signal or to know if a signal is strong enough for his use. This function is useful but not necessary in client nodes which sometimes are used in point-to-multi-point communications and it is often not provided. Additionally, much equipment is designed for applications where no user is present. As a result there is often no reason to make RSSI data available to a user and it is not done. If RSSI data is made available to the user, it is often made available with only very course resolution, perhaps roughly half a dozen levels. This is sufficient for the purpose for which it was intended, but far too little resolution to measure signal strength in a meaningful way. As a result, the need to use RSSI data restricts the choices of equipment that can be considered for a specific installation to that equipment with the RSSI measurement mechanism. This restriction can be quite serious. The lack of a measurement mechanism is so prevalent in some categories of point-to-multipoint equipment that the measurement is simply not made on the half of the links connecting to the infrastructure node (sometimes called an "Access Point.") This partially defeats the purpose of performing a site survey.

The use of RSSI data also introduces additional error in the site survey. In those instances where RSSI data is provided, its accuracy is often unspecified. In equipment that the author has examined, RSSI accuracy is much better at high signal strength than at the low signal strength used to determine whether a configuration will work.

While saturated throughput measurements inherently include the effect of interference on the throughput, signal strength measurements do not include many types of interference. Interference can reduce throughput even to zero without affecting the RSSI.

In a manner similar to in prior art procedure 1, the procedure above may determine whether the signal strength is adequate in a particular configuration with the samples of equipment used in the site survey, but not the equipment that will ultimately be installed.

Prior Art Procedure 4

Equipment that provides RSSI data to the user also makes it possible to overcome the problem with weaker equipment. As in prior art procedure 3, RSSI is measured in step 5 (110). In step 6 the requirement is set at some margin above the manufacturer's specification of the signal strength required by the receiver to overcome the difference in signal strength that may exist between the equipment used for the site survey and that finally installed. This will be referred to as prior art procedure 4. It incurs all of the other problems of prior art procedure 3.

Prior Art Error Analysis

To put prior art errors in perspective, error information for equipment operating in the low-gigahertz frequency range will be presented. The primary contributors to the overall error are:

transmitter output signal strength tolerance;
receiver sensitivity tolerance;
variation in the peak gain of antennas; and
antenna gain variations with direction.

The tolerances specified by most manufacturers are in dB around a nominal specified value (e.g. a transmitter may have an output power of 36 decibels relative to a milliwatt+ or −2 decibels, written 36 dBm+/−2 dB or 36+/−2 dBm.) Such specifications indicate that the weakest component can be two times the tolerance less than the strongest (in the example given the weakest transmitter will have an output power of 34 dBm and the strongest, 38 dBm.); thus, a difference of 4 dB can exist between the weakest and strongest transmitters that meet this specification. This difference shows up as an error in site survey measurements: thus, measurements have a property which is their error, expressed as the difference between the strongest and weakest extremes unless otherwise noted.

The significance of these errors can be better understood if their origin is known. Transmitter and receiver errors come from many sources including:

component variation;
component aging (particularly microwave semiconductor components);
variation with the frequency being used; and
variation with temperature.

Most vendors do not publish openly the difference between the strongest and weakest signal from the transmitter and the difference between the sensitivity of the best and worst-case receiver in a model of a product, though some do. Often the difference can be obtained from the vendor if requested (as the author has done), but these specifications may not be binding on the vendor and some units may not lie within the limits given. None-the-less, in most cases each difference given is no smaller than 4 dB (often expressed as +/−2 dB.)

The gain of commodity antennas is usually specified loosely, often by a single number. Antenna-to-antenna variation (tolerance) within the same model is usually not specified, but unofficially manufacturers are reluctant to indicate a consistency greater than +/−0.25 to +/−0.5 dB, partially due to the difficulty in measuring gain. Based upon interviews with experts, the author expects that most antenna designs would be consistent within +/−0.25 dB (with perfect measurement capability) and some technologies will deliver somewhat better consistency. For the purpose of this paper, 0.5 dB (from +/−0.25 dB) will be used as the best to worst antenna gain ratio.

Omnidirectional antennas are used in most cases where point-to-multi-point communications is desired anywhere within a service area. These antennas have an additional source of error called "omnidirectional asymmetry." Omnidirectional asymmetry is the degree to which an omnidirectional antenna gain deviates from uniformity in all directions in the plane of omnidirectionality (usually the H-plane.) It can easily be observed by rotating the antenna relative to the point of observation, and this data is published by some manufacturers. The author found the average omnidirectional asymmetry of indoor antennas to be about 2.5 dB. There was not enough data to bound the error, but there was enough data of identify the standard deviation of omnidirectional asymmetry as about 1.5 dB. Omnidirectional asymmetry is important because in most cases it is not possible to guarantee that the orientation of the antenna as finally installed is identical to the orientation of the antenna used in the site survey. Indeed, in some cases omnidirectional asymmetry is dictated by subtle alignments hidden inside a random.

Outdoor antennas have typically have less error, averaging about 1.5 dB, but there was not enough data to compute a reliable standard deviation. Outdoor antennas must also contend with variations in the attenuation of the coaxial cable and connectors used to connect the antennas to the electronics interfacing with them. This is significant for long cables.

For the purpose of this analysis, one standard deviation worse than the average indoor antenna omnidirectional asymmetry (4 dB) will be used for the contribution to the overall error due to omnidirectional asymmetry. With some degree of care it can be achieved, though the author is not aware of anyone exercising that degree of care.

Prior art procedures 3 and 4 make use of RSSI: RSSI data itself contains errors as discussed in Receiver Signal Metrology. Sometimes the amount of additional signal strength required by prior art procedures 4 is sufficient to raise the signal strength out of the levels with the highest error. For the purpose of this example, a 4 dB error will be used, but prior art procedure 3 is less likely to gain the same benefit.

Antenna gain change over the band being used is another source of error in measurement and should be included in this analysis. It is not for two reasons. First, the range of frequencies being used is highly dependent on the application, and second, manufacturers usually supply only band-center data.

The aggregate errors that are possible under these conditions can be summarized as follows:

4.0 dB transmitter output signal strength error;
0.5 dB peak gain of the transmitter antenna error;
4.0 dB omnidirectional asymmetry of transmitter;
0.5 dB peak gain of the receiver antenna error;
4.0 dB omnidirectional asymmetry of receiver;
4.0 dB receiver sensitivity error;
4-7 dB RSSI error prior art procedure 3; and
4.0 dB RSSI error prior art procedure 4.

The total error for prior art procedure 1, point-to-point communication (no omnidirectional asymmetry) is about 9 dB of error. Additional error is incurred in the following circumstances:

8 dB for point-to-multi-point communication;
Incalculable for prior art procedure 2;
4-7 dB for prior art procedure 3; and
4.0 dB for prior art procedure 4.

The most frequently encountered error is that of prior art procedure 4 implemented for point-to-multi-point communication. That is a 21 dB error. The error bounds given here are quite accurate for a set of circumstances with which the author is familiar and illustrative of many more. They allow the consequences of site survey errors to be examined.

Consequences of Errors

The signal strengths, gains, sensitivities etc. of any of the equipment used to perform a site survey are usually not known more accurately than the manufacturer's specifications. To understand the implication of that, the bound upon these properties will be explored. Assume that the equipment and configuration used to take the site survey was all at the maximum end of its tolerances and that the equipment as installed and configured was at the minimum. The results from the above analysis show that a disparity of from 9 to 24 dB exists. If prior art procedure 1 is used, no correction for this disparity will be applied, the installation can have signal levels 9 to 17 dB too weak to meet requirements. If prior art procedure 3 is used, again no correction will be applied for this disparity, the installation can have signal levels 13 to 24 dB too weak to meet requirements. These are large errors. If prior art procedure 4 is used then the requirement that must be used in step 6 to guarantee that the installation will meet requirement has a 13 to 21 dB margin over the specification.

Furthering the exploration of these properties, assume that the equipment used to take the site survey was all at the minimum end of its tolerances and that the equipment actually installed was at the maximum. The direction of the disparity is now reversed. If prior art procedure 1 or 3 is used, the installation will meet specifications with excess signal strength of 9 to 24. If prior art procedure 4 is used with the requirement that must be used in step 6 to guarantee that the installation will meet specifications, then the signal strength will be 22 to 38 dB greater than is needed to meet specifications.

The consequence of not meeting specifications is obvious, the network does not transfer data at the rate required, and may not transfer data at all in certain locations. The consequence of meeting specifications with such large signal strength excess requires a bit more examination. A point-to-point installation designed by procedure 1 or 3 will have 9 to 13 dB excess signal strength, A point-to-multipoint installation designed by procedure 1 or 3 will have 17 to 24 dB excess signal strength. These are exactly the margins that should exist to accommodate the possibility that the equipment actually installed could be at the minimum end of its tolerances. However, an installation designed by procedure 4 using equipment at the minimum end of its tolerances for measurement and installing equipment at the maximum end of its tolerances will have 22 to 38 dB excess signal strength, 9 to 17 dB of which should exist to accommodate the possibility that the equipment actually installed could be at the minimum end of its tolerances. The remaining 13 to 21 dB excess signal strength is due to the margin which is inflated by the need to guarantee that the network will meet specifications in spite of the error in signal strength measurement.

In free-space, radiated signals loose strength as the inverse square of the distance traveled (when signal strength is expressed as power): thus, under these conditions a point-to-point network designed by the signal strength procedure with margin would appear to require 4.5 times more equipment to traverse a distance than actually required, and a point-to-multipoint network designed by the signal strength procedure with margin under the same conditions would appear to require 126 times more equipment to service an area than actually required. Someone skilled in the art of designing radio communication installations will may recognize such results as erroneous, but such a site survey is, at best, useless. Installations with large excess signal strength, cost much more than necessary to purchase, install, administer and maintain. For this reason, until recently designers have been reluctant to use such large margins.

(It should be noted that indoor installations often do not closely follow the free-space relationship used above. This reduces the difference between the amount of equipment that appears to be required due to measurement error and the equipment actually required, but the difference is none-the-less significant.)

The most common margin that the author has encountered as a "rule of thumb" is to provide a margin of 10 dB (in the place of the 13 to 21 dB described above) (Jack Unger. Deploying License-Free Wireless Wide-Area Networks. Indianapolis: Cisco Press, 2003. pp. 52 & 244) While it is not sufficient to cover all cases, it's origin is now clear.

Prior art procedures 1, 3 and, with the use of a 10 dB margin, procedure 4 all lead to a common approach in communication design. A site survey is performed, the installation is built, the installation's users identify regions and situations in which the installation does not meet requirement and the designer is called out to the site to design patches to the installation which are installed. (See the comments of Michael Brandenburg and Craig Mathias in Shavit, 2008.)

Unger observes that this is an extremely expensive process in Unger. 2003. p. 285. Occasionally, installations have sufficiently stringent requirements that patching is not adequate and portions of the installation must be redesigned and replaced. The cycle has the potential to repeat itself a seemingly unlimited number of times. In many business situations such a delay is unacceptable. There are even designers who are prone to claim after some effort to patch an installation, that wireless communication should never be expected to be reliable.

More recently, designers have used very large margins with procedure 4 or with no measurements at all, sometimes in an effort to guarantee that the installation will meet requirements when first installed (See the comments of Craig Mathias in Shavit, 2008 and "How to Make Your Wireless LAN Work: Design for Context. Coverage & Capacity" By Motorola, February 2006, p. 3.) This can result in installations that are much more expensive than needed. Not surprisingly, these approaches are sometimes used by those selling equipment.

Receiver Signal Metrology

Previously, many receivers, particularly inexpensive receivers, have had no measurement capability built into them. Some had various forms of signal strength measurement. Among those, some reference signal strength to background noise using it as a source of calibration. Others provide some degree of absolute received signal strength measurement (often called a "Received Signal Strength Indicator" or RSSI.) RSSI data may contain significant errors. The limited experience of the author suggests that the data can have surprisingly good linearity at high signal levels. Based on that experience, it appears that RSSI data can contain at least 34 dB of error at high amplitude increasing to about 7 dB at low amplitude. This amount of error is a significant impediment to making measurements accurate enough to limit the consequences of measurement error in the cost of communications installations.

Weak Signal Generation

Previously, weak signals were generated by attenuating the signal from relatively strong signal sources to achieve the desired signal strength. The accuracy of the resultant signal was the result of all the inaccuracies of all of the components used to generate the signal. Attenuators with large attenuation also have greater errors than those with smaller attenuation. As a consequence, weaker signals have greater uncertainly of signal strength.

An example will show the principle. Assume that the signal source is a low power transmitter. Such a choice is often the cheapest and most readily available signal source. In some cases, it is the only signal source capable of the complex modulation scheme needed by the receiver or it along with the transmitter in a transceiver are the only equipment capable of the complex interactions required by the protocol that the receiver (along with its associated transmitter) require. Many such transmitters have a +/−2 dB power output tolerance as discussed in Communication Measurement, Prior Art Error Analysis. The transmitter will be assumed to have a nominal output power of 26 dBm for the purposes of this example. Midwest Microwave provides good quality commercial attenuators that could be used to create a weak signal from the output of this transmitter in their model ATS-3550-12-NNN-02. Other manufacturers provide similar products. The uncertainties of attenuation below 12.4 GHz. are specified as follows:

| Attenuation (dB) | Uncertainty (dB) |
|---|---|
| 10 | 0.6 |
| 20 | 1.0 |

Similarly, Agilent 8494 step attenuators provide the ability to attenuate in 1 dB steps with an uncertainty of 1.2 dB or less below 12.4 GHz.

For the purpose of this example, the uncertainties introduced by mismatch among the components will be assumed negligible.

With these components any signal at or below 26 dBm can be generated with some uncertainty. Some samples are as follows:

| Signal Level (dBm) | Uncertainty (dB) |
|---|---|
| 26 | 4 |
| 20 | 5.2 |
| 0 | 6.2 |
| −20 | 7.2 |
| −40 | 8.2 |
| −60 | 9.2 |
| −80 | 10.2 |
| −100 | 11.2 |
| −120 | 12.2. |

While this amount of error is acceptable for some applications, it does not allow such applications as calibration of receiver measurements (such as RSSI) as discussed in Receiver Signal Metrology to an accuracy sufficient to limit the consequences of measurement error to the cost of communications installations as discussed in Communication Measurement.

SUMMARY

A first process and apparatus that are described measure characteristics of radiated waves in an uncontrolled environment. These measurements are useful for the design of communications installations (site surveys) among other signal measurement applications.

To facilitate that first process and apparatus, a second process and apparatus (called calibration) are described, that allows the determination of responses of the receiver in the first process and apparatus to signals, the properties of which are known. The signals with known properties are supplied to the receiver via guided waves, i.e. in a controlled environment. The second process and apparatus are suitable for input calibration applications beyond the calibration of the first process and apparatus.

To facilitate the second process and apparatus, a third process and apparatus are described that generates signals having accurately known weak signal strengths. The third process and apparatus are suitable for signal generation and calibration applications beyond those of the first or second process and apparatus.

DRAWINGS

Figures

FIG. 1. Flow chart of prior art communication measurement.

Figure 2:
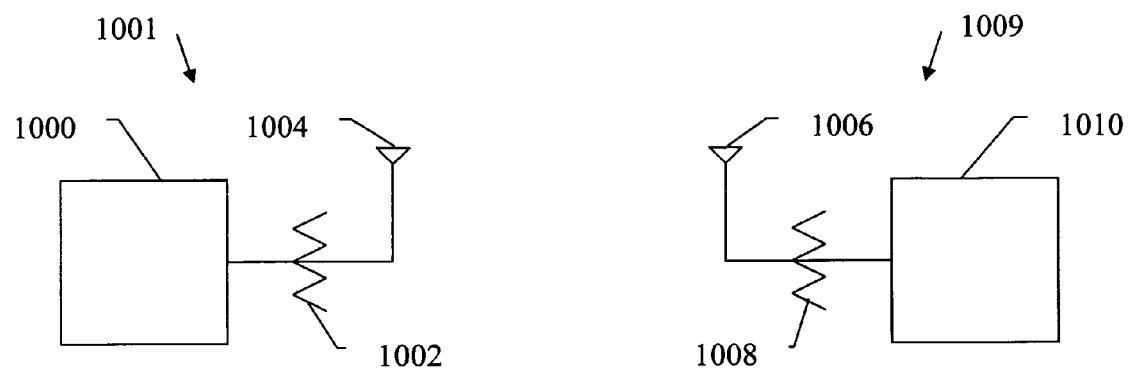

FIG. 2. Functional diagram of first embodiment, of communication measurement instruments at each end of a measured link.

Figure 3:
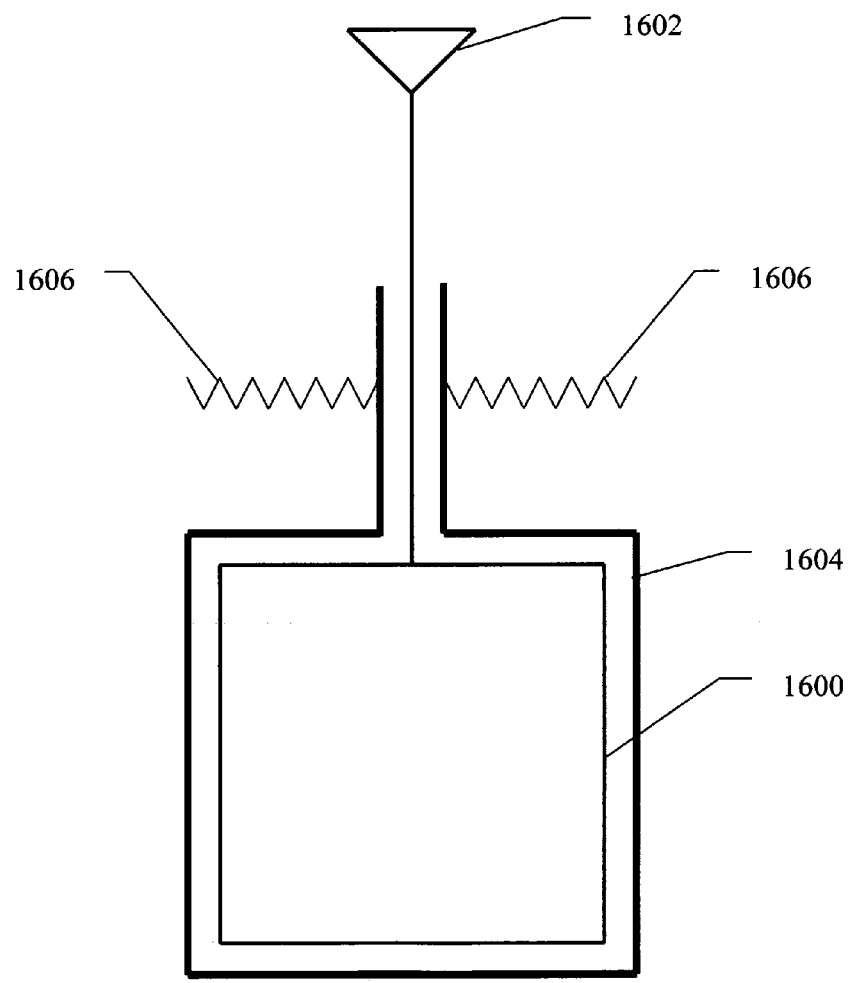

FIG. 3. The use of materials to minimize the influence of reflected radio frequency waves.

Figure 4:
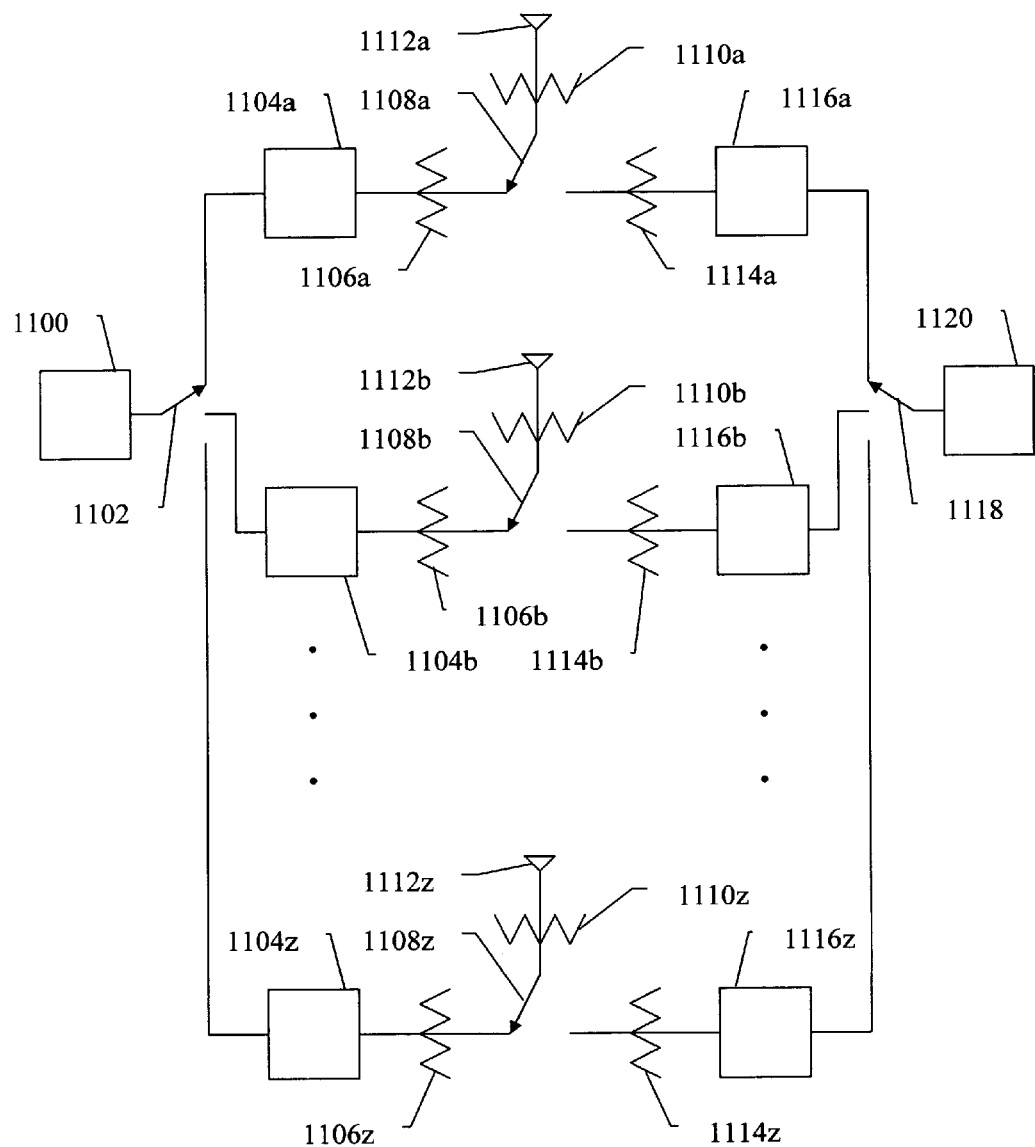

FIG. 4. Diagram encompassing several embodiments of a communication measurement instrument.

Figure 5:
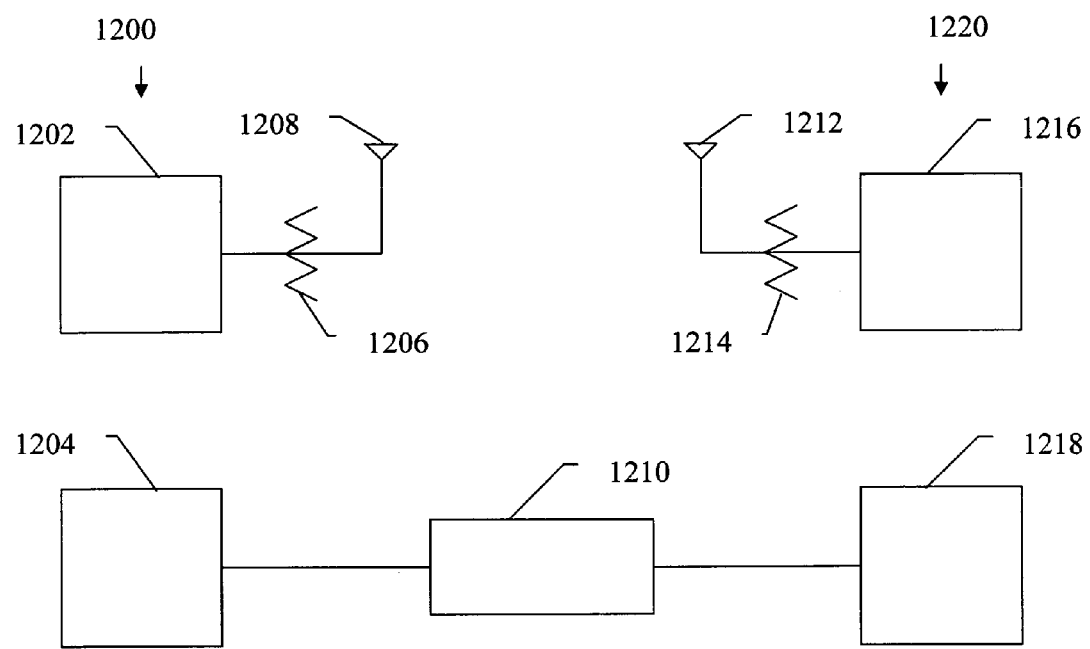

FIG. 5. Functional diagram of an alternative embodiment, of communication measurement instruments at each end of a measured link using a protocol that requires communication in both directions (duplex communication). The link forming the backchannel may be, but is not required to be radiated (i.e. unguided, via radio).

Figure 6:
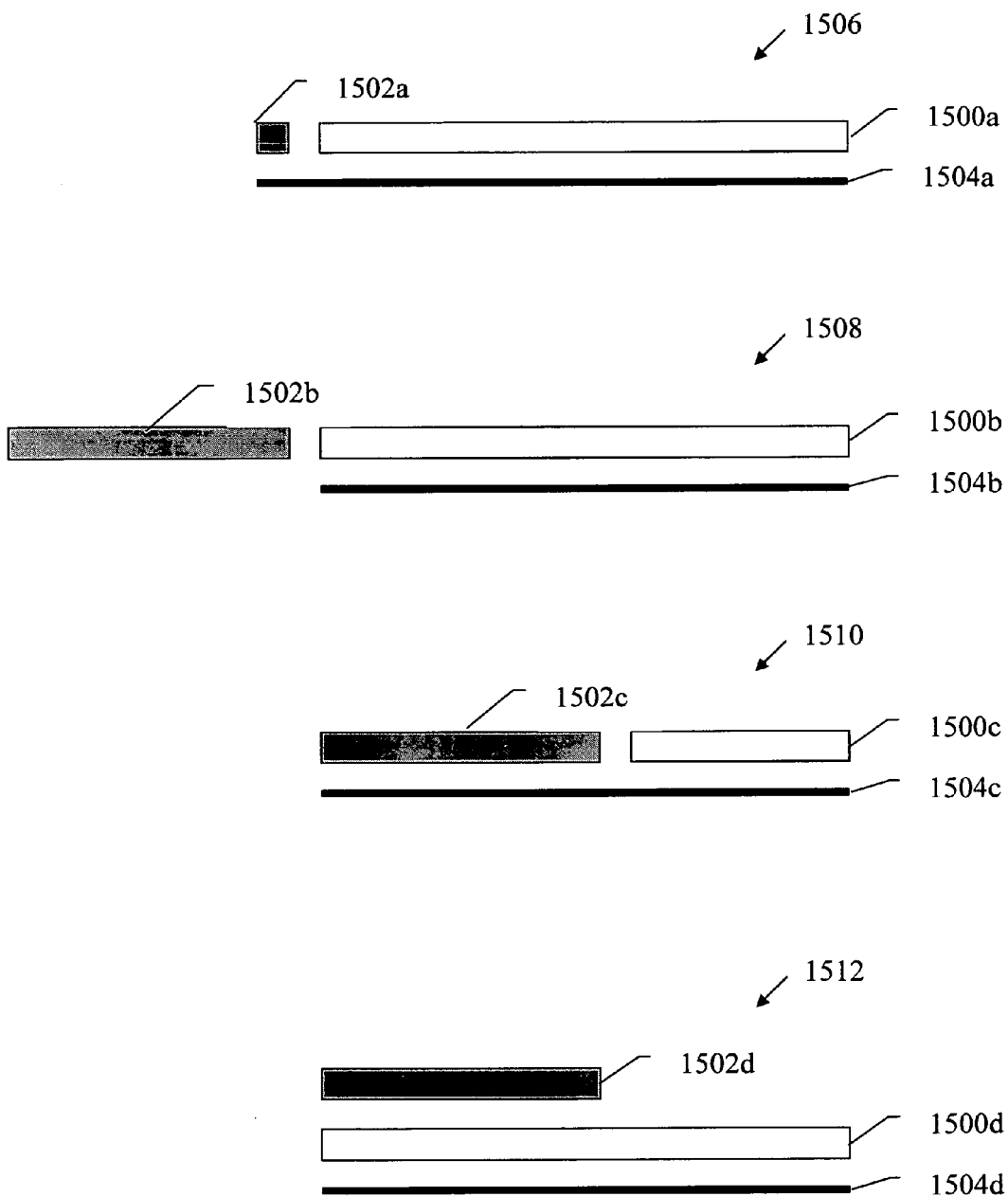

FIG. 6. Ways in which data containing useful information can be conveyed from a communication measurement instrument where it is generated to a communication measurement instrument where the surveyor is located without significantly altering measurements that are being made.

Figure 7:
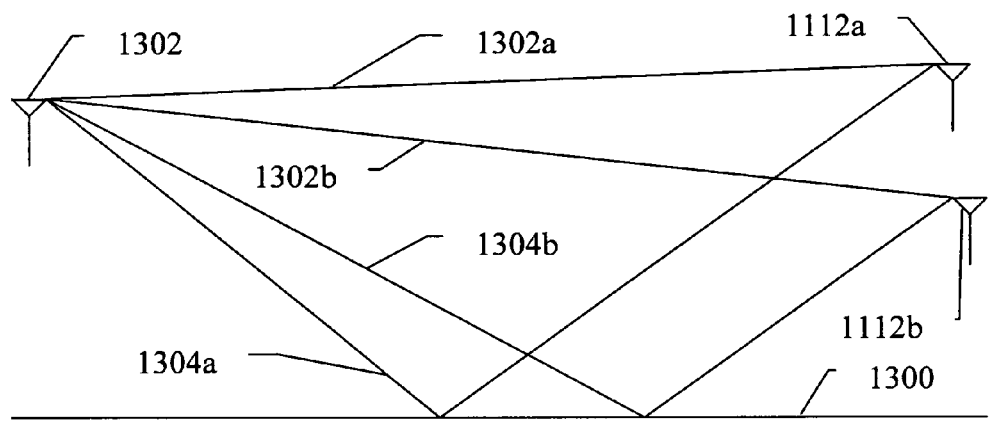

FIG. 7. Illustration of how the relationship between the delays on line-of-site and reflected paths differ depending upon the antenna location.

Figure 8:
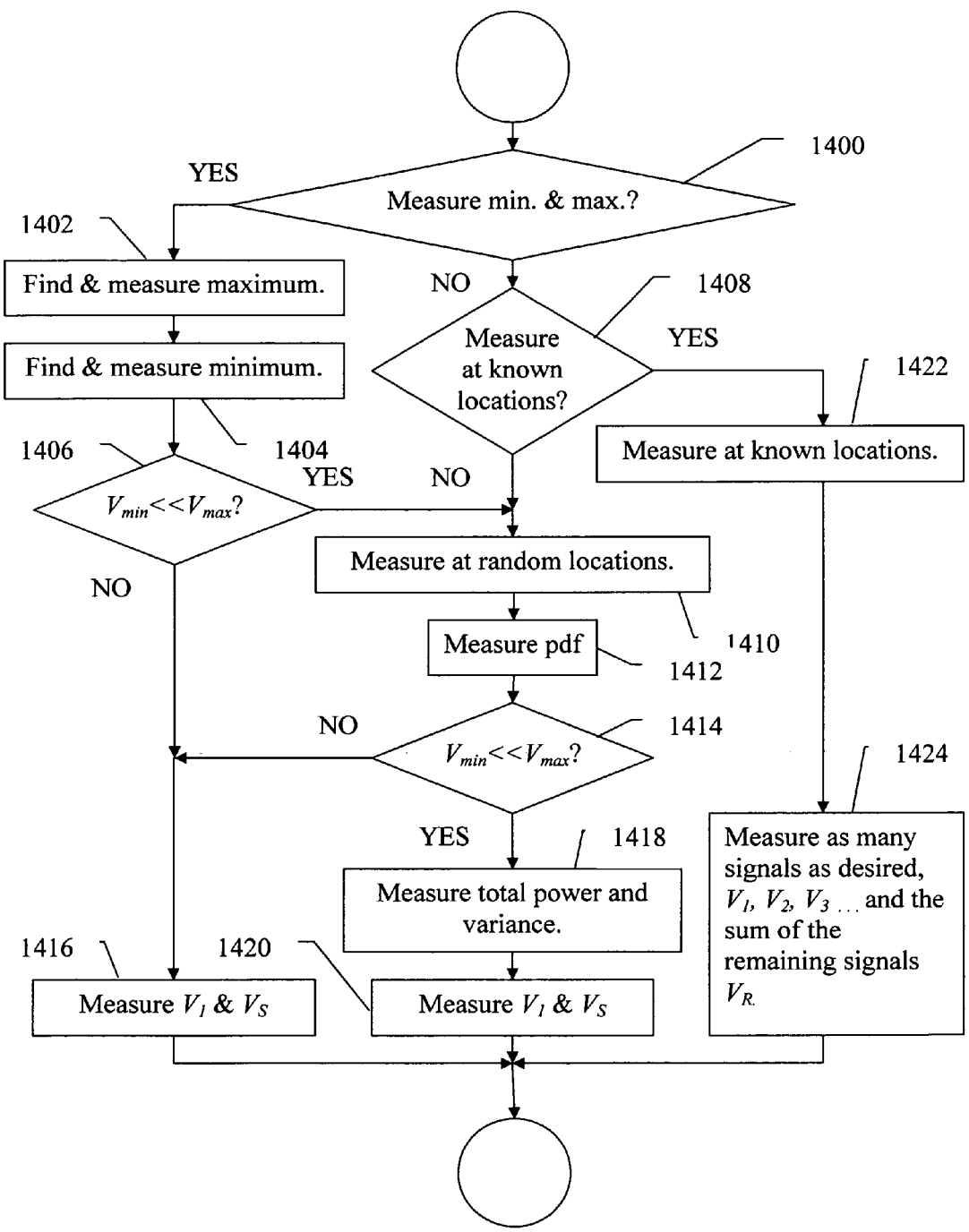

FIG. 8. Flow chart for measuring the strengths of signals that have traveled over multiple paths.

Figure 9:
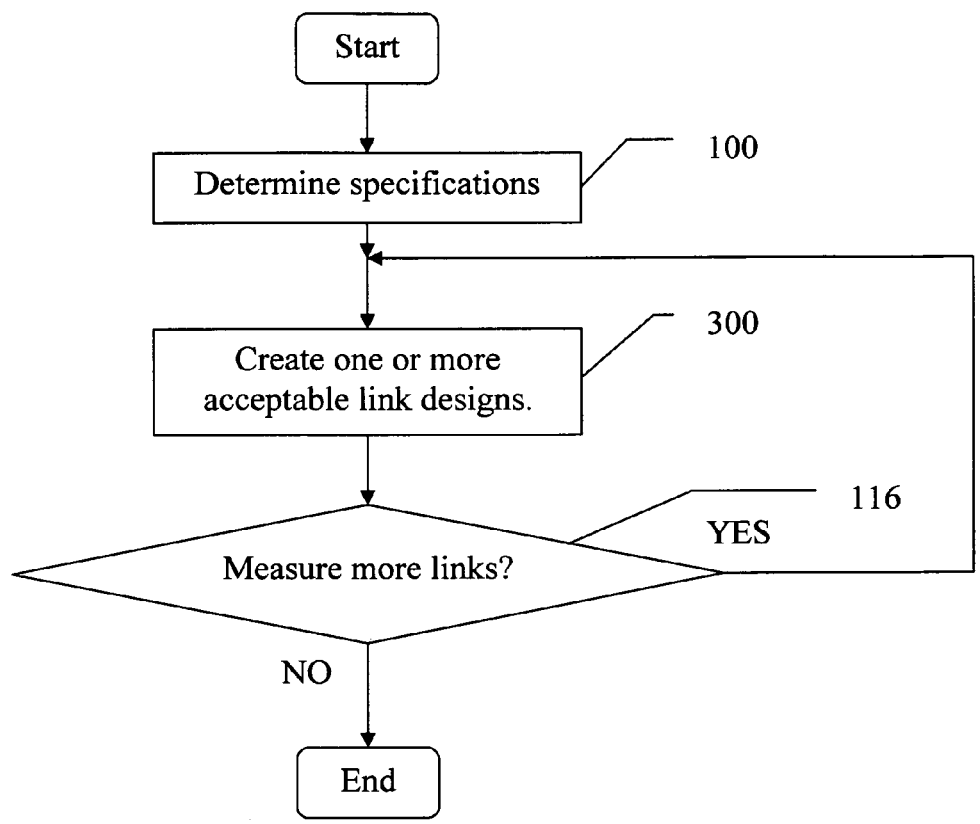

FIG. 9. Flow chart summary of communication measurement of the first embodiment.

Figure 10:
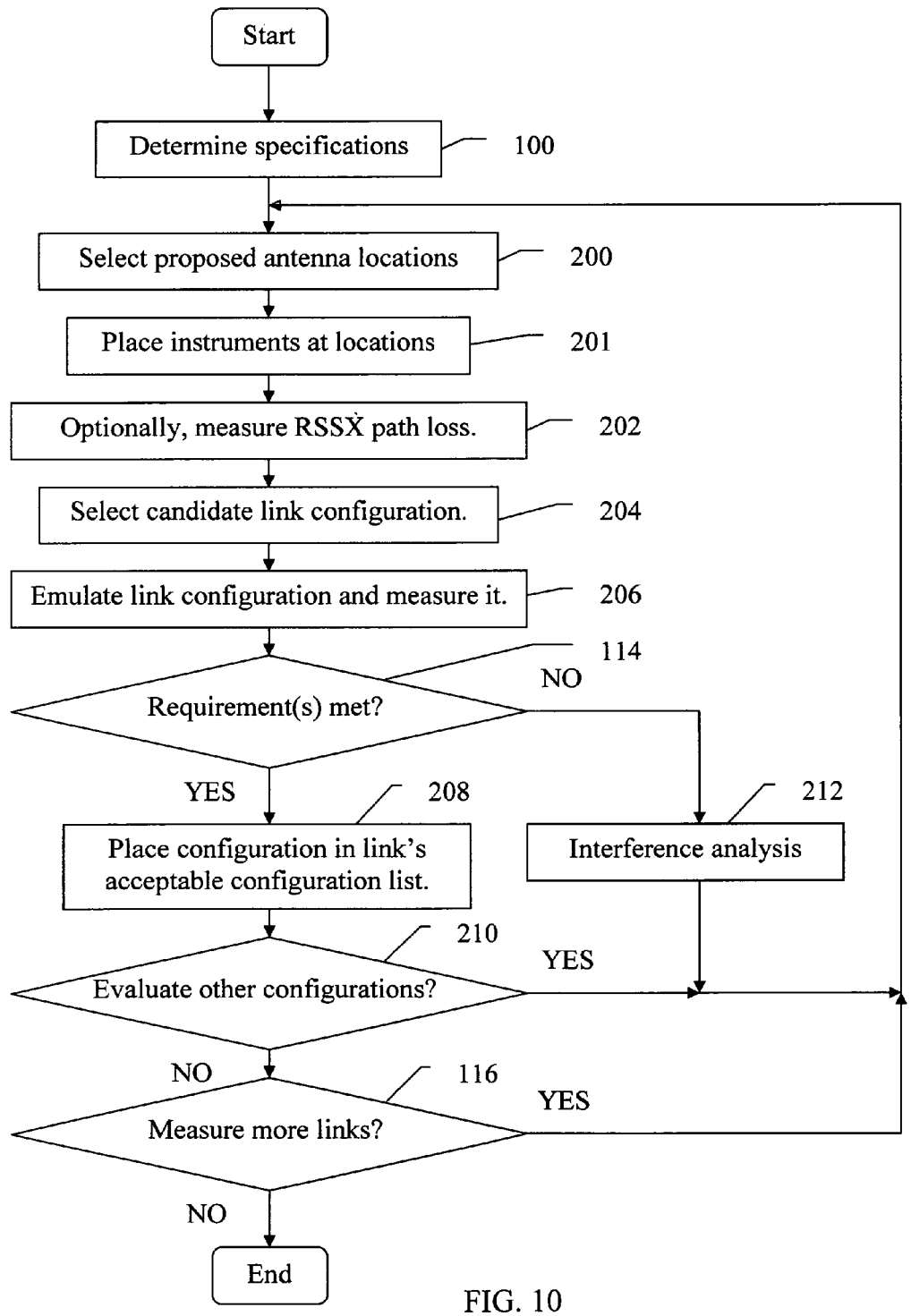

FIG. 10. Flow chart of first embodiment, installation designer.

Figure 11:
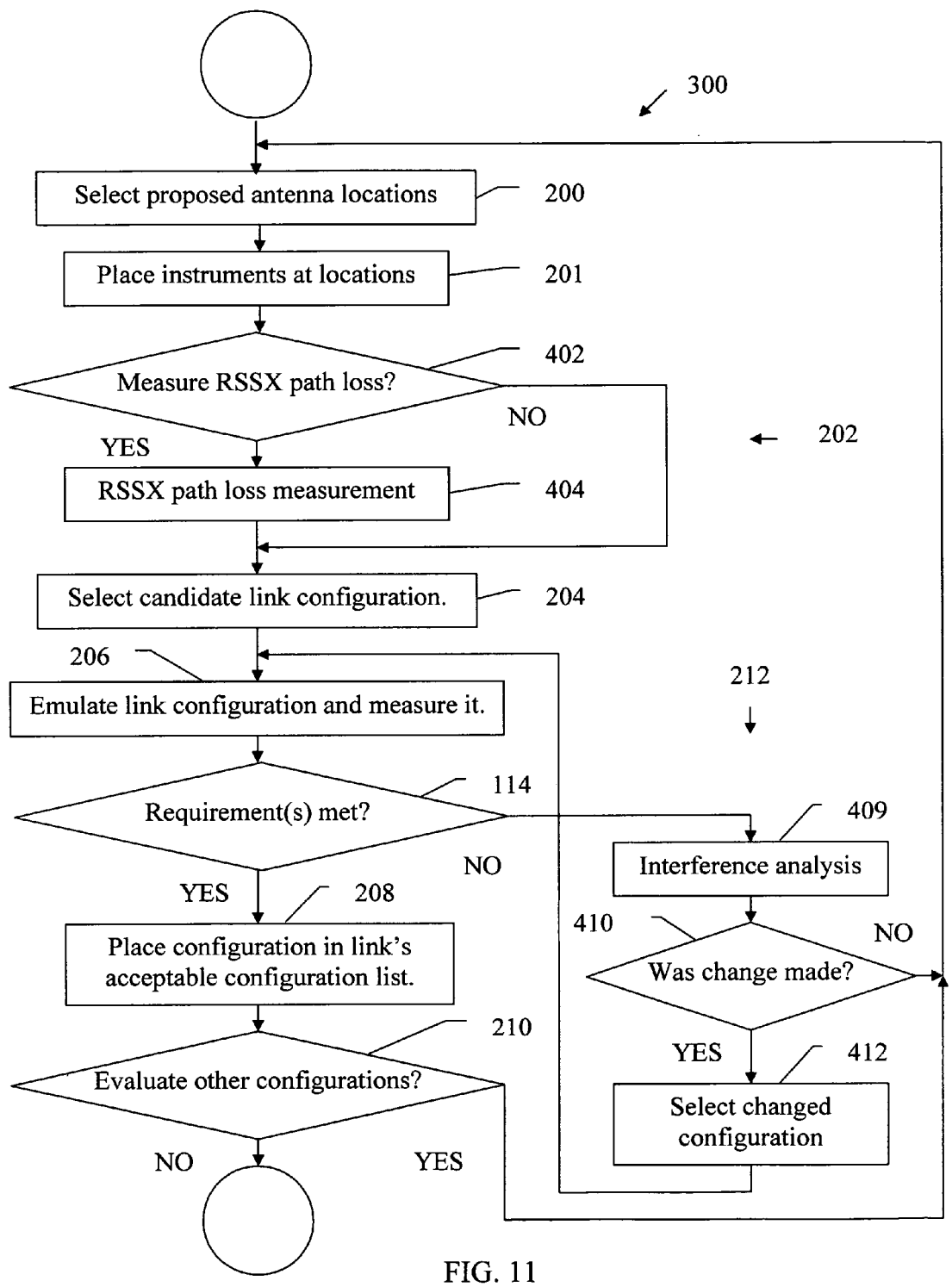

FIG. 11. Flow chart of first embodiment, link designer.

Figure 12:
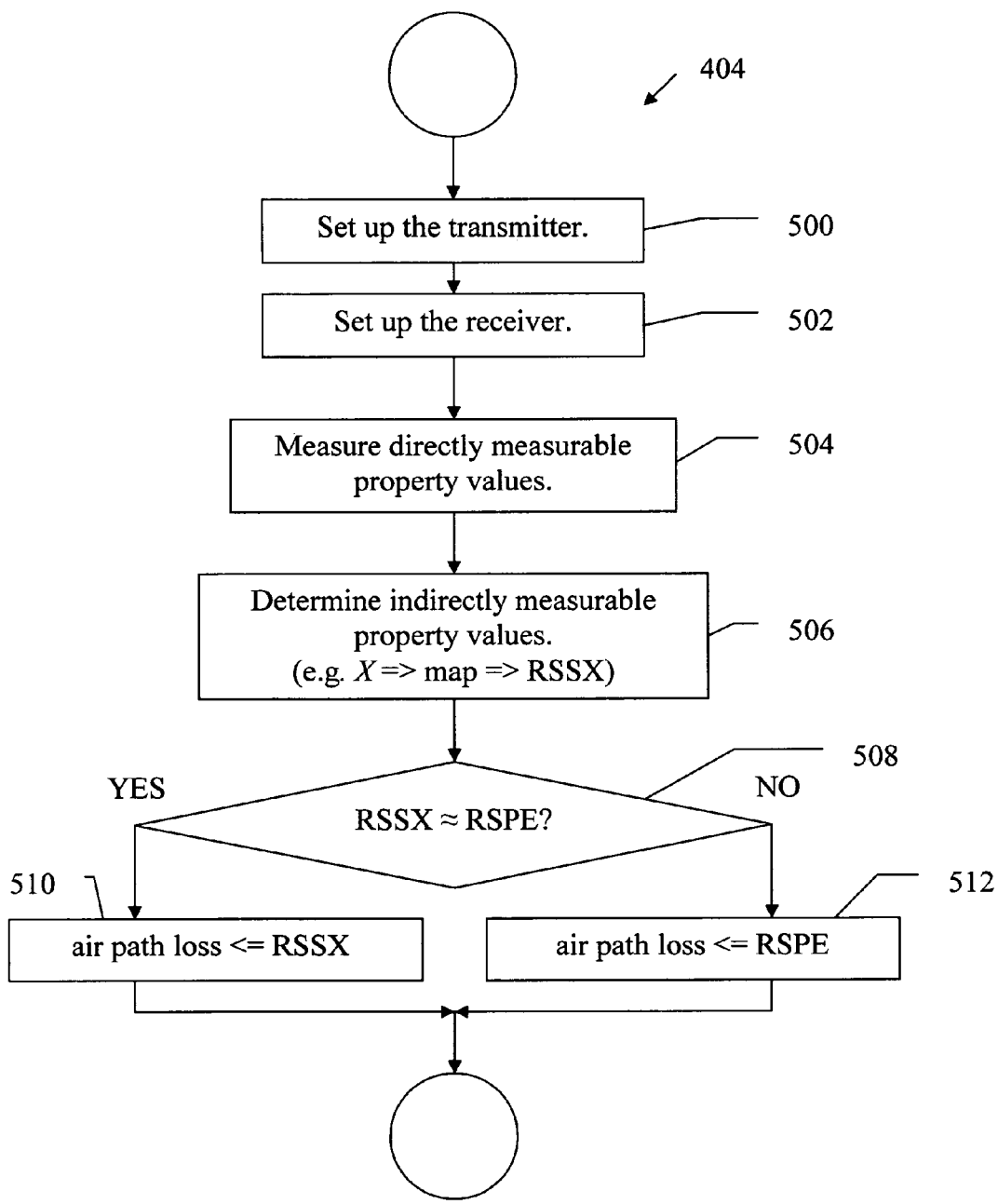

FIG. 12. Flow chart of first embodiment, air path loss measurement.

Figure 13:
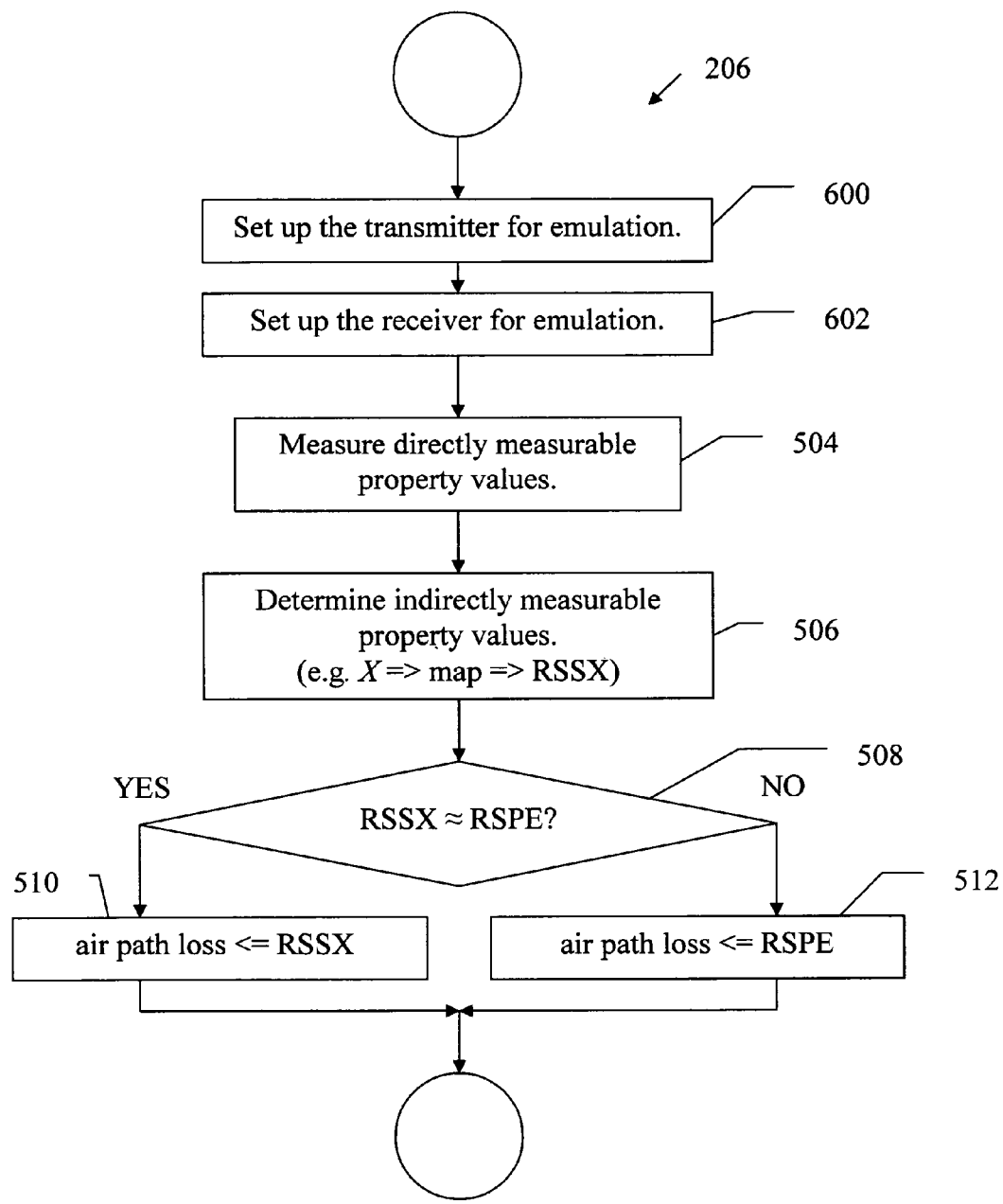

FIG. 13. Flow chart of first embodiment, emulated equipment measurement.

Figure 14:
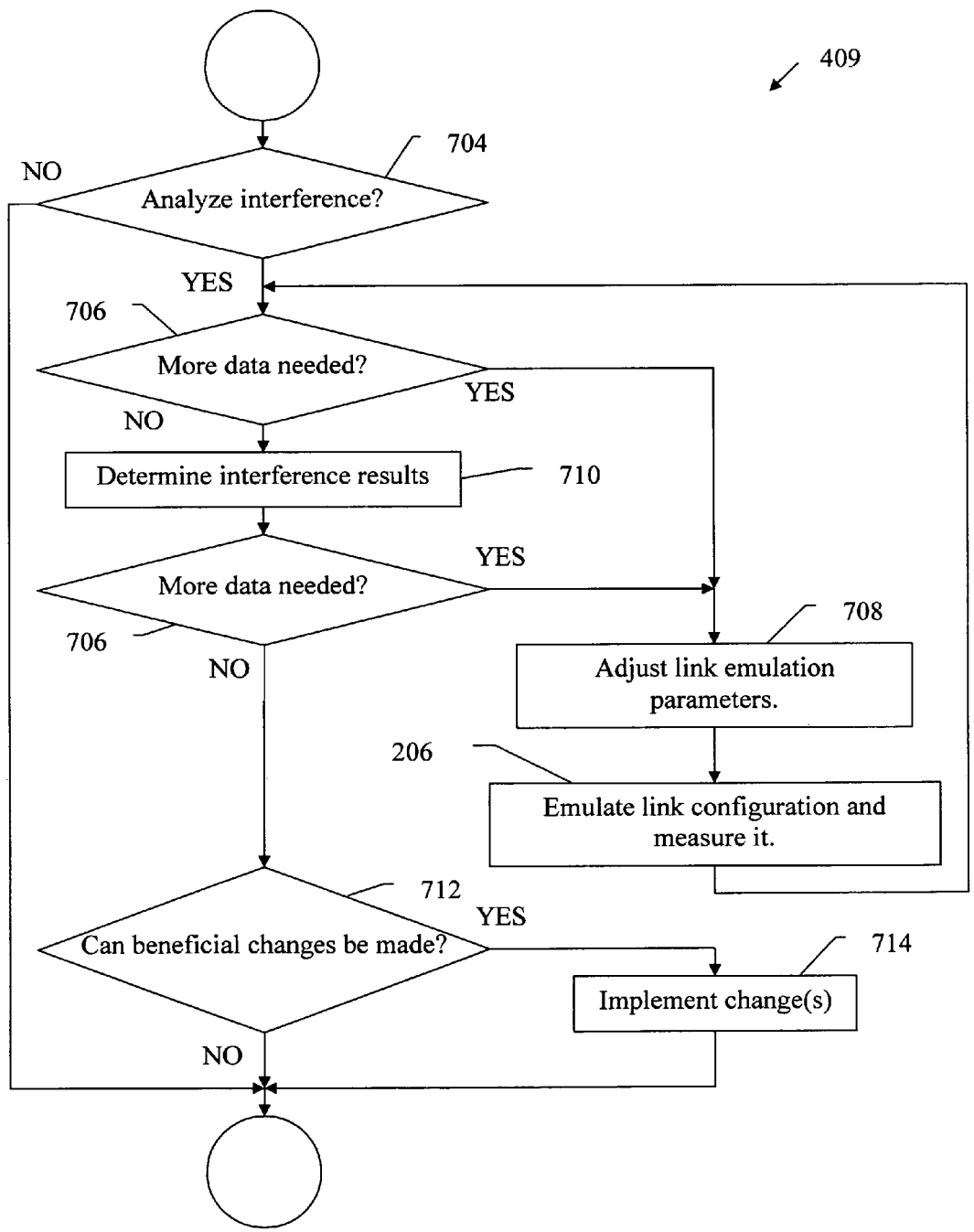

FIG. 14. Flow chart of first embodiment, interference analysis exploration.

Figure 15:
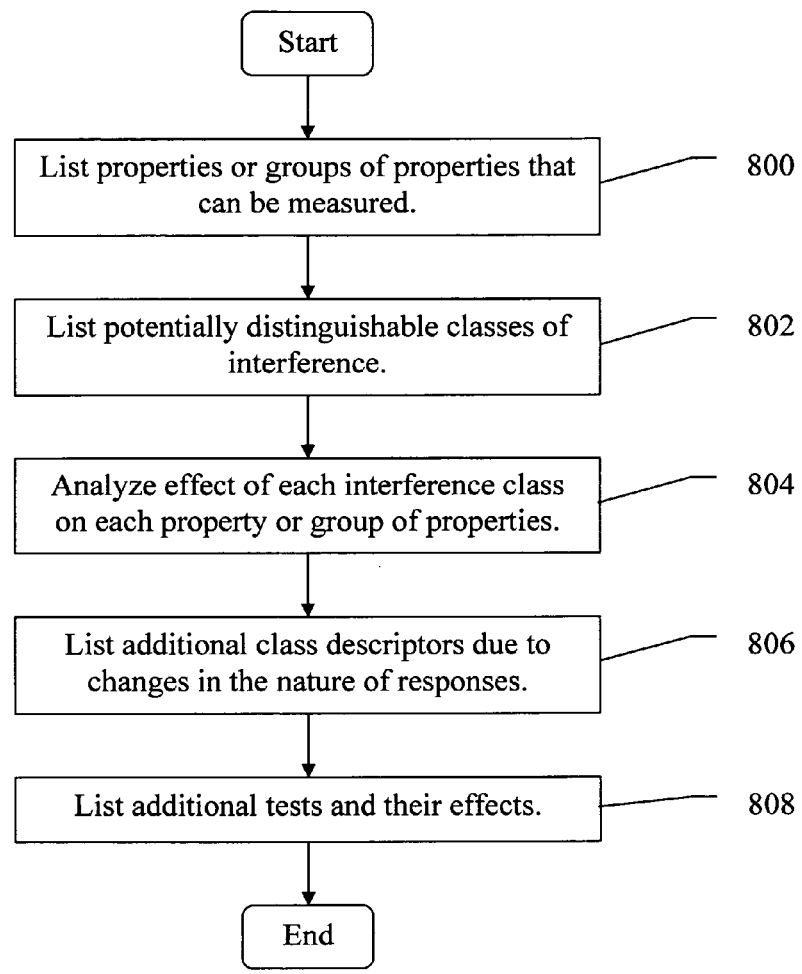

FIG. 15. Flow chart for identifying known interference responses.

Figure 16:
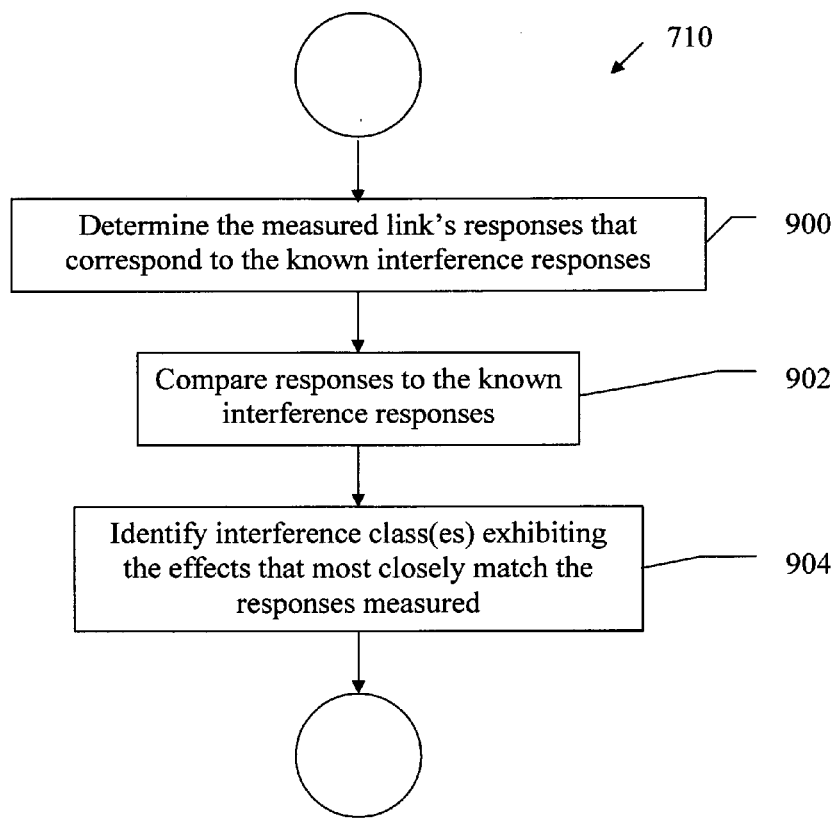

FIG. 16. Flow chart for identifying interference classes on a measured link.

Figure 17:
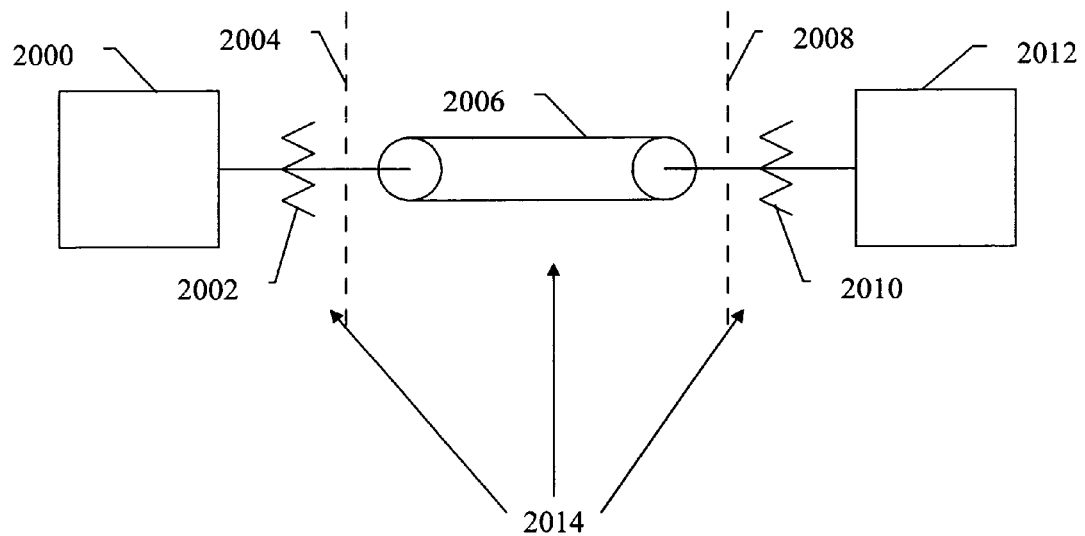

FIG. 17. Diagram of first embodiment of measurement apparatus for calibration of a receiver. Note that all components on the path between the attenuating devices 2002 and the 2012 are optional and the physical relationship of the attenuating devices to the shields are not determined. They can be on the port sides, on the inner (cable) sides, passing through the shield or distributed among those.

Figure 18:
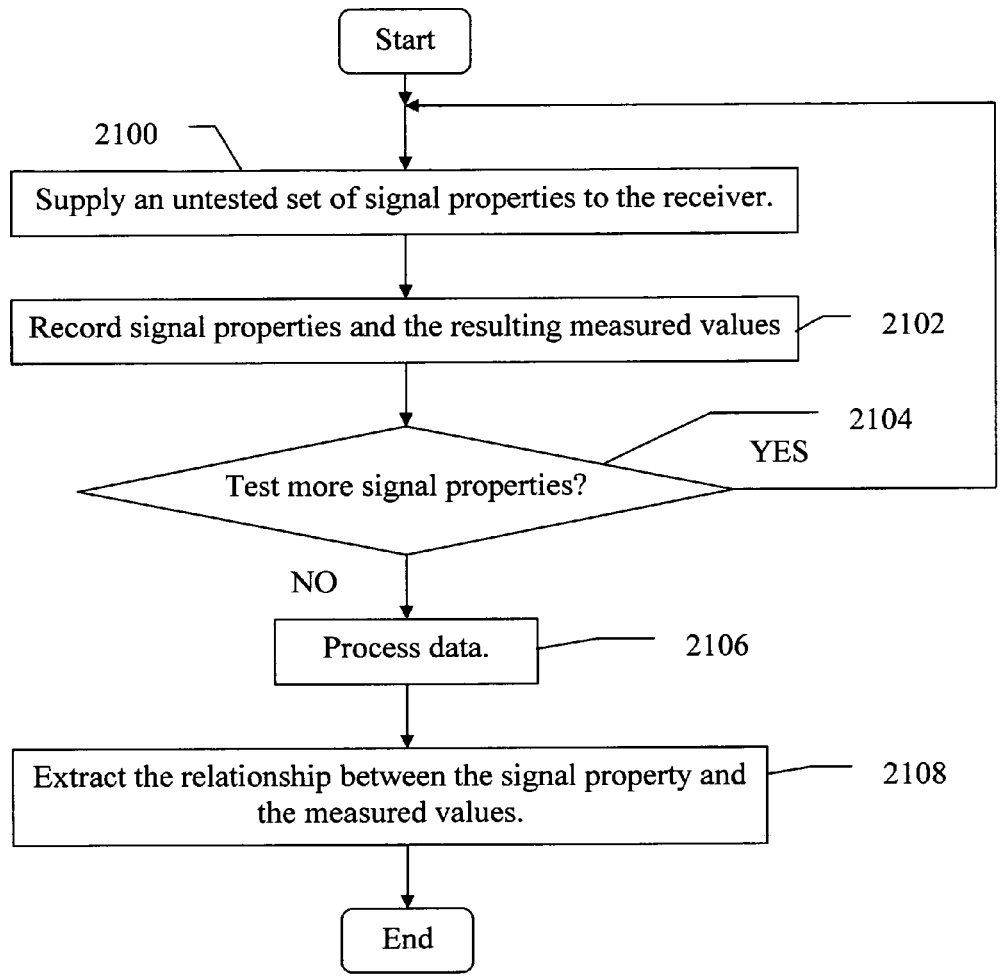

FIG. 18. Receiver calibration

Figure 19:
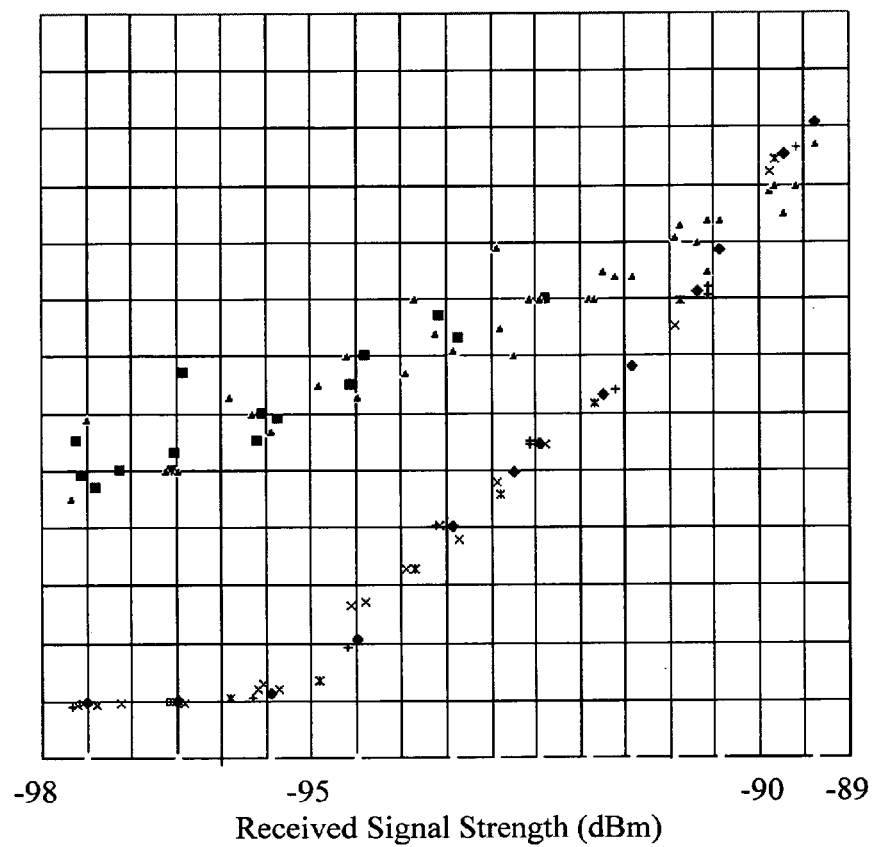

FIG. 19. Example of data recorded by the RECEIVER CALIBRATION procedure and apparatus. The x-axis shows the strength of the signal reaching the receiver in dBm. The upper band of points consisting of squares and triangles is RSSI divided by noise. The lower band of points shows saturated throughput.

Figure 20:
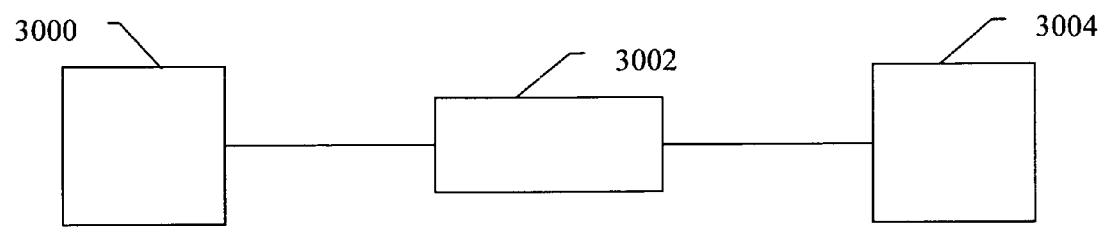

FIG. 20. Diagram of the first embodiment of a measurement apparatus for calibration of a weak signal source components using a signal source and a signal strength meter. The device under test can be null to calibrate the signal source.

Figure 21:
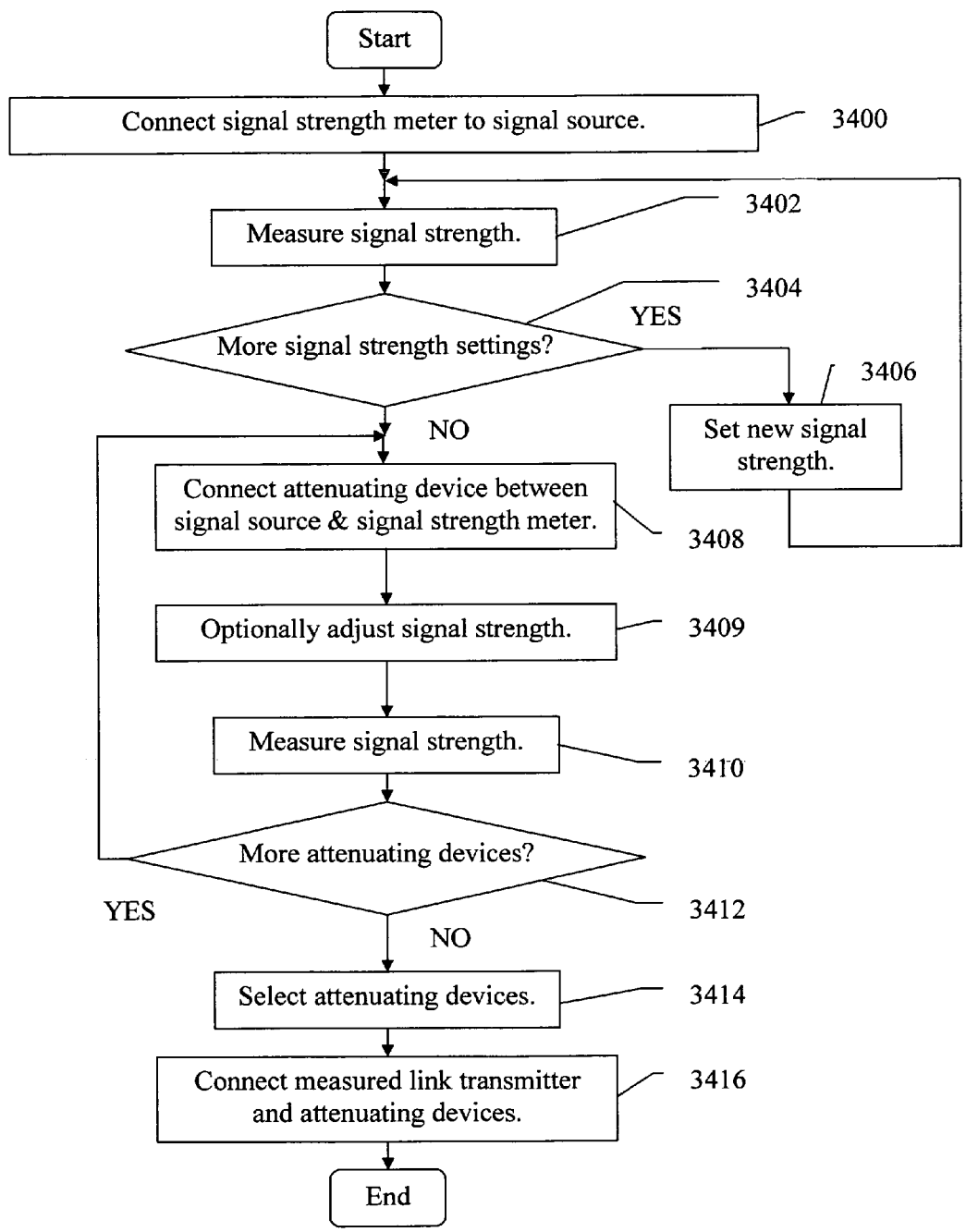

FIG. 21. Flow chart of the first embodiment of a measurement apparatus for calibration of a weak signal source using a signal source and a signal strength meter.

Figure 22:
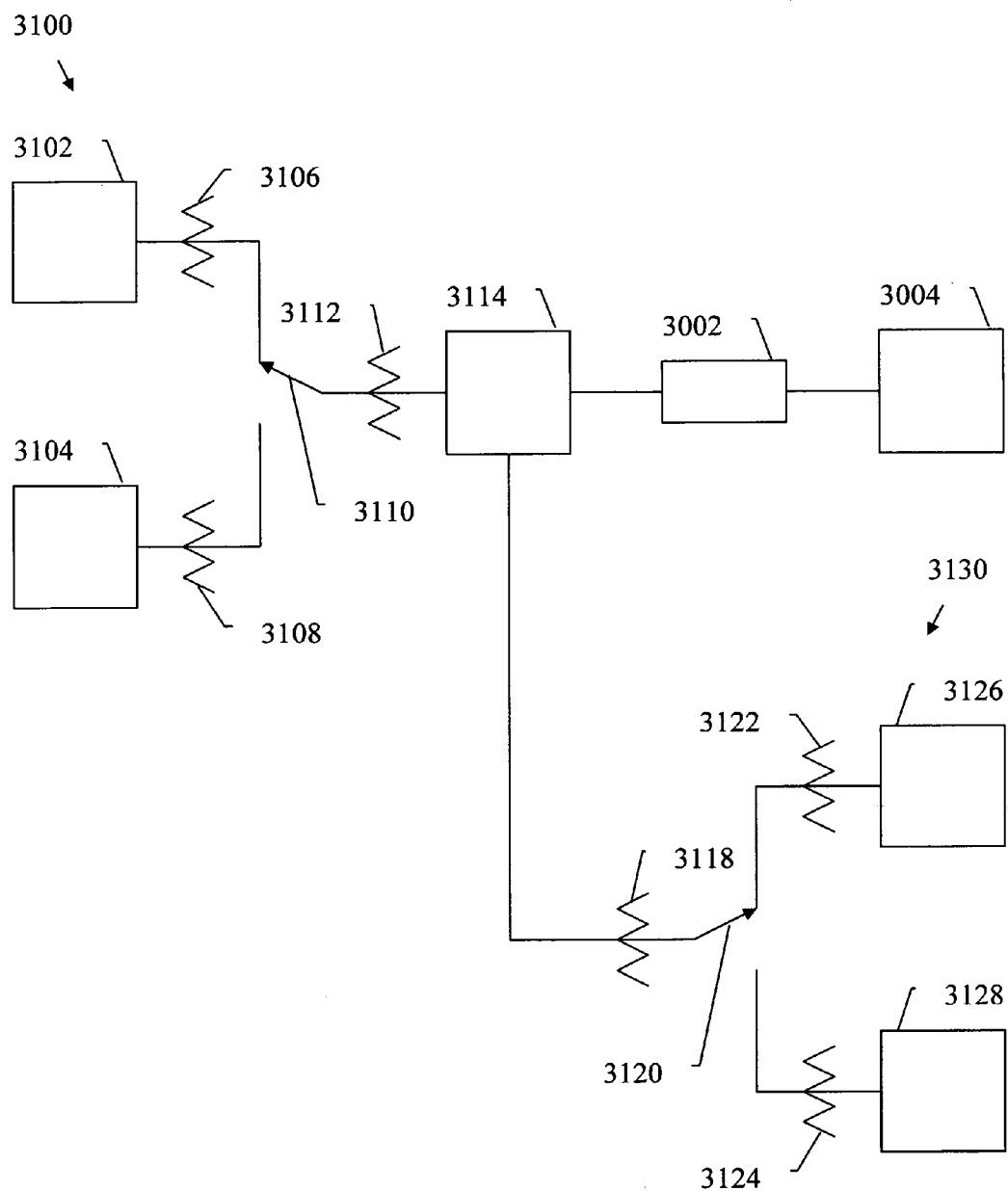

FIG. 22. Diagram of an alternative embodiment of a measurement apparatus for calibration of weak signal source components, using a signal source that uses a protocol that requires duplex communication.

Figure 23:
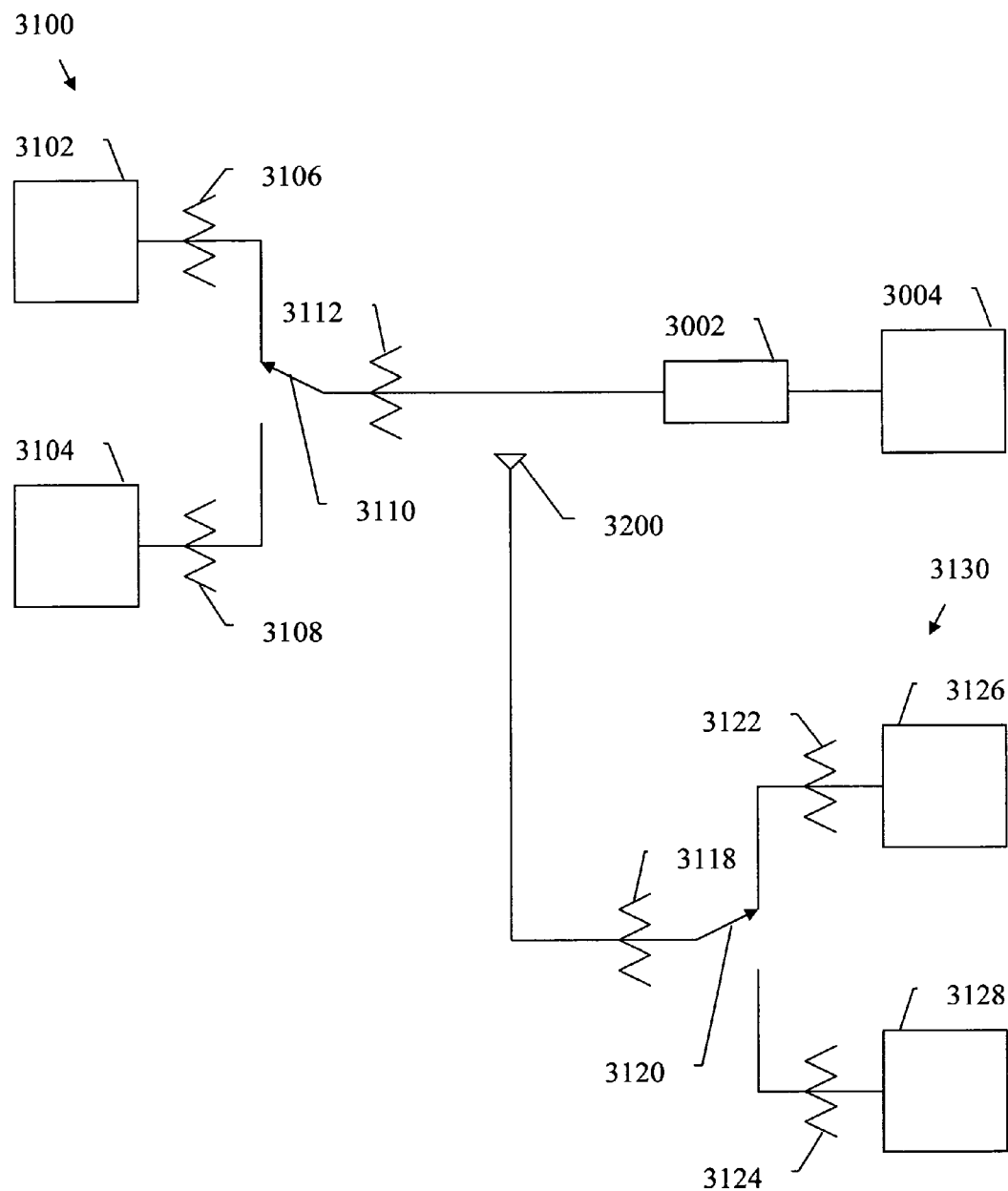

FIG. 23. Diagram of another alternative embodiment of a measurement apparatus for calibration of weak signal source components, using a signal source that uses a protocol that requires duplex communication.

Figure 25:
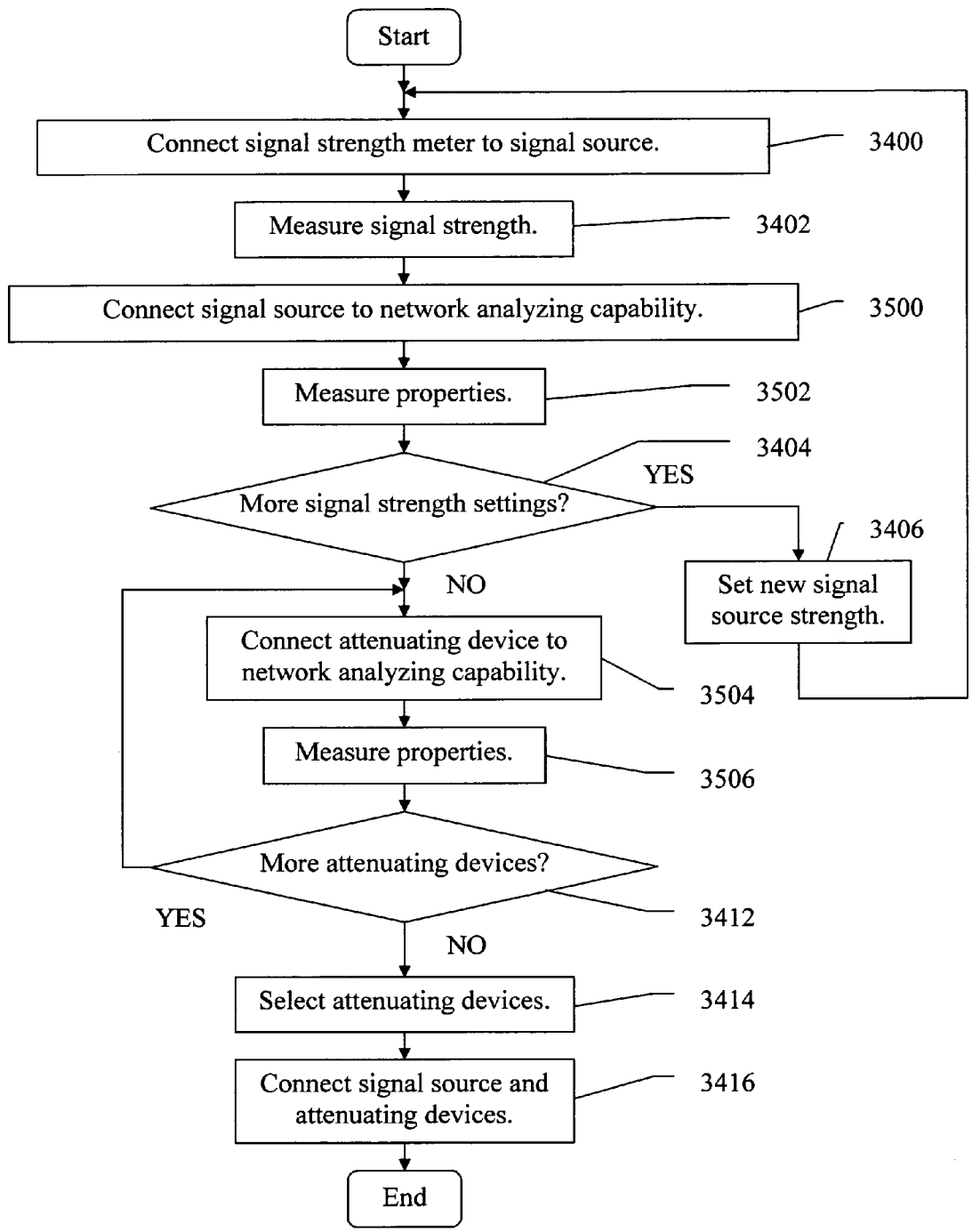

FIG. 25. Diagram of an alternative embodiment of a measurement apparatus for calibration of weak signal source components using a network analyzer.

Figure 24:
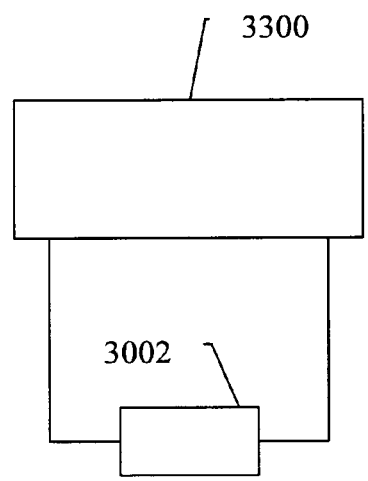

FIG. 24. Flow chart of alternative embodiments of a measurement apparatus for calibration of components for use in weak signal generation using network analysis capability and for the generation of those weak signals.

Figure 26:
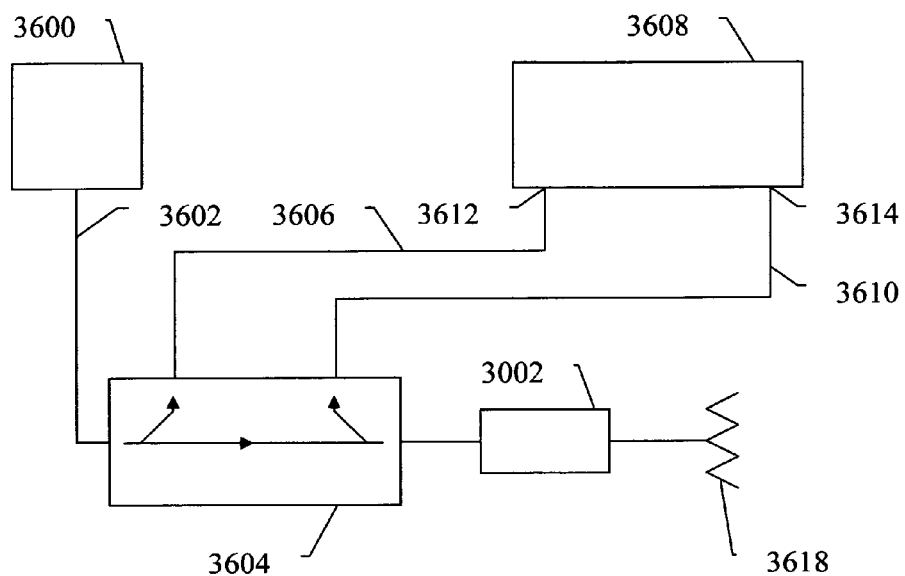

FIG. 26. Diagram of an alternative embodiment of a measurement apparatus for calibration of weak signal source components using network analysis capability based upon a vector voltmeter to measure reflected (mismatch) properties. (www.egr.msu.edu/~kempel/ECE435/tech.pdf)

Figure 27:
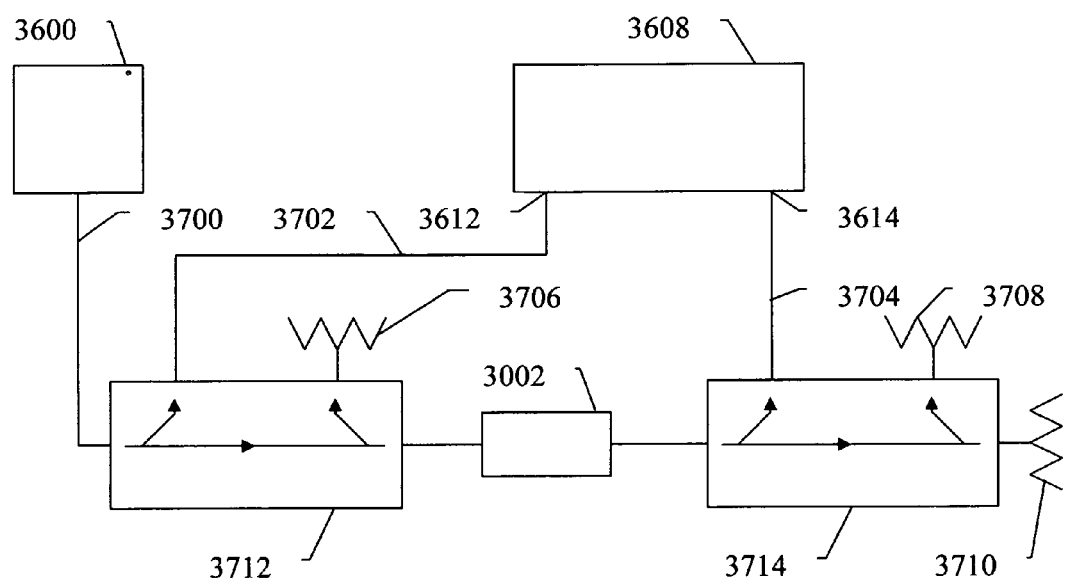

FIG. 27. Diagram of an alternative embodiment of a measurement apparatus for calibration of weak signal source components using network analysis capability based upon a vector voltmeter to measure transmitted properties. (www.egr.msu.edu/~kempel/ECE435/tech.pdf)

DRAWINGS

Reference Numerals

100 Determine what specifications are to be met by the installation and determine the requirements for link performance from these specifications.
102 Select the equipment (make and model) that will be used at each end of the proposed link. The equipment at opposite ends of the link may be different.
104 Propose a transmitter antenna location and receiver antenna location for the link that is to be measured.
106 Place one sample of each selected antenna at each end of the measured link. The selected equipment is usually placed nearby.
108 Chose whether signal strength or saturated throughput will be used for this measurement depending upon the (Prior Art) Procedure selected.
110 Measure signal strength.
112 Measure saturated throughput.
114 Is the requirement(s) for the measured link met? The requirement(s) are based upon the specification determined in 100 above.
116 Do more potential links (different locations) need to be measured?
200 Determine a transmitter antenna location and receiver antenna location for the link that is to be measured that offers a reasonable potential for advantage over configurations previously evaluated.
201 One communication measurement instrument is placed near each of the proposed end-points of the link.
202 Optionally measure RSSX air path loss
204 Select transmitter, receiver, transmitting antenna, and receiving antenna (and protocol settings if needed) for the candidate final installation link.
206 Emulate candidate final installation link configuration in a measurement of the link.
208 Place candidate final installation link configuration in that link's acceptable configuration list.
210 Are there other configurations for this link that should be evaluated?
212 Explore interference analysis.
300 Create one or more acceptable link designs.
402 In the surveyor's view is it advisable to make the RSSX air path loss measurement?
404 Perform RSSX air path loss measurement.
406 Select transmitter, receiver, transmitting antenna, and receiving antenna (and protocol settings if needed) for the candidate final installation link. The selection criterion is 409 Explore interference analysis.
410 Was a change made to reduce interference or its effects?
412 Select the changed configuration for subsequent emulation.
500 Set up the transmitter, usually maximizing the transmitter output and minimizing attenuation on its path.
502 Set up the receiver. Adjust receiver path attenuation so the received signal strength is well within the receiver dynamic range; thus, providing sufficient accuracy for a received signal strength measurement.
504 Measure directly measurable property values. Use may be made of the procedure described in Multi-Path Interference.
506 Determine indirectly measurable property values.
508 Are comparable property values close enough that they can be expected to be measurements of the same property?
510 Find air path loss from RSSX.
512 Find air path loss from RSPE.
600 Set up the transmitter for emulation.
602 Set up the receiver for emulation.
704 In the surveyor's view is it advisable to analyze interference?
706 Is more data needed to analyze interference?
708 Adjust link emulation parameters such as transmitter signal strength, and receiver and transmitter attenuating devices to explore the interference.
710 Determine interference results.
712 Can changes be identified that are likely to reduce interference or its effects?
714 Implement change(s).
800 List measured link properties or groups of closely related measured link properties that can be measured.
802 List potentially distinguishable classes of interference.
804 Analyze the response of each measured link property or group of measured link properties to each class of interference.
806 Record additional class descriptors due to changes in the nature of responses.
808 Identify other useful tests and analyze the effects of each.
900 From all of the data currently available, determine the measured link measurements corresponding to the known interference responses.
902 Compare measured link responses to known interference responses.
904 Identify the interference class descriptors exhibiting the responses that most closely match the responses measured.
1000 Measured link transmitter
1001 Communication measurement instrument that transmits on the measured link
1002 Measured link transmitter's attenuating device. Zero or more may be present.
1004 Measured link transmitter antenna
1006 Measured link receiver antenna
1008 Measured link receiver's attenuating device. Zero or more may be present.
1009 Communication measurement instrument that receives from the measured link
1010 Measured link receiver
1100 All, a portion of a communication measurement instrument transmitter or null.
1102 Optional switch function.
1104a-z All, a portion of a communication measurement instrument transmitter or null.
1106a-z Communication measurement instrument transmitter's attenuating device. Zero or more may be present.
1108a-z Transceiver switch function.
1110a-z Antenna's attenuating device. Zero or more may be present.
1112a-z Antenna.
1114a-z Communication measurement instrument receiver's attenuating device. Zero or more may be present.
1116a-z All, a portion of a communication measurement instrument receiver or null.
1118 Optional switch function.
1120 All, a portion of a communication measurement instrument receiver or null.
1200 Transceiver transmitting on the measured link and receiving on the backchannel.
1202 Measured link transmitter.
1204 Backchannel receiver.
1206 Measured link transmitter attenuating device. Zero or more may be present. As depicted here it may be the sum of a communication measurement instrument transmitter's attenuating device and an antenna's attenuating device as shown in FIG. 4.
1208 Measured link transmitter antenna. This antenna may also be used by the backchannel if the transceiver shares one antenna between the measured link and the backchannel.
1210 Communication medium, may be conductive or radiated.
1212 Measured link receiver antenna. This antenna may also be used by the backchannel if the receiver shares one antenna between the measured link and the backchannel.
1214 Measured link receiver attenuating device. Zero or more may be present. As depicted here it may be the sum of an instrument receiver's attenuating device and an antenna's attenuating device as shown in FIG. 4.
1216 Measured link receiver.
1218 Backchannel transmitter.
1220 Transceiver receiving on the measured link and transmitting on the backchannel.
1300 Reflector, depicted here as a surface.
1302a Direct path from measured link transmitter antenna 1004 to 1112a.
1302b Direct path from measured link transmitter antenna 1004 to 1112b.
1304a Reflected path from measured link transmitter antenna 1004 to 1112a.
1304b Reflected path from measured link transmitter antenna 1004 to 1112b.
1400 Initially seek the minimum and maximum
1402 Measure maximum
1404 Measure minimum
1406 $V_{min} \ll V_{max}$?
1408 Measure at precisely known locations?
1410 Measure at random locations which may be imprecisely known
1412 Measure the probability density of received signal strength
1414 $V_{min} \ll V_{max}$?
1416 Measure $V_I$ and $V_S$ using the bounded distribution model.
1418 Measure total power in the combined signals sampled and the variance
1420 Measure $V_I$ and $V_S$ using the Rician Model.
1422 Measure signal strength at precisely known locations.
1424 Separate the signals arriving on different directions
1500a-d Synthetic test data used to test a measured link
1502a-d Data containing useful information

1504*a-d* Time when one or more predetermined measured link measurement is being made
1506 A small volume of useful data has negligible effect on the predetermined measured link measurement
1508 Useful information is being transmitted at a time when the predetermined measured link measurement is not being made
1510 Synthetic test data is replaced by useful information
1512 Useful information is being transmitted on a separate channel
1600 Equipment
1602 Antenna radiating or receiving radio waves
1604 Materials having low to moderate dielectric coefficient
1606 Radio frequency absorbing materials
2000 Signal source, could be a transmitter.
2002 Attenuating devices. Zero or more may be present. They may be placed on either side of the shield, passing through it or more than one of the foregoing.
2004 Optional shield which may be a shielded room.
2006 Optional cable allowing physical separation of equipment.
2008 Optional shield which may be a shielded room.
2010 Attenuating devices. Zero or more may be present. They may be placed on either side of the shield, passing through it or more than one of the above.
2012 Measuring receiver
2014 Measured link
2100 Select output signal strength, attenuating devices, and other signal properties so as to provide an as-yet, untested set of signal properties to the measuring receiver 2012.
2102 Record signal properties and the resulting measured values.
2104 Are more signal properties to be tested?
2106 Process data.
2108 Extract a relationship between the signal property and measured values.
3000 Signal source
3002 Device under test. Usually an attenuating device in the broad sense of the term or null if the signal source itself is being tested.
3004. Signal strength meter.
3100 Transceiver function transmitting on the measured link and receiving on the backchannel.
3102 Protocol transmitter.
3104 Backchannel receiver.
3106 Measured link transmitter attenuating device. Zero or more may be present.
3108 Backchannel receiver attenuating device. Zero or more may be present.
3110 Source switch function.
3112 Source attenuating device. Zero or more may be present.
3114 Bifurcation Function.
3118 Destination attenuating device. Zero or more may be present.
3120 Destination switch function.
3122 Measured link receiver attenuating device. Zero or more may be present.
3124 Backchannel transmitter attenuating device. Zero or more may be present.
3126 Protocol receiver.
3128 Backchannel transmitter.
3130 Transceiver function receiving on the measured link and transmitting on the backchannel.
3200 Antenna or other pickup device.
3300 Network analyzer
3400 Connect a signal strength meter to a signal source.
3402 Measure the signal strength.
3404 Calibrate additional output signal strength options available from the signal source?
3406 Adjust the signal source to an as-yet uncalibrated signal strength.
3408 Connect one port of an attenuating device to a signal source and the other to a signal strength meter.
3410 Measure the signal strength (may benefit from adjusting signal source strength).
3412 Are there more attenuating devices to calibrate?
3414 Select attenuating devices.
3416 Connect measured link transmitter and attenuating devices to produce desired signal strength.
3500 Connect the measured link transmitter to a port of a network analyzing capability.
3502 Measure properties.
3504 Connect both ports of an attenuating device to the ports of a network analyzing capability.
3506 Measure properties (Among the properties measured are attenuation or properties from which it can be derived.)
3600 Signal generator
3602 50 Ohm coaxial cable
3604 Dual directional coupler
3606 50 Ohm coaxial cable
3608 Vector voltmeter such as Agilent (HP) 8508A
3610 50 Ohm coaxial cable
3612 Port A of the Agilent (HP) 8508A or equivalent
3614 Port B of the Agilent (HP) 8508A or equivalent
3618 50 Ohm matched load termination
3700 Connection to the signal generator 3600
3702 Connection to the port A of the Agilent (HP) 8508A or equivalent
3704 Connection to the port B of the Agilent (HP) 8508A or equivalent
3706 50 Ohm matched load termination
3708 50 Ohm matched load termination
3710 50 Ohm matched load termination
3712 Dual directional coupler
3714 Dual directional coupler

GLOSSARY

An absolute error bound is the largest error which can ever occur in a measurement within some reasonable constraints, such as while using equipment that is functioning properly. It is often desirable to design using absolute error bounds. Since any component that does not meet the absolute error bound has failed, the result of using absolute error bounds is that the design will work with any part that has not failed.

Air path loss is loss between antennas. (Loss as defined here is the reciprocal of gain, making it a number expected to be much greater than one or a positive number in dB.) It is usually defined in dB as the sum of the transmitter output signal strength and all the guided (e.g. coaxial and antenna) path gains less the received signal strength. (e.g. 36 dBm transmitter output signal strength −0.5 connector gain −2.0 dB coaxial cable gain +8.0 dB antenna gain +2.0 dB antenna gain −1.0 dB coaxial cable gain −0.5 connector gain—(−65 dBm received signal strength)=107 dB path loss.)

An antenna is any device used to convert electrical signals into electromagnetic waves and visa versa; thus, it includes, but is not limited to, probes, sensors, and conventional antennas.

An antenna radiation pattern is a representation of the far-field field strength produced by an antenna as a function of direction from the antenna. Because of reciprocity, it is also a representation of the sensitivity of the antenna as a function of direction from the antenna. "Antenna radiation pattern" refers to both.

An attenuating device is a component or combination of components that provides relationship between an input signal and an output signal wherein the output signal is weaker than the input signal. The components could be resistors, attenuating devices, cables or any other combination of elements that provides a net signal loss; thus, an attenuating device as described here can be a concatenation of elements that themselves fit this definition of attenuating device. In this paper, each setting of a step attenuator or variable attenuator will be treated as a separate attenuating device. It is worth noting that attenuation as described here occurs between two ports of the attenuating device and most attenuating devices have only two ports.

An automatic-gain-control parameter is anything that describes the' degree of gain-control being exercised. Most frequently this is a voltage, but digital and other representations can be used.

A backchannel is the simplex link communication in the opposite direction and between the same end-points as the link being measured with communication measurement instruments.

A bifurcation function is a function that bifurcates or splits a signal arriving on one path onto two paths. The signal on the two paths may differ in phase and amplitude. Common examples of components that implement bifurcation functions are splitters and couplers.

Candidate is a configuration or part of a configuration that is under consideration for inclusion in a wireless (radio) network design or is currently included in a wireless network. Examples of parts of configurations are:
transmitters;
receivers;
antennas;
equipment;
locations of antennas;
protocol settings; and
configuration settings.

A channel is characterized by having the ability to communicate information from one location to another and isolating the information which it carries from the information carried by other channels. Examples of channels include separate electrical connections (often in the form of twisted pairs of wire or coaxial cables), which isolate channels by using separate conductors and radio communications which isolate channels by using separate frequencies or orthogonal codes.

Channel rate is the rate at which the channel can send data assuming it could do so continuously. It is a characteristic of the channel or link and not of the protocols in use. It is closely related to the clock rate used for data bits.

A communication measurement instrument is an instrument that implements all or a part of the apparatus and procedure to measure characteristics of radiated waves described in this specification. It includes at least one of a measured link transmitter, or measured link receiver that uses at least one modulation scheme and protocol in common with another communication measurement instrument such that communication occurs successfully between them and they collectively or individually measure one or more properties of that communication or the signal carrying that communication.

A design decision is a decision expected to offer reasonable potential for advantage over previously examined alternatives based upon all of the information available at the time, by a person skilled in the art of designing radio communication installations.

A direct measurement of a property yields one or more values which are an approximation of the property function or value (e.g. signal strength or the number of packet failures may be measured directly.)

Dynamic range is the range of measured values over which a measurement is accurate enough to be useful.

An electrical connection in this paper may be realized in any manner that is capable of carrying electrical power. These include but are not limited to wire pairs, wires over ground planes, strip-line, micro-strip, coaxial cable, and waveguide Error is the difference between a property (which is exact) and a measurement of the property. It follows that error is also the difference between a function which is a property and a function which is a measurement of that property.

Indirect measurement occurs when one or more direct measurements are used to find a measured function or value of a property, an approximation of the property function or value. (e.g. a measurement of signal to noise ratio or of packet failure rate.)

An instrument is a piece of electronic equipment used for some measurement or experiment. To the extent that a candidate equipment can perform measurements or experiments, it too is an instrument.

An interference class is a class of interference which can be distinguished from other classes of interference by response(s) to interference in its class some of which differ from response(s) to interference in other classes.

An interference class descriptor describes an interference class.

An interference response characterizes the deviation from one another of one or more property values measured with interference and without interference.

An interference result is qualitative or quantitative information about the interference affecting communication on a specific measured link. The intent of discovering this information is usually to mitigate the effects of the interference or identify its source.

A known interference response is an anticipated or actual response of measured links to interference of a known class or classes.

A linear attenuating device is an attenuating device in the broad sense defined here that is linear, that is the output is (approximately) linearly proportional to the input.

A link is a simplex (unidirectional) communication connection from one location to another in an installation. Temporary links are also set up for the purpose of measurement such as in a site survey.

A map is any form of expressing a relationship between two properties that allows measurements of one property to be estimated (i.e. measured) or bounded from another. Common means of expressing this relationship include but, are not limited to:
a calculation;
a mathematical relationship;
a mathematical function;
a graph;
a table; or
any other form that can allow the value of a property to be estimated (i.e. measured) from a the value of another property.

Often, a map allows, under certain constraints, the value of a second property to be estimated from the value of a first property and vice-versa.

A measured link is the simplex link that is measured (usually with communication measurement instruments.) The term includes signal properties, interference properties, communication measurement instruments and their components, candidate equipment, and anything else that is associated with the simplex-link and affects communication on it.

A measured link property is any property of a measured link.

A measured link measurement is a measurement of the value of a measured link property. It is measured on the measured link. Examples include, but are not limited to, measurements of saturated throughput, and packet error probability. Measurements can be direct or indirect. In some cases measurements of the same property can be derived indirectly or directly from different direct measurements. An example is measuring received signal strength directly from RSSI and indirectly from saturated throughput. These are considered to be separate measurements.

A measured link receiver receives from the measured link transmitter over a measured link. It is often realized as a receiver in a communication measurement instrument. It uses least one modulation scheme and protocol in common with the transmitter such that communication occurs successfully. It is a protocol receiver that can also make measurements.

A measured link receiver must be of sufficiently stability and quality that adequately accurate measurements can be made. It can be implemented as:

a receiver (part of the embodiment in FIG. 2);

a transceiver (the alternative embodiment shown in FIG. 5, and among the embodiments shown in FIG. 4);

a signal analysis instrument (assuming it meets the measurement, modulation scheme and protocol criteria above);

candidate equipment, part of a wireless interfaces such as are intended to be used with computers; or any other devices capable of communicating with a measured link transmitter and capable of measurements.

As defined here. "measured link receiver" describes both communication and associated measurement functions. It may include the software and hardware functions for measurement capabilities. A sample capability is the ability of a measured link receiver, to measure received signal strength.

A measured link receiver's attenuating device is an attenuating device that is electrically connected to the receiving port of a measured link receiver.

A measured link receiver antenna is an antenna that is electrically directly or indirectly connected to the receiving port of a measured link receiver. In the event the receiver is part of a transceiver and the transceiver shares one antenna between the measured link and the backchannel, this nomenclature also suffices to identify it.

A measured link transmitter transmits to a measured link receiver over a measured link. It is often realized as a transmitter in a communication measurement instrument. It uses at least one modulation scheme and protocol in common with the measured link receiver such that communication occurs successfully. It is a protocol transmitter that can also participate in measurements when used with a measured link receiver.

A measured link transmitter must be of sufficient stability and quality that adequately accurate measurements can be made. It can be implemented as:

a transmitter (part of the embodiment in FIG. 2);

a transceiver (the alternative embodiment shown in FIG. 5, and among the embodiments shown in FIG. 4);

a signal generator;

part of a wireless interfaces such as are intended to be used with computers;

any other device capable of communicating with a measured link receiver.

As defined here, "measured link transmitter" describes both communication and associated measurement functions. It may include the software and hardware functions for measurement capabilities. A sample capability is the ability of a measured link transmitter, to take part in making a saturated throughput measurements.

A measured link transmitter's attenuating device is an attenuating device that is electrically connected to the transmitting port of a measured link transmitter.

A measured link transmitter antenna is an antenna that is directly or indirectly electrically connected to the transmitting port of a measured link transmitter. In the event the receiver is part of a transceiver and the transceiver shares one antenna between the measured link and the backchannel, this nomenclature also suffices to identify it.

A measured value is described as the "value of a measurement" in this Glossary.

A measurement is either a direct or indirect measurement. A generic description is important because the information available from one receiver as a direct measurement may only be available from another as an indirect measurement. (e.g. packet failure count vs. bit failure rate vs. saturated throughput.) By its nature, a measured value or function is an estimate or approximation of a property value or function.

A measuring receiver is a device that receives a signal and provides a means of measuring received signal strength either directly or indirectly. It provides at least two measured values that are distinguishable responses (e.g. if the received signal strength is greater than −90 dBm or less than −90 dBm.) Attenuating devices can be used to extend the range of measurement (its dynamic range) as needed; though, most receivers have a large number of distinguishable responses. A measuring receiver can be implemented as:

part of a transceiver;

a receiver;

a signal analysis instrument (for example a spectrum analyzer);

part of a wireless interfaces such as are intended to be used with computers;

any other devices capable of providing distinguishable responses to received signal strength.

Examples of properties that may be measured by measuring receivers include, but are not limited to:

Received Signal Strength Indicator;

channel rate selected by a multi-rate protocol;

automatic gain control voltage;

other automatic gain control parameter;

transfer properties;

and any other function of received signal strength.

As defined here, "measuring receiver" describes both communication and associated measurement functions. It may include the software and hardware functions for measurements capabilities including, but not limited to, those listed above.

A network analyzing capability is an instrument that can measure linear properties of an electrical circuit having a maximum of at least two ports. The properties usually describe the relationship between voltage and current on a single port (impedance), and voltage and current between two ports (trans-impedance); or properties from which these can be calculated. Example of instruments capable of making such measurements include, but are not limited to, network analyzers and vector voltmeters.

Noise is only relevant at the receiver. Because it is usually uncorrelated with signal at the receiver, its influence is usually in proportion to its power; thus, "noise" usually refers to received noise strength most conveniently expressed in terms of power.

Omnidirectional asymmetry is the degree to which an omnidirectional antenna gain deviates from uniformity in all directions in the plane of omnidirectionality (usually the H-plane.)

A packet, as used here, is any group of data bits that are transmitted together, regardless of the protocol layer; thus, the term packet encompasses packet, frame, media transfer unit, transfer unit. UDP packet. TCP packet, etc. The source and destination of the data bits is usually a higher layer in the protocol stack.

A packet success is defined as the recognition that a packet has been received correctly.

A packet failure is usually identified in wireless protocols by the lack of recognition that a packet has been received correctly, though in some protocols an explicit error notification occurs.

A parameter is an independent variable or a constant used to control a mathematical or physical function. It may also be measured, establishing a measured value for the parameter and by implication making it a property. A parameter may thus be a property but it need not be one.

A probabilistic error bound is that error bound beyond which events occur with some known and acceptably small probability. It is often desirable to design using an absolute error bound instead of probabilistic ones, but in some circumstances only a probabilistic error bound is available.

A property is a characteristic or quality of something. (In most usages in this paper it refers to a characteristic or quality of a signal.) Properties can be described by names (e.g. signal strength) or by values (e.g. 25 microwatts of signal strength) and the values can be referred to separately (see "value of a property" in this Glossary.) The values of properties can be approximated by measured values. Properties can also be described by functions. A function which describes a property can be approximated by a function or as values. Relationships that exist among properties also exist approximately between properties and measurements and among measurements. (e.g. If the width of a rectangle has a property value of one meter and its length has a property value of two meters, the area has a property value of two square meters. If the length of the same rectangle has is measured as 2.05 meters, the area has a measured value of 2.05 square meters.)

A property value is described as the "value of a property" in this Glossary.

A protocol receiver is a receiver that receives from the measured link. It is capable of receiving data when used to communicate with a protocol transmitter, and uses at least one modulation scheme and protocol in common with the protocol transmitter such that communication occurs successfully. Examples of protocol receivers include, but are not limited to:
part of a transceiver;
a receiver;
a signal analysis instrument (assuming it meets the modulation scheme and
protocol criteria above); and
part of a wireless computer interface (usually an implementation of receiver or transceiver)

A protocol transmitter is a transmitter that transmits on the measured link. It is capable of sending data when used to communicate with a protocol receiver, and uses at least one modulation scheme and protocol in common with the protocol receiver such that communication occurs successfully. Examples of protocol transmitters include, but are not limited to:
part of a transceiver;
a transmitter;
a signal generation instrument (assuming it meets the protocol criterion); and
part of a wireless computer interface (usually an implementation of transmitter or transceiver).

A radiated wave device is a device that generates waves to be radiated, receives waves that were radiated or both.

Received Signal Power (RSP) is the value of power measured in the received signal (or the means of measuring it.) Measurement of RSP is accomplished either directly or indirectly from measurements that are closely related to the strength of the signal received, such as its power, voltage, current, temperature change etc.; thus, RSSI and RSSI divided by noise power are examples of sources of RSP. RSP generally has a relationship to the measurements from which it is created that is no more complicated than a power relationship (constant exponent) if error sources are ignored; thus it often has a wide dynamic range. In contrast, RSSX can be highly nonlinear and have a much smaller dynamic range.

Received Signal Power Enhanced (RSPE) is the value of power measured in the received signal (or the means of measuring it.) Measurement of RSPE is based upon RSP measurements and possibly other information to provide a mapping to values expected to have greater accuracy than RSP.

Received signal strength is the strength of the signal received and may be measured by Received Signal Power, Received Signal Power Enhanced, Received Signal Strength Indicator, Received Signal Strength X or any other means of measuring the received signal strength.

Received Signal Strength Indicator (RSSI) is the value of power measured in the received signal as measured directly by any of several means commonly implemented (or the means of measuring it.)

Received Signal Strength X (RSSX) is the value of power measured in the received signal (or the means of measuring it) as measured indirectly by measuring any of several functions of power. Examples of such functions are included in the text. Generally, such measurements bear a less linear relationship to received signal power and have a smaller dynamic range than do those used for RSSI.

A requirement in its general sense is a condition that must be met for something else to exist. In this paper a more specific definition is also used. It is the value of a property that must be met for something else to exist, often to facilitate meeting a specification in which case it is often derived from one or more specifications. That derivation can be so direct that a specification can also be a requirement.

A response is the consequence of a stimulus, where a stimulus is defined by one or more parameters and/or properties or changes in the same. The consequence is evident in the values of one or more properties and can usually be seen in the measurement of those properties.

Saturated throughput is the throughput achieved by saturating the link or channel carrying the data. Saturation is accomplished by offering more data than the link is able to carry. This usually causes a channel to achieve its maximum throughput or close to it. Saturated throughput is often the property used in describing the performance required of a link. Saturated packet rate and saturated bit rate communicate essentially the same information as saturated throughput.

A saturated transfer property is a transfer property that applies to the transfer of data over a link that is saturated by a single data stream. Let the properties that are so defined include in the attempted and failure properties only that traffic which actually attempts transmission; thus, discouraged arrivals are not included. Using this definition many, but not all protocols, saturated transfer probabilities will have values or functions close to those of the corresponding transfer property.

Signal strength is a measurement of a wave or its direct consequences. A radiated wave is often characterized by its field strength in units such as volts per meter. An antenna converts that field strength into electrical power. If the sensitivity of that antenna is known in the direction of an arriving or departing wave, then field strength and electrical power are equivalent measurements in that it is possible to convert between the two. The most common antenna used for this conversion is a dipole and it is often assumed that the arriving wave comes from within the H-plane of the dipole (a plane that is the most sensitive direction.) Electrical power can be expressed in units such as watts. It is also common to express electrical power relative to some standard of comparison using the logarithmic unit of decibel (dB.) The standard of comparison most often used is one milliwatt; thus, decibels relative to a milliwatt (dBm) are used often to express electrical power. Power is a convenient way of quantifying signal strength because it can be used to characterize both radiated waves and those confined to electrical connections (wires, coaxial cable, waveguides etc.) Thus, signal strength can meaningfully be expressed in dBm or its equivalents.

A signal strength meter is any device capable of measuring the signal strength or amplitude of an electrical signal. As discussed under "signal strength" above, power is a useful means of expressing signal strength. If the impedance is known, then voltage and current express the same information; thus, devices that can be used as signal strengths include, but are not limited to:

vector voltmeters,
power meters,
power meters that can gate their measurement "on" and "off";
volt meters,
amp meters, and
oscilloscopes.

A simplex link is a link capable of carrying information (communication) from one location to another (the ends of the link.) It is the conceptual building block of the networks discussed here. In many instances communication is required in both directions between the ends of the link (a duplex link.) Conceptually, this is implemented as two simplex links carrying information in opposite directions.

A site survey is one or more measurements made in preparation for the final installation of communication equipment.

A specification is a property that describes what a device system etc. must or will do if it is performing properly.

A surveyor is a person who is making a measurement as part of the design of a wireless network, its extension or repair (e.g. as part of a site survey.)

A switch function is usually implemented by a device that effectively makes an electrical connection between two connections or ports to the exclusion of other connections or ports. The function can be realized by mechanical switches, electronic devices that approximate the function of the mechanical devices or any other means that performs an equivalent function. For convenience in discussing the switch function the definition has been extended to a transceiver switch function such as 1108 which can be implemented by simply connecting the receiver, transmitter and antenna paths together. For this to work, the impedance anomaly occurring because of the forked connection must be acceptable and the receiver input must be able to withstand the transmitter output signal strength. The prior is more likely at lower frequencies where the length of the connections to the switch are small compared to a wavelength, and the latter is more likely if the transmitter output signal strength is small.

Throughput is the rate at which usable data actually goes through the channel or link. It excludes at least data link layer overhead. The throughput is less than the channel rate because all of the overhead time used by the protocols to manage the channel is lost to the sending of usable data. When using most protocols, the throughput is dependent on the channel rate, used and specific characteristics of the data being sent. Note that in describing measured links, the link is shared only between the two ends of the link. This is analogous to what is sometimes called single-user throughput which may differ significantly from the throughput of many users of a single channel aggregated together.

A transfer property is any member of a set of properties such that the value of the transfer property, in concert with some other members of the set (and possibly other information such as the interval of time over which a measurement is made), can be used to derive many of the other members of the set much as is described in Measurement of the Signal Strength Received in Site Survey Procedure in OPERATION COMMUNICATION MEASUREMENT FIGS. 2-16. Transfer properties include, but are not limited to:

packet success count;
packet failure count;
packet attempt count;
packet success rate;
packet failure rate:
packet attempt rate;
packet success probability;
packet failure probability;
bit success count;
bit failure count;
bit attempt count;
bit success rate;
bit failure rate;
bit attempt rate;
bit success probability;
bit failure probability; and.
throughput (may be TCP, UDP, or any other protocol)

Note that transfer properties can be defined under many conditions including with the link or channel saturated with data from a single user; thus, transfer properties include saturated transfer properties.

A transceiver consists of three components, a receiver, a transmitter and some means of directing signals between the two and a third port that forms the external port of the transceiver. It can be realized with any grouping of the three components, usually as a single unit or as separate receiver, transmitter and switch function.

The value of a measurement (or measured value) is that value assigned to the property by a measurement. It is an estimate of the property value. It often takes the form of a single number. (e.g. signal strength was measured as 251 microwatts; approximately 5 packets were not received correctly; the temperature was measured as 301 degrees Kelvin.)

The value of a property (or property value) is that value that would be assigned to the property by an error free measurement. It often takes the form of a single number. (e.g. signal strength was 250 microwatts; 6 packets were not received correctly; the temperature was 301.23 degrees Kelvin.) Property values are usually not known exactly.

DETAILED DESCRIPTION

The DETAILED DESCRIPTION consists of three parts. The first is a COMMUNICATION MEASUREMENT capability. It can benefit greatly from the second part which describes a RECEIVER CALIBRATION capability. The RECEIVER CALIBRATION capability has application beyond COMMUNICATION MEASUREMENT. RECEIVER CALIBRATION can benefit greatly from the third part which describes a WEAK SIGNAL GENERATION capability. The WEAK SIGNAL GENERATION capability has application beyond RECEIVER CALIBRATION.

DETAILED DESCRIPTION

First Embodiment—FIG. 2 Communication Measurement

FIG. 2 shows two communication measurement instruments as used when measuring. Communication measurement instrument 1001 consists of a measured link transmitter 1000 electrically connected to a concatenation or zero or more measured link transmitter's attenuating devices 1002 which is electrically connected to a measured link transmitter antenna 1004. The measured link transmitter antenna 1004 is located where it can connect by radiated waves to a measured link receiver antenna 1006. Communication measurement instrument 1009 consists of the measured link receiver antenna 1006 electrically connected to a concatenation or zero or more measured link receiver's attenuating devices 1008 which is electrically connected to a measured link receiver 1010.

Any electrical connections in this paper may be realized in any fashion that is capable of carrying electrical power of the frequencies that are to be used. These include, but are not limited to:
  wire pairs;
  wire over ground plane;
  strip-line;
  micro-strip;
  coaxial connection; and
  waveguide.

As a practical matter, particularly when equipment is portable, some structures may be needed to protect the communication measurement instrument and to hold it together as shown in FIG. 3. To minimize the influence of reflected radio frequency waves, it is often desirable to use non-conductive materials having low or modest dielectric constants for that purpose (1604). For the same reason it may be desirable to place radio frequency absorbing materials (1606) between the equipment (1600) and the antenna (1602).

Communication Measurement Instrument Criteria

Both the measured link transmitter 1000 and measured link receiver 1010, and their functional equivalents mentioned subsequently, have the capability of transferring data and use mutually compatible modulation schemes and protocols. They must be of sufficient stability and quality that adequately accurate measurements can be made. They can be implemented as:
  a transmitter-receiver pair (as in this embodiment, FIG. 2);
  transceivers (as in the alternative embodiment shown in FIG. 5, and among the embodiments shown in FIG. 4);
  a transmitter (as a transmitter);
  a receiver (as a receiver);
  a signal generator as a transmitter;
  a signal analysis instrument (assuming it meets the measurement, modulation scheme and protocol criteria above)) as a receiver;
  wireless internal computer interfaces (usually an implementation of a transmitter, receiver or transceiver on a circuit card that can be placed inside or partially inside a computer);
  wireless external computer interfaces (usually an implementation of a transmitter, receiver or transceiver) external to the computer, such as might be connected by IEEE 802.3, universal serial bus, USB, or some other means); or
  any other devices capable of meeting the criteria above in this section.

The measured link receiver 1010 is a measuring receiver and as such must also provide a means of measuring measured link properties including received signal strength. Some of these properties are necessarily measured directly, others may be measured indirectly using properties measured directly. Usually, this takes the form of some mechanism to measure the received signal strength directly (often called a "Received Signal Strength Indicator" or RSSI) and provide it to the surveyor. A noise measurement is also often available and useful as will be seen. Examples of measured link properties that provide a means for making indirect measured link measurements of received signal strength include, but are not limited to:
  channel rate selected by a multi-rate protocol;
  automatic gain control voltage;
  other automatic gain control parameter; and
  transfer properties.

The receiver must provide at least two distinguishable measured values in response to two distinguishable property values (e.g. if the received signal strength is greater than −90 dBm the response is different from the response if it is equal to or less than −90) since the attenuating devices can be used to extend the range of measurement (its dynamic range) as needed. Most receivers, however, have a large number of distinguishable measured values.

The accuracy of the measurements that can be made comes from both the communication measurement instrument 1001 and communication measurement instrument 1009 or their functional equivalent in any embodiment. Each element of communication measurement instrument 1001 and communication measurement instrument 1009 has a degree of accuracy that is:
  fundamental to its design;
  selected according to screening measurements; or
  established by measurements made after manufacture (calibrating measurements), and as is evident from Prior Art Error Analysis, these errors must be kept acceptably small. The third option for establishing accuracy is discussed further in RECEIVER CALIBRATION.

There are advantages to each of these determinants of accuracy. Accuracy that is fundamental to a design, usually results in lower cost when manufactured in moderate or large numbers. Accuracy that is established by selection according to screening measurements allows greater accuracy than that provided by a design alone, at a greater cost. Measurements made after manufacture usually provide the greatest accuracy of the options presented here. For them accuracy is limited by the stability rather than accuracy of the device and the accuracy of the calibrating measurements.

The antennas used deserve special note. Their gain in all directions that will be used should be known with sufficient accuracy that the transmitted field strength and received sensitivity to field strength are accurate enough to meet the needs to the measurement.

In an embodiment of a communication measurement instrument, transmitter and receiver functions can be embodied in several ways. There is a functional equivalency among those ways that a receiver can be embodied (including but not limited to embodiment in a transceiver) and among those ways that a transmitter can be embodied (including but not limited to embodiment in a transceiver).

DETAILED DESCRIPTION

Alternative Embodiment—FIG. 4 Communication Measurement

FIG. 4 shows a superset of elements that may be used to implement a communication measurement instrument. It consists of an optional complete or partial communication measurement instrument transmitter 1100 electrically connected to an optional switch function 1102 which selects among electrical connections to zero or more optional complete or partial communication measurement instrument transmitters 1104. At least one complete communication measurement instrument transmitter is formed by the pieces implemented if a transmitter is present. The complete or partial communication measurement instrument transmitters 1104 are electrically connected individually to a concatenation or zero or more communication measurement instrument transmitter's attenuating devices 1106, (i.e. complete or partial communication measurement instrument transmitter 1104a is connected to communication measurement instrument transmitter's attenuating device 1106a, complete or partial communication measurement instrument transmitter 1104b is connected to communication measurement instrument transmitter's attenuating device 1106b, etc.) The communication measurement instrument transmitter's attenuating devices 1106 are electrically connected individually to zero or more optional transceiver switch functions 1108. The transceiver switch functions 1108 are electrically connected individually to a concatenation or zero or more antenna's attenuating devices 1110, which are electrically connected individually to one or more antennas 1112. The transceiver switch functions 1108 are also electrically connected individually to a concatenation or zero or more receiver's attenuating devices 1114, which are electrically connected individually to zero or more complete or partial communication measurement instrument receivers 1116. The complete or partial communication measurement instrument receivers 1116 are electrically connected individually to connections on an optional switch function 1118 which selects among the connections to connect electrically to a complete or partial communication measurement instrument receiver 1120. At least one complete communication measurement instrument transmitter or receiver is formed by the pieces implemented.

This superset is sufficient to implement any of its structures as transceivers as shown, transmitters by exclusion of transceiver switch function 1108 and the optional receive elements or as receivers by exclusion of transceiver switch function 1108 and the optional transmit elements. Sometimes, the transceiver switch function 1108 can be implemented by simply connecting the receiver transmitter and antenna paths together and the definition of switch function in the GLOSSARY shows this extended implementation. The resulting structures include:

switched as shown (or where optional complete or partial communication measurement instrument transmitter 1104 and/or optional complete or partial communication measurement instrument receiver 1116 are absent);

fully parallel by exclusion of complete or partial communication measurement instrument transmitter 1100, switch function 1102, switch function 1118, and complete or partial communication measurement instrument receiver 1120. Each communication measurement instrument transmitter 1104 must be complete (if present) and communication measurement instrument receiver 1116 must be complete (if present); or simple by exclusion of switch function 1102, complete or partial communication measurement instrument transmitter 1104, complete or partial communication measurement instrument receiver 1116, and switch function 1118. Each communication measurement instrument transmitter 1100 must be complete (if present) and communication measurement instrument receiver 1120 must be complete (if present) and only one antenna (with associated paths) is used.

The same criteria described in DETAILED DESCRIPTION—FIRST EMBODIMENT—FIG. 2, Communication Measurement Instrument Criteria also apply to the composite communication measurement instrument transmitters (complete or partial communication measurement instrument transmitter 1100 with complete or partial communication measurement instrument transmitters 1104) and the composite communication measurement instrument receivers (complete or partial communication measurement instrument receivers 1116 with complete or partial communication measurement instrument receiver 1120) which are functional equivalents of measured link transmitter 1000 and measured link receiver 1010.)

DETAILED DESCRIPTION

Alternative Embodiment—FIG. 5 Communication Measurement

Similarly FIG. 5 shows two communication measurement instruments implemented with transceivers or their functional equivalent and is an extension of the designs shown in FIG. 4 to a backchannel that is not shared with the measured link. A transceiver 1200 consists of a measured link transmitter 1202 and a backchannel receiver 1204. The measured link transmitter 1202 is electrically connected to a concatenation of zero or more measured link transmitter attenuating devices 1206 which is electrically connected to a measured link transmitter antenna 1208. Similar to measured link transmitter antenna 1004, the measured link transmitter antenna 1208 is located where it can connect by radiated wave to a measured link receiver antenna 1212. The measured link receiver antenna 1212 is electrically connected to a concatenation of zero or more measured link receiver attenuating devices 1214 which is electrically connected to a measured link receiver 1216. The measured link receiver 1216, along with a backchannel transmitter 1218, comprise a transceiver 1220.

Transceivers also implement a backchannel which, in this case, can be almost any electronic communication medium 1210. The communication medium 1210 is electrically connected to the backchannel receiver 1204 and to the backchannel transmitter 1218. Examples of that communication medium 1210 include, but are not limited to, any electrical connection and any radiated connection. If the backchannel antennas are physically far separated from the measured link antennas or if the frequencies used by the backchannel are well separated from the frequencies used by the measured link, it is often possible to run the transmitter and receiver at the same time in the same transceiver (full duplex operation, as opposed to the half-duplex operation mentioned subsequently) and advantage can be gained from fully separate connections to the transmitters and receivers. Protocols built on a full duplex connection are simpler, requiring no turn-around capability, and use of the time taken in turning half duplex links around and the time taken to transmit data in the opposite direction, can be used by data on the measured link if it is part of a full duplex connection. Half-duplex connections cannot run simultaneously in both directions. For that reason, half-duplex connections can share a single antenna such as 1112 between a transmitter and a receiver.

The same criteria described in DETAILED DESCRIPTION—FIRST EMBODIMENT—FIG. 2, Communication Measurement Instrument Criteria also apply to the measured link transmitter 1202 and measured link receiver 1216 when realized as part of transceivers. They are functional equivalents of measured link transmitter 1000 and measured link receiver 1010 respectively. Both the backchannel transmitter 1218 and backchannel receiver 1204 also have the capability of transferring data and use mutually compatible modulation schemes and protocols. They must be sufficiently of stability and quality that adequately accurate measurements can be made on the measured link. The backchannel receiver 1204 must also provide a means of insuring that the backchannel is not the source of degradation seen in the performance of the measured link. Usually that means merely the ability to set the signal strength or channel rate on the backchannel high enough that the measured link always limits the properties of interest. (The properties of interest usually include, but are not limited to, saturated throughput and received signal strength.) The excess signal strength must be considerably greater if the frequencies used by the backchannel differ from those used by the measured link to guarantee that the measured link is the throughput limiting link.

Operation—Communication Measurement—FIGS. 2-16

FIG. 2 shows a generalized description of the measured link transmitter 1000 sending data to the measured link receiver 1010 via radiated waves. Radiation is created in the measured link transmitter antenna 1004 and received in the measured link receiver antenna 1006. The measured link transmitter's attenuating device 1002 and measured link receiver's attenuating device 1008 may be used to adjust the signal strength reaching the measured link receiver 1010. This is a simple depiction of how this equipment is used to measure a communication link. It is also forms a viable embodiment of a this equipment.

The communication link formed here carries data in only one direction; thus, it is called a simplex link. Simplex links are what the equipment described here can measure and, at least conceptually, they are the basic building block of data communication networks.

Some communication protocols require communication in the opposite direction of the measured link described above. Examples occur, when the protocol requires acknowledgement that data was received correctly or an indication that the measured link receiver is prepared to receive more data. The embodiment shown in FIG. 5 implements the same function that the first embodiment (FIG. 2) implements for such a protocol and uses a backchannel to do it. In this case, the medium of the backchannel is not specified. Most often, the same reasons that make it desirable that the measured link be radiated, also make it desirable that the backchannel be radiated, but this is not necessarily the case.

When a backchannel is used, either as part of the communication protocol or as a separate capability, the nature of the measurement can change. Most measured link measurements are inherently made at the measured link receiver. The embodiment in FIG. 2 requires the surveyor to be at the measured link receiver to monitor the measurement (unless monitoring is not required.) This is not convenient if the surveyor is carrying the communication measurement instrument that is providing the measured link transmitter. The backchannel can therefore be used to send the measured data to the communication measurement instrument that the surveyor is carrying. It can also be used for other monitor and control functions. Indeed, regardless of which communication measurement instrument is with the surveyor, the other communication measurement instrument can be monitored and controlled from it provided that the monitor and control data is convey in a way that does not significantly alter the measured link measurement. This can be accomplished by one or more of the following methods depicted in FIG. 6:

conveying monitor and control data replacing all or part of the data that would otherwise be transmitted as test data used to test or saturate the measured link (1510);

conveying monitor and control data at a time when measurements dependent on the volume of data are not being made (e.g. neither the bytes transferred count nor the time counter are being incremented, 1508), conveying monitor and control data on a channel that is separate from the channel being measured (1512) or conveying a sufficiently small quantity of monitor and control data that it has negligible effect on measured link measurements (1506).

Multi-Path Interference

Most interference to reception is addressed in Interference Analysis; however, owing to its prevalence, multi-path interference is almost unavoidable. It has sufficient influence on most measurements that the utility of those measurements are greatly increased if the influence of multi-path interference on them is accommodated.

FIG. 4 shows a superset of elements that may be used to implement one end of the function shown in FIG. 2. In its minimum embodiment it implements one complete communication measurement instrument transmitter (the same as communication measurement instrument 1001) or communication measurement instrument receiver (the same as communication measurement instrument 1009.) It also implements communication measurement instrument transceivers, the minimum embodiment of which is one receiver and one transmitter (the same as transceiver 1200 and transceiver 1220 in FIG. 5.) Beyond the minimum embodiments, each of the possibilities above, communication measurement instrument receivers, transmitters, and transceivers, can be implemented as shown on multiple parallel paths. The paths can be switched at any point on the path including, but not limited to, adjacent to the antenna. The other extreme is to supply fully independent receiver and/or transmitter paths for each antenna.

The possibility of parallel paths is important to a communication measurement instrument because it provides one means of measuring a prevalent form of interference to radiated-wave communication, that of multi-path interference. It comes about when radiated waves arrive at a receiving antenna from multiple paths passing through different distances. This produces an interference pattern. FIG. 5 shows two paths, the simplest case to conceptualize. If the difference in distances is an even multiples of one-half wavelength of the radiated wave, then the waves will add constructively and the receiver will receive a stronger signal than if there were no interference. If, on the other hand, the difference is an odd multiples of one-half wavelength of the radiated wave, then the waves will add destructively and the receiver will receive a weaker signal than if there were no interference. For differences between these extremes, the strength of the received signal is between these extremes.

Often, there is a line-of-sight path (1302*a* and *b*) between the transmitter antenna (1302) and receiver antenna (1112*a* or *b*) as shown in FIG. 7. This usually is the path with the strongest signal and the shortest path between the two (which is consistent with the assumptions made subsequently for Rician fading.) Other paths (1304*a* and *b*) experience some form of reflection (e.g. from 1300). If the line-of-sight path is partially or totally blocked, then another path may be the one with the strongest signal, but not necessarily the shortest path between the path terminating antennas. An antenna at a different location than antenna 1112 a such as antenna 1112*b* (or an antenna moved to a different location) will have different distances on each of the paths than the first antenna such as antenna 1112*a*. Antennas separated by (or an antenna moved by) as little as one-quarter wavelength can receive signals having strengths differing by the greatest amounts observed locally. (I.e., there can be as little as one-quarter wavelength between signal minima and maxima.) (Note that the path distances are the same in either direction, reciprocity holds and the role of receiver and transmitter can be reversed in this analysis.)

Let $V_1$ be the signal strength arriving on the path having the strongest signal expressed as field strength, voltage, or some other metric that is proportional to the square root of power. Similarly, let $V_S$ be the sum of the magnitude of the signals arriving on all of the paths that are weaker than the strongest signal and are therefore interfering with it. In many instances $V_S < V_1$. In such cases, determination of minimum ($V_{min}$) and maximum ($V_{max}$) is sufficient to calculate $V_1$ as will be shown. This will be called the "bounded distribution model" here, because the probability density function of field strength is bounded by the minimum and maximum. Otherwise, a Rician model should also be considered as described in the work edited by Jean-Paul M. G. Linnartz (JPL's Wireless Communication Reference Website, Chapter: Wireless Channels, Section: Multipath Fading, Rician fading, "Distribution of Amplitude and Power for Rician fading") incorporated here by reference. The power of the dominant component in this model is proportional to $V_1^2$, and the local-mean scattered power is proportional to $V_S^2$.

FIG. 8 presents one of many procedures that can be used to process measurable properties into useful properties. Make a design decision whether to initially seek the minimum and maximum (1400). This will depend upon frequency of operation and many other circumstances. If the decision is to not seek the minimum and maximum, then make another design decision to measure at known and ideally well chosen locations (1408). This decision will generally be based upon the equipment available and the information that is sought. If the decision is to measure at known locations, then make measurements and measure the location of each measurement (1422). Ideally the measurements will be no further apart than one-quarter wavelength. Fourier methods can be used to separate the signals arriving on different directions (i.e. $V_1, V_2, V_3$, etc.). If it is not practical to take measurements so close together it is still possible to fit the measured data to sinusoidal curves of varying spatial frequency or to use sparse sampling techniques to extract a number of the signals arriving on different paths so long as the locations of the measurements are known (1424). The signal power not in the identified signals can be lumped into $V_R$.

If the decision is to measure at random possibly imprecisely known locations (1408), then make sufficient measurements (1410) to measure the probability density of received signal strength (1412). If that density shows the minimum ($V_{min}$) to be much less than the maximum ($V_{max}$, 1414), then there is a high likelihood that $V_S > V_1$ and the Rician model will probably yield more accurate measurements than the bounded distribution model. Use the total power in the combined signals sampled and the variance in that combined signal (1418) to measure $V_1$ and $V_S$ according to "Distribution of Amplitude and Power for Rician fading" (1420).

If the decision is to initially seek the minimum and maximum, then move the antenna or antennas around until a number of local maxima have been found. Measure enough maxima that it is reasonable to expect that some approximation of the global maximum has been found (1402). Measure a similar number of local minima seeking a similarly good approximation of the global minimum (1404). Using this technique, $V_1$ will tend to the correct value, even if $V_S$ is somewhat underestimated. If the minimum ($V_{min}$) is much less than the maximum ($V_{max}$, 1406), then there is a high likelihood that $V_S > V_1$ and the Rician model will probably yield more accurate measurements than the bounded distribution model. Proceed with measuring random locations (1410). If either decision block 1406 or 1414 show the minimum ($V_{min}$) not much less than the maximum ($V_{max}$), then the bounded-distribution model will yield good measurements. There is sufficient data to estimate (measure) the strongest signal ($V_1$, 1416) according to the relationship, $$V_1 = 0.5\, V_{max}(1 + V_{min}/V_{max}),$$

and the sum of the signals on all of the interfering paths is, $$V_S = V_1 - V_{min}$$

$V_1$ is often the (voltage) strength of the signal traversing a line-of-site path on the measured link. Sometimes its value can be predicted on theoretical grounds, but often it is difficult. In either event, the strength of the signal arriving on the strongest path ($V_1$) is likely to be easily understood from theory and the minima ($V_{min}$) and maxima ($V_{max}$) measured are more complicated. Projection of the measurements to similar circumstances and the development of an understanding of radiated wave propagation in a site can be based upon the strength of the signal arriving on the strongest path ($V_1$). This information is valuable. It is difficult and error-prone to do the same from points of unknown relationship to the minima ($V_{min}$) and maxima ($V_{max}$) as are often used in the prior art. $V_S$ and $V_{min}$ provide a basis for estimating the signal strength margin needed relative to the strength of the signal traversing the strongest path ($V_1$) to achieve the requirements for link performance (FIGS. 9 and 10, 100) sought subsequently. All of these capabilities are well beyond those of the previous state-of-the-art in site surveys.

An important limitation on multi-path interference comes from the modulation scheme used to send data. For multi-path interference to occur as described above, the phase relationship of the interfering signals must depend upon the lengths of the paths. If the path lengths are sufficiently different, then the phase relationship will be a characteristic of the modulation scheme used. Usually, that means that the phase relationship will be random. The weaker signal will appear as noise interfering almost incoherently with the stronger signal and little signal strength variations will occur. An example may help make this clear. The IEEE 802.11b standard calls for a 90.9 ns. "chip" length during which the phase modulation applied to a carrier is unchanged; thus, if the difference of delay of the two interfering paths is a negligible fraction of 90.9 ns., multi-path interference can occur as described. If the difference of the two delays is over 90.9 ns., then each path is delivering a completely different chip to the receiving antenna and all relationship between the phases of the two signals is usually random. It may be convenient to use half of the chip length as an approximate demarcation between these two effects. IEEE 802.11a and g use a longer time over which phase is guaranteed to be stable, at least 3.2 us.

Parallel Antenna Embodiments

FIG. 4 illustrates several embodiments handling signals to the plurality of antennas in different manners for multi-path measurements. One of these is to provide fully independent receiver paths for each antenna, and to transmit to them from only one antenna at the other end of the measured link or only one at a time. A parallel approach using parallel transmitter paths and only one receiver path or only one receiver path at a time, is possible, but complex. Both of these approaches provide the shortest measurement time of any of the options. Another option is to switch either the receiver path or the transmitter path or both as described above. As indicated the paths can be switched at any point on the path including, but not limited to, adjacent to the antennas. This also provides the ability to make measurements quickly. As implied, only one end of the measured link is required to have multiple antennas and paths.

In both of these options, the antennas are likely to be close enough to each other that the signal strength measurement error introduced by distortion of the antenna radiation pattern (changes in antenna gain with direction) due to the proximal antennas is significant. If this error cannot be accepted, it must be compensated. Both of these options can be augmented by physically moving the antennas to sample signal strength or to generate signal, at more locations. This approach has the advantage of allowing the antennas to be further apart. This lessens the degree of distortion that the antennas introduce into each other's antenna radiation pattern.

Single Antenna Embodiments

FIGS. 2, 4, and 5 also illustrate the minimum embodiments that can be used with a single antenna at each end of the measured link (and in the case of the embodiment in FIG. 5, possibly a second set of antennas for the backchannel.) Measuring multi-path interference in this manner requires that an antenna at one end of the measured link (or possibly at both ends) be moved. This motion can be manually implemented or done by a mechanical means. Both of these means can be the means used to move the multiple antennas described above.

Moving the antenna manually is cheap, easy, quickly set up outside a laboratory, takes measurements relatively quickly, and introduces no antenna radiation pattern distortion due to the proximity of other antennas. It is usually easy to measure the strength of the strongest signal and the strength of the sum of the other signals. Moving the antenna with a mechanical means allows more accurate measurements of the antenna motion to be made. The more accurate motion measurements sometimes allows or improves the measurement of the signal strengths arriving on paths that are not as strong as the strongest path. It too introduces no antenna radiation pattern distortion due to the proximity of other antennas.

Antenna Motion

An important limitation on the placement of antennas for multi-path measurements needs to be mentioned. The points selected for measurement must be close enough together that the signal strength amplitude arriving on any significant path is essentially constant with respect to the locations. That is, neither the distance to the other end of the measured link changes significantly nor does the degree of obstruction in the first few Fresnel Zones between the ends of the link.

Since most antennas have significant omnidirectional asymmetry, it is important to prevent antenna rotation during motion.

Site Survey Procedure

Many procedures exist which accomplish the same goals, none-the-less, a procedure will illustrate how communication measurement instruments as described above can be can be used to make measurements in a site survey beyond the previous state-of-the-art.

One embodiment of a procedure using communication measurement instruments is described in synoptic form in FIG. 9 and in detail in FIGS. 10-16.

In it, the following procedures are carried out. Procedure 100 in FIGS. 9 and 10 entails ascertaining from a client what is needed from a network that is to be installed or upgraded. The network (or installation) will be viewed as composed of a plurality of links, simplex (unidirectional) communication connections from one location to another in the installation. The client supplied information will be used to determine requirements for each link in the installation as it is designed. It is sometimes necessary to alter these requirements as the network design proceeds, but they provide the basis for the design of the individual links. While many measured link properties or metrics can be used as a requirement, single user saturated throughput, (approximately) the greatest rate at which data can be sent through the link by a single user is the most common property used for the requirement, though channel rate is also used in installations using multi-rate protocols. Whatever requirement or requirements are established, they will be compared with the values of those properties predicted from measurements made on each link. That provides sufficient information that one or more acceptable designs for each link can be found (FIG. 9. 300), a procedure that is repeated until all the needed links have been designed (FIGS. 9 and 10, 116).

FIG. 11 illustrates the link design procedure. It makes frequent use of what will be called "design decisions." For the purpose of this paper, "design decisions" are decisions expected to offer reasonable potential for advantage over previously analyzed alternatives based upon all of the information available at the time, by a person skilled in the art of designing radio communication installations.

In the course of designing these links, several measurements will be made. The term "measurement" will be used to mean the process of identifying a measured value from a measurement device (for example a receiver or equivalent device capable of the measurement.) Also, the term "measurement" will be used to describe both direct measurements, and indirect measurements made by using one or more direct measurements in a calculation, mapping or some other process (e.g. some receivers directly measure received signal strength while with others, saturated throughput must be used to measure received signal strength indirectly.)

FIG. 11 begins with a design decision determining candidate locations for measured link receiver and transmitter antennas (200). Antennas for communication measurement instruments are placed at each of these locations (201) with the rest of the communication measurement instrument often placed nearby. This defines the endpoints and direction of a (simplex) link which will be measured. If one or both of communication measurement instrument 1001 and communication measurement instrument 1009 or their functional equivalent are readily portable, then these procedures can be accomplished very quickly as a surveyor walks around carrying a communication measurement instrument which forms one end of the measured link.

Measurement of the Signal Strength Received

The signal strength received over the measured link will need to be measured. Several measurements are available depending on the communication measurement instruments in use. These may include, but are not limited to:
  a mechanism to measure the received signal strength directly (called a "Received Signal Strength Indicator" or RSSI in this paper);
  Received Signal Strength Indicator divided by noise;
  received signal strength as indicated by transfer properties (such as packet error rate); and
  received signal strength as indicated by
  saturated transfer properties The accuracy of the RSSI is a function of the communication measurement instrument receiver used. In the limited experience of the author RSSI data has an error of about 3.5 dB at high amplitude increasing to about 7 dB for low amplitude signals.

Some receivers also measure noise. In some situations, the noise measured is largely the result of the noise generated in the first few stages of receiver amplification; in others it is an ambient noise that is strictly stationary and ergodic. In either of these cases, and possibly others, apparent fluctuations in the measured noise are largely the result of fluctuations in the gain of the entire signal amplification chain to the point that the RSSI data is extracted. In that case, using RSSI as a measurement of received signal strength may have a greater error than RSSI divided by noise, because the effect of gain fluctuations on RSSI is largely compensated by the effect of gain fluctuations on measured noise.

Unfortunately, there is much equipment on the market that does not make RSSI information available to the surveyor. The Cisco AIR-BR1310AG IEEE 802.11 access point provides some RSSI data and some others appear to do so also based upon manufacturer supplied data. Client interfaces that supply RSSI information are easier to find. Many that use the Agere Hermes chip set (now obsolete) or any of several Atheros or Prism chip sets make the data available.

A measurement of data rate is significantly expedited if all, or almost all the packets carrying the data have lengths selected from a minimum number of lengths. If the communication measurement instrument encompasses multiple network protocols in communicating with its components, this can be a problem. An example of this occurs when a an 802.11 LAN is used to access a transceiver as one of the ends of a measured link. Packet size can be controlled in many protocols by setting the maximum packet length. Whenever maximum length packets go from a protocol with a longer maximum length to a shorter one, they will be fragmented. At least one of the resulting packets will be the length to which it was fragmented and the other will be shorter. This causes variations in the number of each sized packets in a data accumulation period, markedly increasing the variability of the rates measured. This can slow the rate at which measurements can be made to a needed accuracy, by greatly extending the accumulation periods or averaging periods that must be used. Usually, the preferable solution is to make all the maximum packet lengths identical. In the case of IEEE 802.11 protocols, the size of the media transfer unit (MTU) of the radiated portion of the network (2048 maximum) can usually be set to match the maximum of the IEEE 802.3 network segment that connects to it, about 1500 bytes; thus, avoiding fragmentation and maximizing the proportion of packets that have a common length. Some experimentation may be needed to get it exactly right. Another option is to change the MTU depending upon the direction the large data packets are going.

Some receivers provide the information needed to measure event probabilities or their equivalents. The most common are packet success counts and packet failure counts, where a packet may be, but is not limited to, a packet, frame, media transfer unit, UDP packet, or TCP packet. For this analysis, a packet success is defined as the recognition that a packet has been received correctly. The lack of such a recognition results in a packet failure. These probabilities can be derived in numerous ways from direct measurements. For example, any two of packet success count, packet failure count and packet attempt count, if taken over the same time period can be used to find the other since the first two sum to the packet attempt count. This is called the summation property in this section. Packet success, failure and attempt rates are the respective counts divided by the time over which the counts were accumulated; thus, packet success, failure and attempt rates have the same summation property as the counts. Packet success rate times the average amount of data in each packet is the data transfer rate also called throughput. Also, the probability of packet success (Pr(ps)) and failure (Pr(pf)) can be measured by the counts of packet successes and failures respectively divided by the packet attempt count. Note that the probability of packet success and of packet failure sum to one according to the summation property (and probability theory.) The same relationships hold among bit counts and probabilities where the probability of bit success is Pr(bs) and the probability of bit failure is Pr(bf). Assuming the probability of a bit failure is independent identically distributed, $$Pr(pf) = Pr(bf)^n$$

Where n is the number of bits that must be received correctly for the packet to be recognized as being received correctly. This number is protocol dependent and includes at least the bits in the portion of the packet that is protected by error detection mechanisms such as Cyclic Redundancy Check. Thus, there are many measurements from which the probability of bit success and bit failure can potentially be derived. In the absence of certain kinds of interference, these probabilities are functions of received signal strength and may provide a more accurate measurement of it than is otherwise available.

Some transmitters provide or can be made to provide the ability to saturate the link, that is, the amount of data available to be transferred exceeds the link's capacity to transfer data. This usually causes a link to transfer data at a rate (throughput) close to the largest amount of data that it can transfer. This saturated throughput is often the measured link property used in describing the performance required of a link, so it is an important property itself. In the absence of certain kinds of interference, measurements of saturated throughput may provide a more accurate measurement of signal strength than is otherwise available. As indicated above, throughput, in this case, saturated throughput can be measured directly or indirectly from other saturated transfer properties.

Depending upon the communication measurement instrumentation being used, some amount of data processing of measured values may be needed. Averaging and smoothing are the most common processing, but depending upon the measurement technique used, outlying samples (erroneous measurements) may need to be removed, etc.

Measurement Choices

FIG. 11 illustrates one method of creating one or more acceptable link designs (300.) It shows one of multiple ways decisions can be made about which measurements to use to measure received signal strength. As noted above, RSSI divided by noise may be more accurate than RSSI alone. Other measurements also exist that, if implemented in the measured link receiver, can be used to measure the received power because of their close relationship to that power. (See the definition of received signal power in the GLOSSARY.) Let RSP (for received signal power) be the measurement that is selected.

There are many functions of received signal strength that can be measured. Some or all of these measurements can provide a means of measuring received signal strength. These functions are often non-linear functions of the power received and often have a narrower dynamic range than RSP. Measurements of received signal strength made in this way will be referred to by RSSX and are always indirect. Examples of functions that can be used to provide RSSX measurements include but are not limited to saturated transfer properties, and transfer properties.

The following algorithm can also be implemented using a different basis of comparison other than received signal power. For example, the role of saturated throughput (or its equivalent such as transfer probabilities), and received signal power or its equivalent may be reversed in the procedures that follow.

FIG. 11, 402 calls for the surveyor to make a choice whether to attempt to measure RSSX. Potential reasons to make the measurement include but are not limited to:

RSPE, which is based on RSP and has enhanced accuracy, is not accurate enough and the indirect measurement is more accurate;

quantification of the impact of interference on saturated throughput is desired; and/or surveyor discretion.

If chosen, the received signal strength is measured (404) as described in detail in FIG. 12 and below. (The choice whether to attempt to measure RSSX, 402 and its measurement, 404 are shown in the installation designer, FIG. 9 as item 202.)

FIGS. 10 and 11, 204 shows the selection of candidate transmitter and receiver (e.g. makes and models) for the measured link along with their associated antennas, and protocol settings as needed (collectively "configuration"). The selection criterion is that they offer a reasonable potential of advantage over configurations previously evaluated based upon all the information currently available. The important distinction between this procedure and the prior art (102) is that the configurations selections are only candidates. They can be changed as the design procedure progresses. The data gathered by emulating these candidate configuration is likely to be close enough to other candidate configurations that it will contribute meaningfully to the selection of other candidate configurations if needed, and samples of candidate transmitters and receivers need not be available to the surveyor at the time he makes the site survey.

With the selection of candidate configurations, enough information is available to emulate their functionality with communication measurement instruments. How the received signal strength and other measured link properties are measured (206) is described in detail in FIG. 13 and below.

One or more measured link measurement is compared with the corresponding requirement(s) (114). If the requirement(s) are not met, and the received signal strength is adequate to support the requirements then the possibility of interference needs to be explored (409). (Also see FIG. 14.) The procedure will optionally make a change to the measured link (or something interfering with it.) If, as a consequence of the interference analysis exploration (409), a change was made (410) then that change should be tested by altering the emulation configuration (or interferes) (412) and re-emulating it (206). If no change could be found, then begin again to attempt to find an acceptable link configuration (200). (The interference analysis procedure consisting of items 409, 410, and 412 are shown in somewhat simplified form in FIG. 10 as 212.)

If the requirements are met (114) then an acceptable link configuration has been found and it is placed in an acceptable configuration list for this link (208). A design decision is then made as to whether other link configurations exist that should be examined (210). If there are other configurations, then again an attempt is made to find an acceptable link configuration (200), and, if not, the link design procedure is completed with a list of acceptable link configurations.

FIG. 12 is a procedure for measuring air path loss with the greatest accuracy available through these methods. To accomplish this, the radiated field strength is maximized to minimize the influence of interference on it (so long as the ability to know the field strength accurately is not significantly compromised.) The measured link transmitter output signal strength is adjusted to maximum and any attenuation on its output path such as communication measurement instrument transmitter's attenuating device 1106 and antenna's attenuating device 1110 are removed (500). Other setup of the transmitter may also be needed including, but not limited to, protocol selection, protocol variables and test data transfer. Any attenuation on the measured link receiver input path such as antenna's attenuating device 1110 and communication measurement instrument receiver's attenuating device 1114 are adjusted so that the received signal strength is in a portion of the dynamic range of the indirect measurement with sufficient accuracy (502). This range usually occurs for that range of received signal strength for which the directly measured value (usually of a transfer property such as packet error rate, or saturated throughput) changes most rapidly with change in the received signal strength. Other setup of the receiver may also be needed including, but not limited to, protocol selection, protocol variables and test data transfer.

It is usually advantageous to measure all the measured link properties that can be readily measured directly, since they usually contribute to the information from which design decisions can be made (504). If possible, make these measurements at multiple locations as described in Multi-Path Interference. As a minimum, measure RSP. If available, also measure a property from which received signal strength can be measured indirectly. Maps can be used to measure other measured link measurements from those measured directly (506). FIG. 19 is an example of two maps. One is between received signal strength property values and RSP, and the other is between received signal strength property values and saturated throughput. Use the map to provide measured values of RSPE from RSP, and RSSX from the other property (saturated throughput in this example.) Note that received signal strength is only one of the properties to which RSP, can be mapped. The same is true for the other property from which received signal strength can be indirectly measured.

Others properties are also effective in wireless link design, but received signal strength is easily conceptualized. If the difference between RSPE and RSSX is less than the sum of the errors expected in each, then it is probable that they are both measurements of the same phenomenon (508.) Use the more accurate one, often RSSX as the air path loss measured value (510). Otherwise, the inconsistency of the measurements provides a measurement of the consequence of interference on the measured link under these conditions. Use RSPE as the air path loss measured value (512).

Emulation of the Measured Link

FIG. 13 includes a procedure for emulating the performance of candidate equipment in the measured link which is elaborated here. To include the effects of interference in the emulation, the radiated field strength is adjusted to match the worst case expected in the candidate configuration. The measured link transmitter output signal strength and any attenuation on its output path, such as communication measurement instrument transmitter's attenuating device 1106, antenna's attenuating device 1110 and antenna gain 1208, are adjusted to guarantee that the radiated output signal strength is not greater than the worst case (weakest) output signal strength that could be available from the selected candidate transmitter for the measured link along with their associated antennas (600). Achieving this requires assuming the measured link transmitter is providing the strongest extreme of its specifications. Note that particularly with regard to the communication measurement instrument, the specification is assumed to include improvements made through calibration measurements such as those described in WEAK SIGNAL GENERATION. That output is attenuated enough to guarantee that the field strength generated is no greater than the weakest extreme that the candidate transmitter and associated antenna that are to be supported by the design, could produce. Other setup of the transmitter may also be needed including, but not limited to, protocol selection, protocol variables and test data transfer.

Attenuation must be inserted in the communication measurement instrument receiver input path such as antenna's attenuating device 1110 or communication measurement instrument receiver's attenuating device 1114 to make the measured link receiver's sensitivity to radiated fields no greater than the sensitivity of the candidate receiver (including antenna) under the conditions of the requirements placed upon this receiver (602). (The requirements are often expressed as a saturated throughput.) This is usually accomplished by inserting an amount of attenuation equal to the difference (in dB) between the best specified communication measurement instrument receiver sensitivity and the worst specified candidate receiver sensitivity at that saturated throughput specified and with the antennas included. In systems with variable channel rates, this implies a channel rate. Since the latter information may not be available in specifications for the implied channel rate, the sensitivities of the best communication measurement instrument receiver sensitivity and worst candidate receiver sensitivity at an other channel rates can be used to estimate the missing sensitivities. Other setup of the receiver may also be needed including, but not limited to, protocol selection, protocol variables and test data transfer.

The remainder of the measurement of air path loss for emulation of a measured link proceeds using the same steps as outlined above in "RSSX Measurement."

This technique is easily implemented with communication measurement instruments. Measurements can be made relatively quickly. It provides information on which to base projections of the performance of the measured links based upon both air path loss and interference. It has the potential to be accurate enough to markedly reduce or eliminate common connection and data rate problems with networks after their installation and the costs of overbuilding networks, all of which occur frequently in networks designed using the prior art.

Interference Analysis

Some times there is value to analyzing the interference that is affecting data communication as indicated in FIG. 14. FIG. 14 provides one of several procedure sequences that are effective, and should therefore be viewed as a pedagogical example. Surprisingly much can be learned from a few measured link properties.

There are many reasons why a surveyor might choose to analyze the interference (704). It may be valuable to understand the environment in which the installation will be built, so that environmental affects (usually interference) can be minimized. It is nearly always useful to improve understanding of what is happening. If the received signal strength as indicated by RSPE is large enough that the requirements could be met in the absence of interference, then it may be a possible to reduce the affects of interference sufficiently that the requirements will be met. For that reason, interference analysis can lead to measured data link configurations that will work.

The analysis of interference is usually composed of two parts. The first part in theory could be performed simultaneous to the second part, but this is usually impractical because the needed degree of control over the interference environment is usually not present when the second part is performed; thus, it is usually performed separately. The first part is learning the consequences of various classes of interference on measured link parameters as is shown in FIG. 15 and described below. These consequences are the responses to interference and may be recorded as shown in Table 1. It is likely that one set of responses and the associated record will support multiple instances of the second part. These responses are the differences of measured link properties in the presence of various classes of interference and in their absence (transfer properties are examples used elsewhere in this specification.) These properties and responses can be determined from theory, but the most reliable are determined from measurements.

The second part is a portion of the proposed installation design procedure (FIG. 10 as detailed in FIGS. 11, 14 and 16.) When implementing the installation design procedure a design decision can be made at any point in the interference analysis that more data is useful (FIG. 14, 706). As discussed in "Determining the Nature of Interference", further tests can often resolve the class or classes of interference affecting the link. If more data is useful, then parameters are selected that when changed, can be expected to provide useful data. The parameters changed are usually those affecting signal strength, transmitter output signal strength and attenuation though such obscure settings as fragmentation length are sometimes useful. These can be identified from the specifics of known interference responses (the first part executed separately) or from theory. If needed, additional measurements can be made of known interference responses (the first part executed simultaneously) or (more frequently) for the proposed installation design (the second part.) via 708 and 206 in FIG. 14 as part of this procedure. The parameters are set in the communication measurement instruments which will be used to measure the measured link (708) and measurements are made (206 and FIG. 13). The decision is again made whether there is enough data (706); thus the parameter selection (708) and emulation measurement (206) may be repeated as often as needed.

If the measurements made via 708 and 206 allow the identification of one or more (additional) known interference responses they are used to create (augment) the known interference responses and the record of it.

When enough data is present, the data is analyzed using the known interference responses to determine interference results (710). Details of what will be known interference responses are highly dependent upon properties that can be measured by communication measurement equipment using the protocols available.

Often the results of the interference analysis suggests procedures that can be followed to mitigate the effects of the interference (e.g. change the fragment size, use equipment that automatically selects a channel based upon interference) or help in identifying the source of the interference (e.g. an IEEE 802.11 device.) If such are found (712), it may be possible to reduce or remove the effect of the interference (714) and this instance of the interface analysis exploration is complete. If such are not found (712), then this instance of the interface analysis exploration completes immediately.

Determining the Nature of Interference

For the purpose of this discussion, the properties of a signal that is interfering with communication on a measured link will be treated as measured link properties. The measured link properties that can be measured directly by communication measurement equipment vary widely with the particular equipment. Likewise, the measured link properties that can be measured indirectly vary widely depending on the protocols used.

Because of these wide variations, no universal process flow can practically be described that will show all of the complexity that analyzes interference and leads to interference results (the first part introduced above.) It is, however, possible to describe a process through which known interference responses can be organized for classifying potential interference and to place the complexity of the information used to classify interference in a record of known interference responses such as Table 1. The remainder of the process leading to interference results proceeds as follows.

FIG. 15 shows one of many functionally equivalent processes. A list is made of each measured link property or group of closely related measured link properties which can be directly or indirectly measured by communication measurement instruments (800). From that list and an understanding of the protocols used, a list of potentially distinguishable classes of interference, called interference class descriptors, is made (802). Let the deviation of a property from what it would have been in the absence of the interference of that class be the response of that property to the interference of that class. The basis for comparison is the response that would have been in the absence of the interference, the expected value in subsequent description. The basis will be specified for each property or property group. Two common examples of bases for comparison are received signal strength (RSS) and the channel rate selected, in which case the property in the presence of interference is then compared to the property in the absence of interference given the same bases for comparison. The response of each measured link property or group of properties to each interference class is then analyzed and if practical verified (804).

In the process, limiting cases may be discovered at which point the responses undergo qualitative changes in nature. (e.g. when channel rate reaches its minimum, 1 or 6 Mb/s, and can go no lower, the response to increases in interference is different than at higher channel rates.) Add these cases to the record of known interference responses (806). Because the responses are qualitatively different, they can be categorized under additional interference class descriptors (forming new rows in Table 1.) Other useful tests may become apparent, such as changing received signal strength. Analyze the responses to these tests and add these tests to the record (808). In this example, the results of these tests can be so succinctly described that they can be added to the record as if they were additional properties (columns in Table 1). Whatever means is used to present the results of an analysis equivalent to the above, the result is convenient to place in a record of known interference responses.

It is often not apparent what a measured link property would have been in the absence of interference. Since the deviation from this property in the presence of interference is what forms the response to interference, it is important to know these properties. Often measurements must be made in the absence of interference. Though a number of means exist to make those measurements, it is often convenient and inexpensive to use the method described in RECEIVER CALIBRATION (as described in a patent divided from this patent); indeed, if a receiver calibration is performed, some of the receiver calibration measured values can be used as the interference free measured values and additional measurements needed, can often be efficiently made at the same time.

The following is an example of known interference responses (interference classes) of a measured link that can carry IEEE 802.11b and g protocols. Since IEEE 802.11a is very similar to IEEE 802.11g, the table applies to 11a also. To the extent that IEEE 802.11n is similar to these protocols, the table also applies to it. Each interference class description is preceded by a parenthetical interference class descriptor name.

(None) is provided as a reference showing the responses of properties to the absence of interference.

(Cwk) Continuous interference that is too weak to invoke Clear Channel Assessment (CCA) mechanism is often encountered and will cause the channel rate to be reduced to the point that the interfering signal is not strong enough to affect communication or to the minimum channel rate.

(CCCA) Continuous interference that is strong enough to invoke Clear Channel Assessment (CCA) mechanism will prevent IEEE 802.11 access to the link. In addition the interference may prevent the measurement of RSSI.

(NAV) Any interferer that participates in the IEEE 802.11 Network Allocation Vector (NAV) collision avoidance protocol that is implemented will share the available channel capacity. These are usually other properly configured IEEE 802.11 devices. The use of NAV allows competing nodes to "interfere" with each other without actually sending packets that will be lost. As with any intermittent interference, only a fraction of the channel is available.

Intermittent interference is characterized by being present for only finite periods of time, separated by gaps of finite time. Here it is assumed that interference occurs multiple times in the period of time required for the channel rate to recover from interference induced reduction. There are several ways in which successful communication can occur in the presence of such interference. If the interference is low enough in amplitude that a means can be found to communicate during it; the interference induced errors are short enough that they can be corrected; or if the periods of time when the interference is absent are long enough to allow a complete packet (ACK protected unit of data) to be transmitted, then communication will occur. To facilitate the latter case, the size of the complete packet can be altered by changing the fragment size, an IEEE 802.11 parameter.

(Blong) Interference lasting longer than can be corrected by any of the error correcting code (ECC) mechanisms used in the 802.11 protocols, and either weak enough or having low enough duty cycle that it does not trigger the Clear Channel Assessment (CCA) mechanism, often will reduce the channel rate to a value at which the data can be recovered even during the interference or (more often) to its minimum value.

(BCCA) Intermittent interference that has a moderate duty cycle and is strong enough to invoke Clear Channel Assessment mechanism will sometimes begin during data transmission. This can cause the data to be received incorrectly and reduce the channel rate to the minimum channel rate. Successful communication depends upon whether the gaps in the interference are long enough to permit it.

(Bmed) Interference that is short enough that it can be corrected by the ECC mechanisms used in 802.11g but not 802.11b, and is either weak enough or have a low enough duty cycle that it does not trigger the Clear Channel Assessment (CCA) mechanism, will be corrected if 802.11g is being used. The channel rate may also be reduced either to find a channel rate at which interference of that length can be corrected by 802.11g or to overcome the loss of S/N resulting from having part of a chip overwhelmed by interference to either protocol. If the 802.11b protocol is being used, the channel rate will often will reduce to its minimum (usually 1 Mb/s.)

(Rshort) Reflections of the desired signal that arrive with a time delay that differs from that of the strongest signal by a small fraction of one chip time at the 802.11b chip rate (of 11 MHz.) interfere with are that signal. Because the signal is interfering with another copy of itself, this is called self-interference, and because the time delay between the two paths is so small the signals are largely coherent with each other. The received signal strength varies as the point of reception is moved over distances of one quarter wavelength or more as described in Multi-Path Interference.

(Rmed) Reflections of the desired signal that arrive with delay difference from the strongest signal of greater than one chip time at the 802.11b chip rate and less than a small fraction of one chip time at the 802.11g chip rate (of 0.25 MHz.), interfere differently for 802.11b and 802.11g signals. 802.11g signals interfere coherently with the strongest signal, while 802.11b signals interfere incoherently as does interference from other sources that are independent of the strongest signal. Note that as the 802.11b channel rate is reduced, the susceptibility of the communication to interference is also reduced; thus, a stronger interfering signal is required to successfully interfere with communications. If the IEEE 802.11b protocol is being used, the channel rate will be reduced to the point that the interfering signal is not strong enough to interfere with communication or to the minimum channel rate of 1 Mb/s, but if the transmitted signal strength is changed, the strength of the interfering signal is also changed resulting in no change in the influence of interference. If the IEEE 802.11g protocol is being used, the received signal strength varies as described for Rshort. Because the range of delays that cause multi-path interference is increased for 802.11g. the strength of the fading ($V_S$ above) may tend to be greater when measured using 802.11g than when measured using 802.11b protocol using Rshort above.

(Rlong) Reflections of the desired signal that arrive with delay difference from the strongest signal of greater than one chip time at the 802.11g chip rate, self-interfere similarly regardless of 802.11 protocol. The channel rate will be reduced to the point that the interfering signal is not strong enough to affect communication or to the minimum channel rate, but if the received signal strength is changed, the strength of the interfering signal is also changed resulting in no change in the influence of interference.

Note that much more sophisticated measurements of the reflections that create multi-path interference can be made with specialized (and expensive) equipment. U.S. Pat. No. 5,371,760, incorporated here by reference, describes one such method and offers another perspective on the multi-path phenomenon.

Note that interference that is near the boundaries between interference classes may exhibit characteristics of both interference classes. Similarly, the presence of multiple classes of interference either through the instability of an interfering mechanism or the presence of multiple mechanisms may exhibit characteristics of both classes of interference. For example, the presence of multipath interference having a short time difference (Rshort) along with any other interference class will exhibit signal strength variations (MI) along with the symptoms of the other interference.

Table 1 shows an example of interference properties responses or equivalent information that are known for IEEE 802.11. The information allows identifying the nature of interference from measurements made on the measured link.

The Legend for Interference Response Deviation shows examples of responses that can be used to identify interference classes. These responses are not unique and some responses can be used interchangeably with others. Fundamental relationships among some responses are given in "Measurement of the Signal Strength Received." For example, deviations of Packet Error Rate from the interference free case when using the same channel rate allows the same interference classes to be distinguished regardless of whether the rate is measured on a saturated or unsaturated channel. The same distinctions can be made with the Success Rate and Throughput if they are measured with the channel saturated at the same channel rate; thus, these responses can be used interchangeably in this example. Similarly, the probability of packet success and failure when measured at the same channel rate, whether measured on a saturated or unsaturated channel allow identical Interference Classes to be distinguished; thus, can be used interchangeably.

Some other useful tests exist. They appear as columns in Table 1. If the transmit signal strength is increased by a small amount it is unlikely though possible to introduce a qualitative change in responses (such as the limits mentioned above or changing channel rates), none-the-less revealing quantitative response changes may be observed. (Effectively the same test can be done by reducing the transmit signal level. Between the two tests, one will certainly not introduce a qualitative change.) If the transmit signal strength is reduced by a sufficiently large amount that the data rate is reduced to its minimum value, then reduced a bit further, substantially no data will be transferred during interference bursts (if any). Any remaining data transfer (saturated packet success rate) is due to data transferred between packets and gives insight into the existence and nature of these gaps.

It is worth mentioning that if the packet success rate becomes sufficiently low, some instruments will have difficulty providing accurate information on the channel rate, received signal strength, and probabilities. The table assumes accurate information is available (and L'Hospital's Rule is applied) as the rate goes to zero.

| Interference Class Descriptor | Protocol | RSSI | Channel Rate (Mb/s) based on RSS | Saturated Packet Success Rate based on RSS | Propability Packet Succeeds | Small Increase in Transmitted Signal Strength | Low Level Success Fraction |
|---|---|---|---|---|---|---|---|
| None | both | valid | exp | exp | 1− | incC | 0+ |
| None | both | valid | min | exp | <exp | incC | 0+ |
| CCCA | both | valid | <exp | 0+ | 1− | none | 0+ |
| Cwk | both | valid | <exp | <exp | 1− | incC | 0+ |
| Cwk | both | valid | min | <exp | <exp | incC | 0+ |
| NAV | both | valid | exp | fracT | 1− | incC | 0+ |
| BCCA | both | valid | <exp | <exp | >=fracT | incC | fracT |
| BCCA | both | valid | min | <exp | >=fracT | incC | fracT |
| Blong | both | valid | <exp | <exp | fracT | incC | fracT |
| Blong | both | valid | min | <exp | fracT | incC | fracT |
| Bmed | 11b | valid | <exp | <exp | fracT | incC | fracT |
| Bmed | 11b | valid | min | <exp | fracT | incC | fracT |
| Bmed | 11g | valid | <exp | <exp | 1− | incC | >=fracT |
| Rlong | both | valid | <exp | <exp | 1− | none | 0+ |
| Rlong | both | valid | min | <exp | <exp | none | 0+ |
| Rmed | 11b | valid | <exp | <exp | 1− | none | 0+ |
| Rmed | 11b | valid | min | <exp | <exp | none | 0+ |
| Rmed | 11g | MI | exp | exp | 1− | incC | 0+ |
| Rshort | both | MI | exp | exp | 1− | incC | 0+ |

Legend for Interference Response Deviation

TABLE 1

Example of Interference Property Identification for IEEE 802.11 Measurements

| | |
|---|---|
| 11b | IEEE 802.11b protocol |
| 11g | IEEE 802.11g protocol |
| both | Both IEEE 802.11b and 8802.11g protocols |
| valid | a value correct to within the limitations of the measurement. If the packet success rate becomes sufficiently small, some equipment will not give a valid value. |
| MI | a value correct to within the limitations of the measurement showing the signal strength variations characteristic of multi-path interference (see Multi-Path Interference) |
| exp | Essentially equal to the expected value |
| <exp | Significantly less that the expected value |
| 0+ | Equal to or slightly greater than zero. Note that "the meaning of "slightly greater than" is proportional to the range over which the response can vary. |
| 1− | Equal to or slightly less than one. |
| fracT | The fraction of transactions completed correctly in the presence of the interference (0 < fracT × expected value < expected value) |
| >=fracT | Between fracT and the expected value inclusive of fracT |
| incC | The channel rate may increase; other properties which are less than expected may also change, but no change is common. |
| decP | Probability Packet Succeeds may decrease; other properties may change in undetermined ways. |

A record of known interference responses such as Table 1 can be exploited as shown in FIG. 16 to identify classes of the interference present on a link that is being investigated. This procedure, in simplified form, is also a part of what is shown in FIG. 14. A sample exploitation procedure follows. Use all of the data currently available that applies to the measured link as it is now configured. In addition to data from the current configuration, this may include data from other closely related configurations such as similar configurations with more or less signal strength applied to the measured link receiver, or a protocol or protocol parameter differing from the current configuration. This may also include data from any other configuration that provides information about the interference being experienced in the current configuration. Determine to the extent possible from the data currently available, the measured link's responses that deviate significantly from zero (i.e. who's measured link measurements made in the presence of interference deviate significantly from what would have been expected in the absence of interference, (900). Compare these responses to the known interference responses (902). Identify those interference class descriptors exhibiting the responses that most closely match or explain the measured link's responses (904). Subsequently, a design decision is made whether more data is useful (FIG. 14, 706) particularly considering whether further tests can resolve the class or classes of interference affecting the link. If so, then adjust the emulation parameters to perform that measured link emulation (708), and perform it (206). If not, then view the list of remaining interference classes as the likely classes of the interference present on the measured link.

Note that in several instances, one class of interference can cause symptoms of multiple interferences classes. This occurs if two interference classes are indistinguishable with the data available or if the interference has characteristics of both classes. For example, a signal arriving about 40 ns, before or after the signal arriving on the path that delivers the strongest signal, will have characteristics of both Rshort and Rmed; thus, multiple class descriptors from the record may be caused by interference with a single characteristic.

While analyzing interference is always an advantage because of the insight it gives into the installation needs, this measurement is especially valuable if there is a possibility of altering the interference environment of the measured link. It gives information on which to base a projection of the performance of measured links that might be installed in this environment or in an altered one, and provides aid in identifying the sources of interference so they can be altered. The ability to understand and analyze interference is well beyond the previous state-of-the-art in site surveys.

The communication measurement instruments described above may be realized in several forms including, but not limited to, the form of notebook computers provided with wireless networking interfaces and antennas. In this form it is well suited to the design of new installations. The foregoing methods may be implemented in the form of software running on a computer. In this form it is well suited to analyzing existing installations to which the computer is connected. The software may be provided with different levels of user interface, including, for example, an expert level that presents few prompts to a user and a less-expert level that provides more prompts to the user. The invention may also be realized in the form of a computer-readable medium containing instructions for performing the foregoing methods, and in other forms.

DETAILED DESCRIPTION

First Embodiment—FIG. 17 Receiver Calibration

FIG. 17 shows a signal source 2000 electrically connected to optional attenuating devices 2002. The attenuating devices 2002 are electrically connected to an optional cable 2006. The cable 2006 is electrically connected to optional attenuating devices 2010. The attenuating devices 2010 are electrically connected to a measuring receiver 2012 that conforms to the broad definition on "measuring receiver" found in the Glossary. The attenuating devices 2002 are placed so that they are on either side, both sides of and/or passing through an optional shield 2004. Similarly, the attenuating devices 2010 are placed so that they are on either side of or passing through an optional shield 2008 or at multiple of the foregoing locations. The shield 2004 and shield 2008 can be simple shields, shielding enclosures encompassing or substantially encompassing the signal source 2000 and measuring receiver 2012 respectively, shielded rooms or any other structure providing electromagnetic shielding.

If the measuring receiver also meets the criteria for a receiver described in DETAILED DESCRIPTION—FIRST EMBODIMENT—FIG. 2, Communication Measurement Instrument Criteria, then the signal source 2000 may be any signal source meeting the criteria that apply to measured link transmitter 1000. In practice, the easiest source to use, if the protocols are complex, is often an instantiation of measured link transmitter 1000 or its functional equivalent. Attenuating devices 2002, cable 2006, and attenuating devices 2010 all meet the broad definition of attenuating device given in the Glossary and collectively form what will again be called a "measured link 2014" owing to its functional equivalence to the measured link of COMMUNICATION MEASUREMENT.

OPERATION

First Embodiment—FIGS. 17-19 Receiver Calibration

FIG. 17 depicts equipment arranged so as to guarantee that the loss on any radiated path from the signal source to the measuring receiver is significantly greater than the loss on the guided path through attenuating devices 2002, cable 2006, and attenuating devices 2010. This is guaranteed by shielding and optionally by the distance afforded by the cable. Thus, the amount of signal reaching the measuring receiver 2012 is controlled by the guided path. This configuration also guarantees that no unintended interference can reach the receiver.

One of several procedures is shown in FIG. 18 to create a map relating properties of the measured link by using measured data. By using the signal source 2000 having known signal strength; and attenuating devices 2002, cable 2006, and attenuating devices 2010 having known attenuation, the signal strength supplied to the measuring receiver 2012 is known. Many other signal properties may be of interest and can be controlled depending upon the equipment used. These properties include, but are not limited to, protocols used, protocol options and extensions, and modulation characteristics. The measuring receiver 2012 is presented with an as yet unmeasured combination of signal properties (FIG. 18, 2100). The values measured by the measuring receiver 2012 are recorded (2102). The measured link measurements recorded may include, but are not limited to those described in DETAILED DESCRIPTION—FIRST EMBODIMENT—FIG. 2, Communication Measurement Instrument Criteria; indeed, any measured data that is dependent directly or indirectly upon the signal strength received can be used to measure that property. Likewise, any other measured link property can be used to measure that property upon which it is dependent. By selecting among a plurality of attenuating devices for use in the measured link, if possible by altering the output signal strength of signal source 2000 and selecting other signal properties, the test above can be repeated for a plurality of known signal properties (2104).

The accuracy of the data may benefit from averaging, smoothing, and other signal processing techniques (2106). From the data collected, a relationship is extracted between the signal property supplied to the measuring receiver 2012 and each of the values measured on the measured link (2108). That relationship may take the form of:
- a mathematical relationship;
- a graph;
- a table;
- any map between the signal strength and the measured link property; or
- any other form that allows signal strength or any other property to be measured from one or more measurements.

FIG. 19 shows a graph of measured data that forms a map of the relationships between two measured link properties RSP and saturated throughput, and a third measured link property received signal strength.

The accuracy achieved by this calibration comes from the signal source 2000, attenuating devices 2002, cable 2006, attenuating devices 2010 and the repeatability of the measuring receiver 2012. Each of these elements has a degree of accuracy that is:
- fundamental to its design;
- selected according to screening measurements; or
- established by measurements made after manufacture (calibrating measurements), and, as is evident from Prior Art Error Analysis, these errors must be kept acceptably small. The third option for establishing accuracy is discussed further in WEAK SIGNAL GENERATION.

DETAILED DESCRIPTION

First Embodiment—FIG. 20 Weak Signal Generation

FIG. 20 shows a signal source 3000 electrically connected to an optional device under test 3002, typically a device that meets the broad definition of attenuating device given in the Glossary. The device under test 3002 electrically connects to signal strength meter 3004 such as a power meter. When the device under test 3002 is absent, the purpose of the measurement is to measure the output signal strength of the signal source 3000. In that case, the signal source 3000 should conform to the description in DETAILED DESCRIPTION—FIRST EMBODIMENT—FIG. 2, Communication Measurement Instrument Criteria if the weak signal is to be generated for measuring a receiver that conforms to it. When the device under test 3002 is present, the purpose of the test is to measure the device under test. The cheapest and most convenient signal source to use for this measurement is often an instantiation of measured link transmitter 1000 (which conforms to the criteria.)

Signal sources 3000 that use protocols that use some form of time-domain multiplexing of the signal on the measured link pose an additional problem. To measure them, conveniently use a signal strength meter that can gate its measurement "on" and "off" (select when measurement data will be collected) to match the times when the transmitter is "on." Such instruments are available commercially.

OPERATION

First Embodiment—FIGS. 20 & 21 Weak Signal Generation

It is relatively easy to measure signals with moderate signal strengths. These can be compared by various means to accurately known physical standards. For radio frequency signal strength, a common approach has been to measure its ability to detectably heat a thermocouple. As with most of these physical standards based measurements, small values of properties cannot be measured accurately, in the case of radio frequency signal strength, when the power that is measured is too small to detectably heat the thermocouple. The approach used here is to measure each signal source and attenuating device that will be used in the measured link to calibrate a receiver (or other device), at a signal strength great enough that it can be measured very accurately. The accuracy of this measurement and potentially most of the forgoing measurements is dependent upon the accuracy of the signal strength meter 3004 which is fortunate. Signal strength meters in the form of power meters are relatively inexpensive, extremely accurate and often traceable to national and/or international metrology standards.

An embodiment of a method to generate weak signals follows, though a number of variations are possible. Connect the signal strength meter (3004) to the signal source (FIG. 20, 3000 and FIG. 21, 3400). Measure the signal strength delivered by the signal source (3402). Take enough measurements to characterize the signal source over the band of frequencies on which weak signals are to be generated. If there are additional output signal strength options available from the signal source that need to be calibrated at this time (3404), then adjust the signal source to an as-yet uncalibrated output signal strength option (3406) and repeat from procedure 3402. Otherwise, connect an attenuating device in the position of the device under test (3002), to the signal source on one port and the signal strength meter on the other port (3408). More accurate measurements will often be obtained if the signal source strength is adjusted. Measure the strength of the signal passed through the attenuating device (3410). Take enough measurements to characterize the attenuating device over the band of frequencies on which weak signals are to be generated. The foregoing will subsequently be referred to as "source and meter calibration." Do more attenuating devices (or step or variable attenuating device settings) exist that need to be calibrated (3412)? If so, repeat from procedure 3408, using the next attenuating device. If not, a weak calibrated signal may be created by selecting among the attenuating devices and signal source output signal strengths available, those necessary to achieve the signal strength desired (3414). Include in the selection those calibrated above along with others having sufficiently accurately known attenuation. All the attenuating devices included as candidates for selection need to have attenuations that are accurately enough know to be sure that the overall accuracy of the signal delivered for measurement purposes is adequate. Concatenate the attenuating devices and connect them to the signal source as shown in FIG. 20 (3416). This provides the signal strength desired within the accuracy determined by the accuracies to which the constituent attenuating device attenuations are known and the errors introduced by mismatch. Note that once the attenuations of the set of available attenuating devices are adequately known (by whatever means), a desired signal strength can be achieved with only two steps (3414 and 3416.)

Measuring individual elements separately, works if the total attenuation of the attenuating devices when concatenated in the measured link 2014 used to calibrate a receiver or any other device, as depicted in FIG. 17, is very close to the product (sum in dB) of the attenuations of the individual attenuating devices times the output signal strength of the signal source (3000) (sum in dB.) This is a very good approximation for a large class of attenuating devices that are linear, that is, the output is (approximately) linearly proportional to the input. It is from this class of attenuating devices, linear attenuating devices, that attenuating devices are selected for weak signal generation.

If the first embodiment uses a protocol transmitter in the role of signal source, it requires little equipment beyond what is already available and the signal strength meter. Thus, this embodiment is relatively inexpensive and can be readily assembled. It is capable of providing receiver calibration of much greater accuracy than the previous art.

DETAILED DESCRIPTION

Alternative Embodiment—FIG. 22 Weak Signal Generation

FIG. 22 shows a protocol transmitter 3102 and a backchannel receiver 3104. The protocol transmitter 3102 is electrically connected through a concatenation or zero or more protocol transmitter attenuating devices 3106 to one selectable port of a source switch function 3110. The backchannel receiver 3104 is electrically connected through a concatenation or zero or more backchannel receiver attenuating devices 3108 to another selectable port of a source switch function 3110, which together comprise a transceiver function 3100. The source switch function 3110 is electrically connected through a concatenation or zero or more source attenuating devices 3112 to a bifurcation function 3114. The foregoing along with the components connected via another output port of the bifurcation function (3100-3130) forms a functional equivalent to the signal source 3000. One output port of the bifurcation function 3114 is electrically connected through an optional device under test 3002 to a signal strength meter 3004. Another output port of the bifurcation function 3114 is electrically connected through a concatenation or zero or more destination attenuating devices 3118 to a destination switch function 3120. The destination switch function 3120 selects either an electrical connection through a concatenation or zero or more protocol receiver attenuating devices 3122 to a protocol receiver 3126 or an electrical connection through a concatenation or zero or more backchannel transmitter attenuating devices 3124 to a backchannel transmitter 3128. The latter five components form a transceiver function 3130.

OPERATION

Alternative Embodiment—FIG. 22 Weak Signal Generation

This embodiment operates in a manner similar to the first embodiment except that the source is implemented with the protocol transmitter 3102 that uses a protocol (e.g. IEEE 802.11g) that does not generate the signals that are to be measured (e.g. the data in OFDM modulated form) unless communication is received from the receiver end of the measured link. The receiver end to transmitter end communication is backchannel communication. If the backchannel uses the same path (connectors, antennas etc.) as the measured link, backchannel communication is complicated by the need to bifurcate the path. Some of the signal from the protocol transmitter must go to the signal strength meter 3004 and some of it must go to the protocol receiver 3126. Note that the protocol receiver is functionally like a measured link receiver except that there is no need for it to perform measurements. In addition, the protocol receiver 3126 is usually realized coupled to the backchannel transmitter 3128 (making it a transceiver function 3130.) The backchannel transmitter 3128 transmits information to the backchannel receiver 3104 (usually co-located with the protocol transmitter making it a transceiver function 3100.) That information completes the requirements of the protocol. This bifurcation of the measured link introduces another element that can introduce significant error in the signal strength reaching the signal strength meter 3004. Options for the bifurcation function include but are not limited to a:

splitter; or coupler.

These options always provide adequate signal to the protocol receiver. They also provides a means of measuring the output signal strength of a protocol transmitter that requires response from a protocol receiver to generate its normal signal. Special attention, however, must be given errors that may be unacceptable in the signal strength that is sent to the measuring device unless it too is calibrated. The calibration may be complicated by greater variation with frequency than attenuating devices exhibit and by sensitivity to the load on the port connected to 3118.

DETAILED DESCRIPTION

Alternative Embodiment—FIG. 24-23 Weak Signal Generation

FIG. 23 shows an apparatus that is very similar to the one in FIG. 22. The measurement signal path from the transceiver function 3100 to the signal strength meter 3004 is identical except that the bifurcation function 3114 is implemented as an antenna or other pickup device 3200 and is not overtly evident on the path from the transceiver function 3100 to the signal strength meter 3004. Instead the concatenation or zero or more source attenuating devices 3112 is connected directly to the optional device under test 3002. The antenna or other pickup device 3200 is electrically connected through the concatenation or zero or more destination attenuating devices 3118 to the transceiver function 3130 in the same fashion as shown in FIG. 22.

OPERATION

Alternative Embodiment—FIG. 23 Weak Signal Generation

The embodiment shown in FIG. 23 operates in a manner similar to that in FIG. 22, except that the bifurcation function is implemented using leaked signal. The bifurcation is realized as the antenna or other pickup device 3200 placed in proximity to the signal path between the protocol transmitter 3102 and the signal strength meter 3004. Depending upon the needs of the protocol receiver and shielding, a considerable distance may be placed between the antenna 3200 and the path. It is often possible to use this distance to control the channel rate selected by multi-rate protocols that automatically select channel rate such as IEEE 802.11 protocols.

Bifurcating a signal path in this manner introduces no detectable alteration of the signal path. It is cheap, flexible and easily implemented. The possibility exists particularly with low signal strength or very good shielding (such as semi-rigid cable), that leakage would be so small that the protocol receiver 3128 would not operate properly. In that case, some leaky component such as coaxial cable with a single braided shield would need to be inserted into the signal path. While this introduces some alteration in the signal path, it is probably acceptable and can be calibrated using the above procedure. It is almost as cheap, flexible and easily implemented as using the unaltered path.

DETAILED DESCRIPTION

Alternative Embodiment—FIG. 24 Weak Signal Generation

FIG. 24 shows both test ports of a network analyzer 3300 electrically connected to both ports of the device under test 3002, typically a device that meets the broad definition of attenuating device given in the Glossary. In some cases, it is also possible to test the signal sources, measured link transmitters, receivers and transceivers as single port devices under test and measure the properties that control how efficiently it transfers signal to and from attached devices using the network analyzer. One such class of properties is scattering parameters (S-parameters.) This is done by connecting the one port of the signal source, measured link transmitter, receiver or transceiver to one port of the network analyzer. This is depicted in FIG. 24 where the signal source, measured link transmitter, receiver or transceiver is the device under test and no connection is made to the second port of the network analyzer.

OPERATION

Alternative Embodiment—FIGS. 24 & 25 Weak Signal Generation

This embodiment and the next one are examples of the operation of a larger class of equipment called network analyzing capability in this paper. The embodiment shown in FIG. 24 offers no means with current network analyzers to measure the output signals strength of the signal source (3000), but it is entirely possible that this limitations will be eliminated in the future or with other implementations of network analyzing capability. The network analyzers (3300) currently available provide the ability to measure with great accuracy, both the attenuation of attenuating devices and the efficiency with which a component transfers signal to adjacent components (often called mismatch. S-parameters are an example of the properties measured). The properties of the attenuating devices and signal source and destination ports are used to calculate the efficiency of transfer to the particular component to which it is electrically connected; thus, largely eliminating the mismatch error that remained in the signal strength measurement provided to the measuring receiver 2012 using the first embodiment.

As shown in FIG. 25, except for the measurement of properties using the network analyzer (3300), this embodiment operates in a manner similar to the first embodiment. It also depends upon a means such as the first embodiment to obtain the signal source output signal strength.

An embodiment of a method to generate weak signals using a network analyzer follows, though several variations are possible. Connect the signal strength meter to the signal source (3400). Measure the signal strength delivered by the signal source (3402). Connect the signal source output port to either port of the network analyzer (3500). These ports are fundamentally interchangeable on most network analyzers except for the labeling of the measured data. Measure the signal source output port in the manner most appropriate for the source and network analyzer used. Often this will be with power applied to the signal generator, but with no signal being generated. Measure the properties that describe the output port mismatch (e.g. $S_{22}$) (3502). Take enough measurements to characterize the signal source over the band of frequencies on which weak signals are to be generated. If there are additional output signal strength options available from the signal source that need to be calibrated at this time (3404), then adjust the signal source for an as-yet uncalibrated output signal strength option (3406), and repeat from procedure 3400. (This same procedure can be used to measure the properties that describe the input port mismatch of the measured link receiver.) Otherwise, connect an attenuating device in the position of the device under test 3002 to the ports of the network analyzer (3504). Ideally port 1 of the network analyzer will be connected to the port of the attenuating device that will connect toward the signal source subsequently, but the ports are fundamentally interchangeable. Take enough measurements to characterize the attenuating device over the band of frequencies on which weak signals are to be generated. Measure all of the properties that describe the attenuating device (such as $S_{11}$, $S_{12}$, $S_{21}$, and $S_{22}$) (3506). These properties include, but are not limited to, attenuation or enough information to calculate attenuation. Do more attenuating devices (or step or variable attenuating device settings) exist that need to be calibrated (3412)? If so, repeat from procedure 3504, using the next attenuating device. If not, select among the attenuating devices and signal source output signal strengths available, those necessary to achieve the signal strength desired (3414). Include in the selection, those calibrated above along with others having sufficiently accurately known attenuation. All the attenuating devices included as candidates for selection need to have attenuations that are accurately enough know to be sure that the overall accuracy of the signal delivered for measurement purposes is adequate. Concatenate the attenuating devices and connect them to the signal source (FIG. 25, 3416). This provides the signal strength desired with the accuracy set by the accuracies to which the properties of the constituent devices are known. The consequences of mismatch may also be included in the weak signal strength calculation by this procedure. Note that once the attenuations of the set of available attenuating devices are adequately known (by whatever means), the above procedure requires only two steps (3414 and 3416), and is identical to the procedure described in FIG. 21 except for the inclusion of mismatch compensation.

This embodiment is capable of providing receiver calibration of significantly greater accuracy than the first embodiment.

DETAILED DESCRIPTION

Alternative Embodiment—FIGS. 26 & 27 Weak Signal Generation

Many alternative implementations of the basic measurement capability shown in FIG. 24 are possible using various forms of network analyzing capability. These often formulate measured results in different parameter sets. An example, www.egr.msu.edu/~kempel/ECE435/tech.pdf incorporated here by reference shows a network analyzing capability realized using a vector voltmeter. FIG. 26 shows a signal generator 3600 connected by coaxial cable 3602 to an input port on a directional coupler 3604. Most of the signal passes through the coupler's transmitted port to the device under test 3002 (DUT) which, if it is a two port device, passes some energy on to a matched load terminator 3618, 50 Ohms in this case. The coupled port of the directional coupler 3604 is connected through a coaxial cable 3606 to the A input port 3612 of a Vector Voltmeter 3608. The isolated port of the directional coupler 3604 is connected through a coaxial cable 3610 to the B input port 3614 or the Vector Voltmeter 3608.

FIG. 26 shows an arrangement for measuring $S_{11}$ of the device under test 3002. When the ports of a two-port device under test 3002 are reversed, (The DUT is turned around.) and the measurement repeated, $S_{22}$ is measured.

FIG. 27 shows a how different components can be connected to the signal generator 3600 and Vector Voltmeter 3608 to measure $S_{21}$ and $S_{12}$ in this embodiment of a network analyzing capability. The input port on a directional coupler 3712 is connected via 3700 to the signal generator 3600. Most of the signal passes through to the transmitted port of the directional coupler 3712 to the device under test 3002. The coupled port of the directional coupler 3712 is connected via 3702 to the A input port 3612 of the Vector Voltmeter 3608. The isolated port of the directional coupler 3712 is connected to a matched load 3706. The other port of the device under test is connected to the input port of another directional coupler 3714. Most of the signal passes through to the directional coupler 3714 to the matched load 3710 on the transmitted port of the coupler. The coupled port of the directional coupler 3714 is connected via 3704 to the B input port 3614 of the Vector Voltmeter 3608. The isolated port of the directional coupler 3714 is connected to a matched load 3708.

FIG. 27 shows an arrangement for measuring $S_{21}$ of the device under test. When the ports of a two-port device under test 3002 are reversed, (The DUT is turned around.) and the measurement repeated, $S_{12}$ is measured. Again the device under test typically meets the broad definition of attenuating device given in the Glossary.

In some cases, it is also possible to use the arrangement shown in FIG. 26 to measure the signal source, measured link transmitter, receiver or transceiver (3000) as a single-port device under test and measure the properties that control how efficiently it transfers signal to attached devices (mismatch which can be described in terms such as impedance, $S_{11}$, $S_{22}$, etc.) In the case of this embodiment of the network analyzing capability, this is done by connecting the one port of the signal source (3000) to the transmitted port of the directional coupler 3604. This is depicted in FIG. 26 where the signal source, measured link transmitter, receiver or transceiver is the device under test.

OPERATION

Alternative Embodiment—FIGS. 26 & 27 Weak Signal Generation

The operation of the embodiment using the network analyzing capability shown in www.egr.msu.edu/~kempel/ECE435/tech.pdf proceeds in the same way as that shown in FIGS. 24 and 23 usually with the same advantages of accuracy. Though the network analyzing capability described in tech.pdf uses scattering parameters (S-parameters), other parameter sets are also suitable for use in this embodiment. Like the embodiment of FIG. 2, this embodiment also can use a means such as the first embodiment to obtain the signal source output signal strength. It is worth noting that if a vector voltmeter is used, as is the case in tech.pdf, the vector voltmeter can be employed in the embodiment depicted in FIGS. 20 and 21 in the role of signal strength meter 3004.

An embodiment of a method to generate weak signals using a network analyzing capability follows, though several variations are possible. Connect the signal source output port as a device under test 3002 for measurement of its impedance properties (e.g. as in FIG. 26.) Measure the signal source output port in the manner most appropriate for the signal source and network analyzing capability used. Often this will be with power applied to the signal source, but with no signal being generated. Measure the properties that describe how efficiently the output port transfers signal to attached devices (e.g. $S_{11}$) (3502). Take enough measurements to characterize the signal source over the band of frequencies on which weak signals are to be generated. If there are additional output signal strength options available from the signal source that need to be calibrated at this time (3404), then adjust the signal source for an as-yet uncalibrated output signal strength option (3406), and repeat from procedure 3400. Otherwise, connect an attenuating device in the position of the device under test 3002 for measurement of some or all of its properties (e.g. as in FIG. 27.) Measure its properties and, if required by the network analyzing capability, connect the attenuating device in the position of the device under test 3002 for measurement of more of its properties (e.g. as in FIG. 26.) In both measurements (that of FIGS. 26 and 27, turning the DUT around and repeating the measurements may be required. Measure these properties, and repeat until all the needed properties have been measured. Take enough measurements to characterize the attenuating device over the band of frequencies on which weak signals are to be generated. Do more attenuating devices (or step or variable attenuating device settings) exist that need to be calibrated (3412)? If so, repeat from procedure 3504, using the next attenuating device. If not, proceed as described for the network analyzing capability in FIG. 24 as described above and in FIG. 25.

This embodiment is usually capable of providing receiver calibration of significantly greater accuracy than the first embodiment, depending upon the specifics of the network analyzing capability used. It allows the use of a wide range of network analyzing capabilities which may result in significant cost savings over the embodiment of FIGS. 24 and 25.

CONCLUSION, RAMIFICATIONS, AND SCOPE

Accordingly the reader will see that, according to one embodiment of the invention, The author has provided a highly accurate, potentially portable means of making a number of measurements that increase the ease and reliability with which radio communication installations can be designed. The cost of the equipment required is not great, much less than the laboratory equipment required to achieve the same accuracy, if it can be achieved at all. The accuracy of the information available using these techniques and apparatuses greatly increases the likelihood that a design will function correctly when first installed and markedly reduces the amount of installed equipment required to do so over the previous art.

While the above description contains many specificities, these should not be construed as limitations on the scope of any embodiment, but as exemplifications of the presently preferred embodiments thereof. Many other ramifications and variations are possible within the teachings of the various embodiments. For example, the receiver calibration technique can also be used for the calibration of instruments such as spectrum analyzers. Thus, the scope of the invention should be determined by the appended claims and their legal equivalents, and not by the examples given.

I claim:

1. A method for measuring properties of a measured link over which signals in the form of radiated waves travel, comprising:
   providing at least one antenna of a transmitting communication measurement instrument at one end of a path that is to be measured
   providing at least one antenna of a receiving communication measurement instrument at the other end of said path that is to be measured,
   transmitting a signal having one or more properties from said transmitting communication measurement instrument which includes a measured link transmitter to said receiving communication measurement instrument which includes a measured link receiver,
   using said communication measurements to measure received signal power (RSP) and throughput,
   measuring indirectly a measured link property selected from the group consisting of:
      means for making indirect measured link measurements of received signal strength, and
      measuring indirectly at least one of transfer properties or throughput from direct measurements of received signal power (RSP).

2. The method of claim 1, further including appraising a consequence of interference that is not coherent from the inconsistency of a measurement selected from the group consisting of:
   received signal strength X (RSSX);
   a directly measured property from which received signal strength X (RSSX) could be mapped; and
   a measurement derived from said directly measured property from which received signal strength X (RSSX) could be mapped,
   and a measurement selected from the group consisting of:
   received signal power (RSP) and
   received signal power enhanced (RSPE).

3. The method of claim 1, wherein the indirectly measured link property is received signal strength.

4. The method of measurement of claim 1, further including appraising a consequence of interference that is not coherent from the inconsistency of a saturated transfer property and an indirect measurement of a saturated transfer property based upon a measurement selected from the group consisting of:
   received signal power (RSP) and
   received signal power enhanced (RSPE).

5. A method, for emulating a candidate receiver:
   providing at least one antenna of a transmitting communication measurement instrument at one end of a path that is to be measured,
   providing at least one antenna of a receiving communication measurement instrument at the other end of said path that is to be measured,
   transmitting a signal having one or more properties from said transmitting communication measurement instrument which includes a measured link transmitter to said receiving communication measurement instrument which includes a measured link receiver,
   using said communication measurement instruments for measuring directly one or more properties of said signal;

obtaining received signal strength measurements of said signal from said direct measurements
providing one or more attenuating devices between the measured link receiver input and the receiver antenna.

6. The method of claim 5, wherein attenuation provided by the one or more attenuating devices is selected to emulate the sensitivity of another receiver.

7. A method for measuring properties of a measured link over which signals in the form of radiated waves travel, comprising:
providing at least one antenna of a transmitting communication measurement instrument at one end of a path that is to be measured
providing at least one antenna of a receiving communication measurement instrument at the other end of said path that is to be measured,
transmitting a signal having one or more properties from said transmitting communication measurement instrument which includes a measured link transmitter to said receiving communication measurement instrument which includes a measured link receiver,
adjusting one or more parameters that control packet size to increase the proportion of packets on the measured link that have a common size.

8. The method of claim 7, wherein the increasing the proportion of packets on the measured link that have a common size is accomplished by increasing the number of maximum packet lengths that are identical.

9. A method, for measuring the effect of interference that is not coherent comprising:
providing at least one antenna of a transmitting communication measurement instrument at one end of a path that is to be measured,
providing at least one antenna of a receiving communication measurement instrument at the other end of said path that is to be measured,
transmitting a signal having one or more properties from said transmitting communication measurement instrument which includes a measured link transmitter to said receiving communication measurement instrument which includes a measured link receiver,
using said communication measurement instruments for measuring directly one or more properties of said signal in the presence of said interference that is not coherent;
obtaining measured link measurements of said signal from the direct measurements made in the presence of said interference that is not coherent.

10. The method of claim 9, further including
identifying each property or group of closely related properties that can be directly or indirectly measured by the communication measurement instruments;
identifying one or more potentially distinguishable class of interference; and
analyzing the response of each property or group of closely related properties to each class of interference.

11. The method of claim 9, further including
comparing measured link response to known interference responses and
identifying at least one interference class who's descriptions most closely match the characteristics of the measured link's measured values.

12. The method of claim 9, further including:
using said communication measurement instruments for measuring directly one or more properties of said signal in the absence of interference that is not coherent;
obtaining measured link measurements of said signal from the direct measurements made in the absence of said interference that is not coherent;
deriving information about one or more interference responses from said measurements made in the presence of said interference that is not coherent and measurements made in the absence of said interference that is not coherent.

13. The method of claim 12, further including grouping one or more known interference responses by the class of interference which caused them.

14. The method of claim 13, wherein the protocol being used is an IEEE 802.11 protocol.

15. The method of claim 9, further including
choosing methods of interference reduction or removal based on said measured link measurements of said signal from said direct measurements made in the presence of said interference that is not coherent.

16. The method of claim 9, further including
estimating the effect of interference on one or more measured link property of said signal from said direct measurements made in the presence of said interference that is not coherent.

17. A method, for measuring the effect of coherent interference comprising:
providing at least one antenna of a transmitting communication measurement instrument at one end of a path that is to be measured,
providing at least one antenna of a receiving communication measurement instrument at the other end of said path that is to be measured,
transmitting a signal having one or more properties from said transmitting communication measurement instrument which includes a measured link transmitter to said receiving communication measurement instrument which includes a measured link receiver,
using said communication measurement instruments for measuring directly one or more properties of said signal;
obtaining received signal strength measurements of said signal from said direct measurements;
measuring at a plurality of locations with at least one of the antennas at one end of said path, which locations are close enough together that two or more of the signals traveling between the transmitting antenna or antennas, and the receiving antenna or antennas on different paths, arrive at the one or more receiving locations with amplitudes that may be dependent upon said path taken, but are approximately independent of said location.

18. The method of measuring of claim 17, wherein the measuring of said received signal strength using said plurality of locations is accomplished by measuring said received signal strength using the locations of a plurality of antennas.

19. The method of measuring of claim 17, wherein the measuring of said received signal strength using said plurality of locations is accomplished by moving one or more antennas possibly with associated electronics to a plurality of locations.

20. The method of claim 17, further including, measuring said received signal strength using locations that yield minimum and maximum values near a predetermined location.

21. The method of claim 17, further including, measuring said received signal strength using random locations near a predetermined location.

22. The method of claim 17, further including,
measuring said received signal strength using locations near a predetermined location, measuring the locations where said received signal strength is measured.

23. The method of claim 17, further including, measuring said received signal strength using a plurality of predetermined locations near to one another.

24. A method, for avoiding the altering of one or more measured link measurements comprising:
  providing at least one antenna of a transmitting communication measurement instrument at one end of a path that is to be measured,
  providing at least one antenna of a receiving communication measurement instrument at the other end of said path that is to be measured,
  transmitting a signal having one or more properties from said transmitting communication measurement instrument which includes a measured link transmitter to said receiving communication measurement instrument which includes a measured link receiver,
  using said communication measurement instruments for measuring directly one or more properties of said signal;
  obtaining one or more predetermined measured link measurement of said signal from said direct measurements; said predetermined measured link measurement being a measured link measurement which would have been significantly altered if a large volume of data containing useful information were to be conveyed in addition to test data in the same band of frequencies as used by the measured link when a measurement was being made on the measured link,
  conveying said data containing useful information from a first communication measurement instrument to a second communication measurement instrument in a manner that said data containing useful information does not significantly alter said predetermined measured link measurement made on said measured link.

25. The method of claim 24, wherein said data containing useful information are conveyed by sending a volume of said data containing useful information that is sufficiently small that it has negligible effect on said predetermined measured link measurement.

26. The method of claim 24, wherein said data containing useful information are conveyed by transmitting said data containing useful information at a time when said predetermined measured link measurement is not being made.

27. The method of claim 24, wherein said data containing useful information are conveyed by replacing data that would otherwise be transmitted as said test data with said data containing useful information so as to approximately or exactly preserve total duration of time used to convey the data.

28. The method of claim 24, wherein said data containing useful information are conveyed by transmitting said data containing useful information on a channel separate from the channel being measured.

* * * * *